United States Patent [19]
Yokoyama

[11] Patent Number: 5,381,163
[45] Date of Patent: Jan. 10, 1995

[54] IMAGE PROCESSING APPARATUS

[75] Inventor: Noboru Yokoyama, Tokyo, Japan

[73] Assignee: Canon Kabushiki Kaisha, Tokyo, Japan

[21] Appl. No.: 100,347

[22] Filed: Aug. 2, 1993

Related U.S. Application Data

[63] Continuation of Ser. No. 721,093, Jun. 13, 1991, abandoned.

[30] Foreign Application Priority Data

| Jun. 13, 1990 | [JP] | Japan | 2-152662 |
| Jun. 13, 1990 | [JP] | Japan | 2-152663 |
| Jul. 5, 1990 | [JP] | Japan | 2-176252 |
| Jul. 20, 1990 | [JP] | Japan | 2-190824 |
| Jul. 20, 1990 | [JP] | Japan | 2-190825 |
| Jul. 20, 1990 | [JP] | Japan | 2-190826 |
| Jul. 20, 1990 | [JP] | Japan | 2-190827 |

[51] Int. Cl.⁶ ............................................. G09G 1/06
[52] U.S. Cl. ............................. 345/126; 382/46; 358/448
[58] Field of Search ............... 340/723, 727, 750, 728, 340/748; 345/126, 121, 127; 382/46; 348/583; 358/448

[56] References Cited

U.S. PATENT DOCUMENTS

| 4,204,227 | 5/1980 | Gurley | 358/138 |
| 4,545,069 | 10/1985 | Kermisch | 340/727 |
| 4,704,040 | 11/1987 | Takano et al. | 340/728 |
| 4,837,845 | 6/1989 | Pruett et al. | 340/727 |
| 5,030,944 | 7/1991 | Mashimo et al. | 340/727 |
| 5,034,733 | 7/1991 | Okazawa et al. | 340/727 |
| 5,050,225 | 9/1991 | Itoh | 340/727 |

Primary Examiner—Alvin E. Oberley
Assistant Examiner—Regina Liang
Attorney, Agent, or Firm—Fitzpatrick, Cella, Harper & Scinto

[57] ABSTRACT

A pattern generator of an image processing apparatus generates an image pattern corresponding to code data according to the assignment of the code data. The pattern generator includes storage units for storing an image pattern having the form of a dot matrix in a form wherein respective rows are rearranged in different manners, an indication unit for indicating that the image pattern is to be read from the storage unit by performing rotation and/or mirror-image processing of the image pattern, a row address generation unit for generating row addresses for addressing the storage units in accordance with the indication by the indication unit, and a rearranging unit for determining a method to be used in rearranging of the image pattern output from the storage units according to the row addresses in accordance with the indication by the indication unit to rearrange the image pattern.

15 Claims, 109 Drawing Sheets

FIG. 2
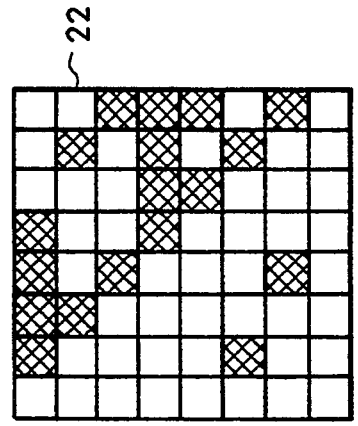
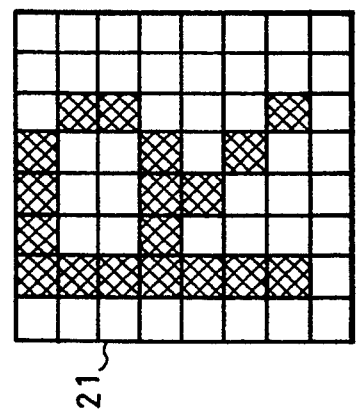

FIG. 3 (A)

ASSIGNMENT OF 0°

| RA2~0 | #7 | #6 | #5 | #4 | A2~A0 #3 | #2 | #1 | #0 |
|---|---|---|---|---|---|---|---|---|
| 000 | 000 | 000 | 000 | 000 | 000 | 000 | 000 | 000 |
| 001 | 001 | 001 | 001 | 001 | 001 | 001 | 001 | 001 |
| 010 | 010 | 010 | 010 | 010 | 010 | 010 | 010 | 010 |
| 011 | 011 | 011 | 011 | 011 | 011 | 011 | 011 | 011 |
| 100 | 100 | 100 | 100 | 100 | 100 | 100 | 100 | 100 |
| 101 | 101 | 101 | 101 | 101 | 101 | 101 | 101 | 101 |
| 110 | 110 | 110 | 110 | 110 | 110 | 110 | 110 | 110 |
| 111 | 111 | 111 | 111 | 111 | 111 | 111 | 111 | 111 |

FIG. 4(A)

ASSIGNMENT OF 90° TO LEFT

| RA2~0 | #7 | #6 | #5 | #4 | #3 | #2 | #1 | #0 |
|---|---|---|---|---|---|---|---|---|
| | | | | A2~A0 | | | | |
| 000 | 001 | 010 | 011 | 100 | 101 | 110 | 111 | 000 |
| 001 | 010 | 011 | 100 | 101 | 110 | 111 | 000 | 001 |
| 010 | 011 | 100 | 101 | 110 | 111 | 000 | 001 | 010 |
| 011 | 100 | 101 | 110 | 111 | 000 | 001 | 010 | 011 |
| 100 | 101 | 110 | 111 | 000 | 001 | 010 | 011 | 100 |
| 101 | 110 | 111 | 000 | 001 | 010 | 011 | 100 | 101 |
| 110 | 111 | 000 | 001 | 010 | 011 | 100 | 101 | 110 |
| 111 | 000 | 001 | 010 | 011 | 100 | 101 | 110 | 111 |

FIG. 6(A)

ASSIGNMENT OF 270° TO LEFT

| RA2~0 | #7 | #6 | #5 | #4 | A2~A0 #3 | #2 | #1 | #0 |
|---|---|---|---|---|---|---|---|---|
| 000 | 000 | 001 | 010 | 011 | 100 | 101 | 110 | 111 |
| 001 | 111 | 000 | 001 | 010 | 011 | 100 | 101 | 110 |
| 010 | 110 | 111 | 000 | 001 | 010 | 011 | 100 | 101 |
| 011 | 101 | 110 | 111 | 000 | 001 | 010 | 011 | 100 |
| 100 | 100 | 101 | 110 | 111 | 000 | 001 | 010 | 011 |
| 101 | 011 | 100 | 101 | 110 | 111 | 000 | 001 | 010 |
| 110 | 010 | 011 | 100 | 101 | 110 | 111 | 000 | 001 |
| 111 | 001 | 010 | 011 | 100 | 101 | 110 | 111 | 000 |

FIG. 8(A)

ASSIGNMENT OF 180°

| RA2~0 | #7 | #6 | #5 | #4 | #3 | #2 | #1 | #0 |
|---|---|---|---|---|---|---|---|---|
| | | | | A2~A0 | | | | |
| 000 | 111 | 111 | 111 | 111 | 111 | 111 | 111 | 111 |
| 001 | 110 | 110 | 110 | 110 | 110 | 110 | 110 | 110 |
| 010 | 101 | 101 | 101 | 101 | 101 | 101 | 101 | 101 |
| 011 | 100 | 100 | 100 | 100 | 100 | 100 | 100 | 100 |
| 100 | 011 | 011 | 011 | 011 | 011 | 011 | 011 | 011 |
| 101 | 010 | 010 | 010 | 010 | 010 | 010 | 010 | 010 |
| 110 | 001 | 001 | 001 | 001 | 001 | 001 | 001 | 001 |
| 111 | 000 | 000 | 000 | 000 | 000 | 000 | 000 | 000 |

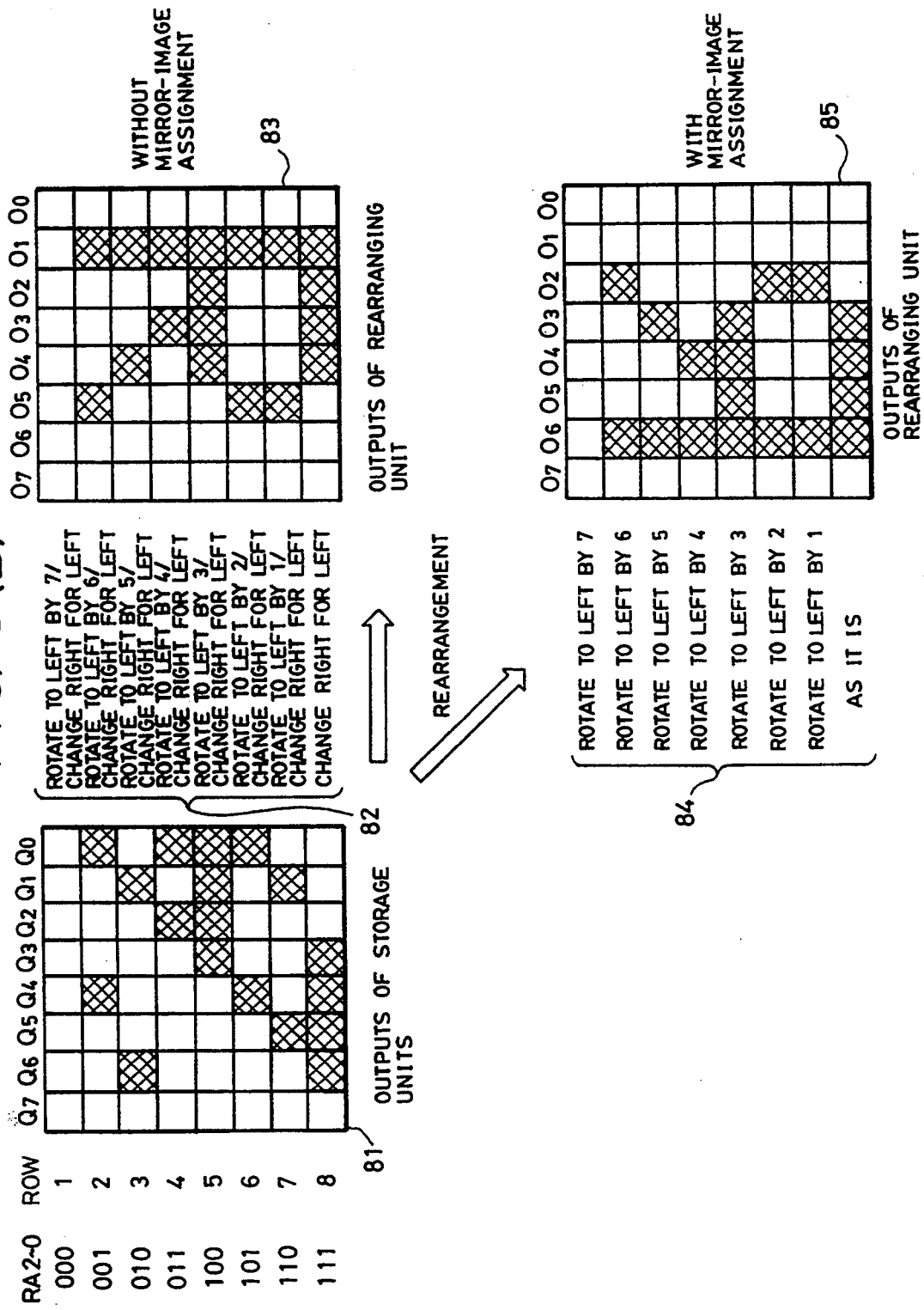

FIG. 10 (A)

ASSIGNMENT OF 0*

| RA2~0 | #7 | | #6 | | #5 | | #4 | | #3 | | #2 | | #1 | | #0 |
|---|---|---|---|---|---|---|---|---|---|---|---|---|---|---|---|
| | | | | | | | A2~A0 | | | | | | | | |
| 000 | 000 | | 000 | | 000 | | 000 | | 000 | | 000 | | 000 | | 000 |
| 001 | 001 | | 001 | | 001 | | 001 | | 001 | | 001 | | 001 | | 001 |
| 010 | 010 | | 010 | | 010 | | 010 | | 010 | | 010 | | 010 | | 010 |
| 011 | 011 | | 011 | | 011 | | 011 | | 011 | | 011 | | 011 | | 011 |
| 100 | 100 | | 100 | | 100 | | 100 | | 100 | | 100 | | 100 | | 100 |
| 101 | 101 | | 101 | | 101 | | 101 | | 101 | | 101 | | 101 | | 101 |
| 110 | 110 | | 110 | | 110 | | 110 | | 110 | | 110 | | 110 | | 110 |
| 111 | 111 | | 111 | | 111 | | 111 | | 111 | | 111 | | 111 | | 111 |

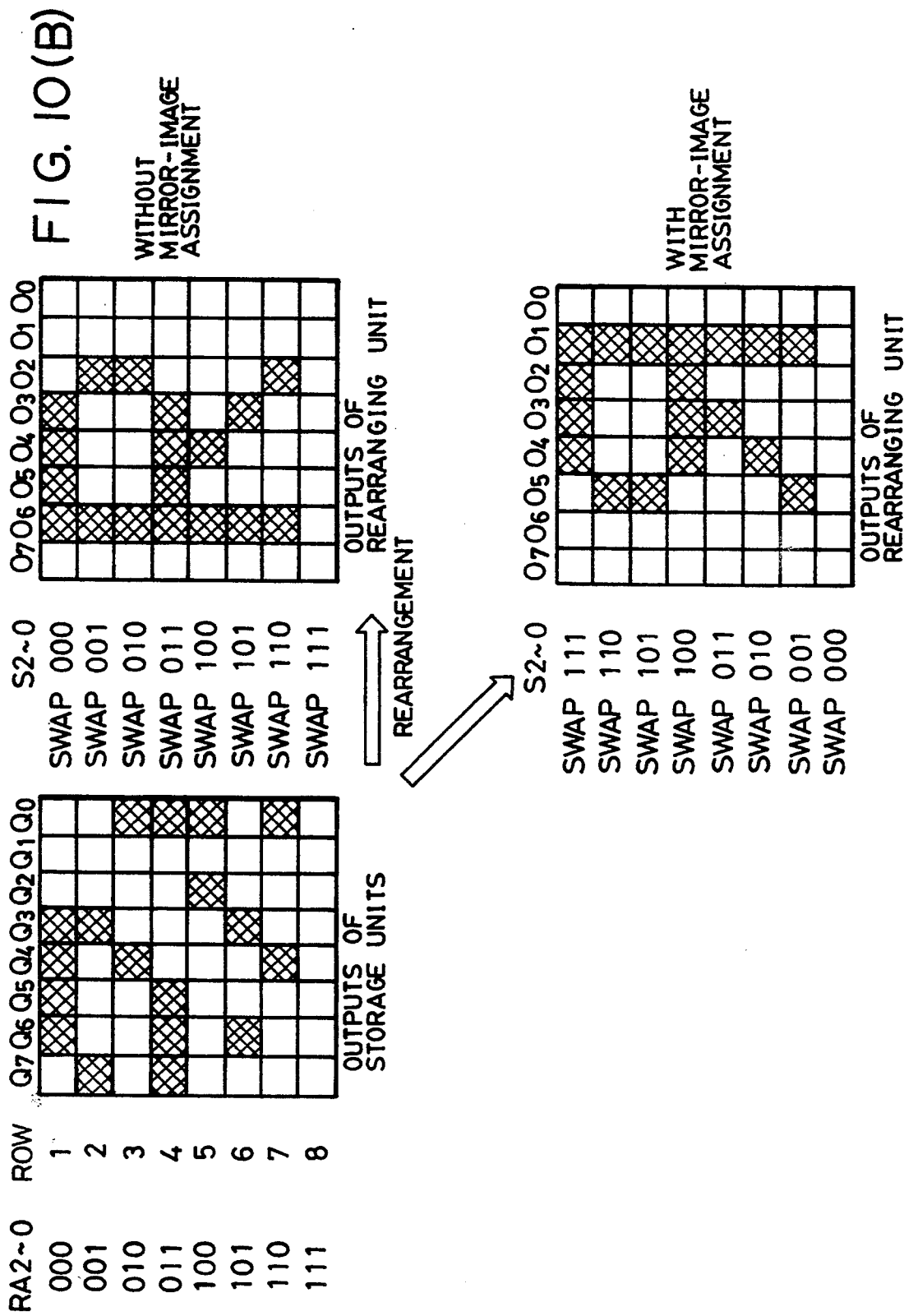

FIG. 11(A)

ASSIGNMENT OF 90° TO LEFT

| RA2~0 | #7 | #6 | #5 | #4 | #3 | #2 | #1 | #0 |
|---|---|---|---|---|---|---|---|---|
| | | | | A2~A0 | | | | |
| 000 | 111 | 110 | 101 | 100 | 011 | 010 | 001 | 000 |
| 001 | 110 | 111 | 100 | 101 | 010 | 011 | 000 | 001 |
| 010 | 101 | 100 | 111 | 110 | 001 | 000 | 011 | 010 |
| 011 | 100 | 101 | 110 | 111 | 000 | 001 | 010 | 011 |
| 100 | 011 | 010 | 001 | 000 | 111 | 110 | 101 | 100 |
| 101 | 010 | 011 | 000 | 001 | 110 | 111 | 100 | 101 |
| 110 | 001 | 000 | 011 | 010 | 101 | 100 | 111 | 110 |
| 111 | 000 | 001 | 010 | 011 | 100 | 101 | 110 | 111 |

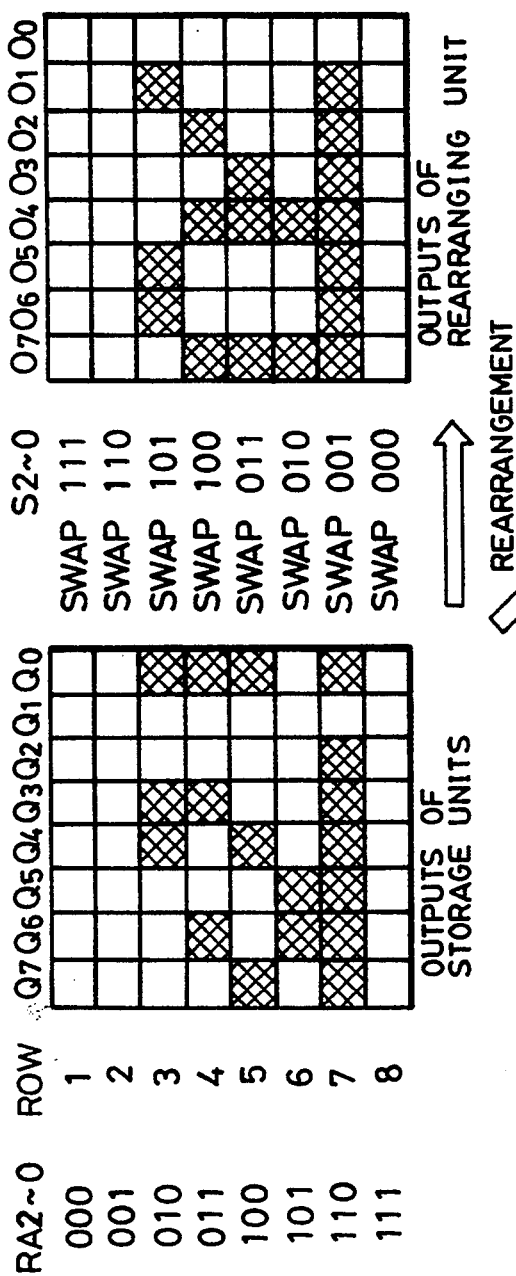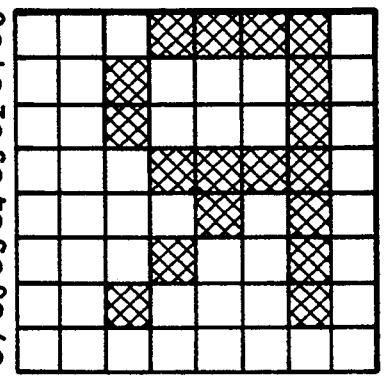
FIG. 11(B)

FIG. 12(A)

ASSIGNMENT OF 180°

| RA2~0 | #7 | #6 | #5 | #4 | #3 | #2 | #1 | #0 |
|---|---|---|---|---|---|---|---|---|
| | | | | A2~A0 | | | | |
| 000 | 111 | 111 | 111 | 111 | 111 | 111 | 111 | 111 |
| 001 | 110 | 110 | 110 | 110 | 110 | 110 | 110 | 110 |
| 010 | 101 | 101 | 101 | 101 | 101 | 101 | 101 | 101 |
| 011 | 100 | 100 | 100 | 100 | 100 | 100 | 100 | 100 |
| 100 | 011 | 011 | 011 | 011 | 011 | 011 | 011 | 011 |
| 101 | 010 | 010 | 010 | 010 | 010 | 010 | 010 | 010 |
| 110 | 001 | 001 | 001 | 001 | 001 | 001 | 001 | 001 |
| 111 | 000 | 000 | 000 | 000 | 000 | 000 | 000 | 000 |

FIG. 13(A)

ASSIGNMENT OF 270° TO LEFT

| RA2~0 | #7 | #6 | #5 | #4 | #3 | #2 | #1 | #0 |
|---|---|---|---|---|---|---|---|---|
| 000 | 000 | 001 | 010 | 011 | 100 | 101 | 110 | 111 |
| 001 | 001 | 000 | 011 | 010 | 101 | 100 | 111 | 110 |
| 010 | 010 | 011 | 000 | 001 | 110 | 111 | 100 | 101 |
| 011 | 011 | 010 | 001 | 000 | 111 | 110 | 101 | 100 |
| 100 | 100 | 101 | 110 | 111 | 000 | 001 | 010 | 011 |
| 101 | 101 | 100 | 111 | 110 | 001 | 000 | 011 | 010 |
| 110 | 110 | 111 | 100 | 101 | 010 | 011 | 000 | 001 |
| 111 | 111 | 110 | 101 | 100 | 011 | 010 | 001 | 000 |

| MODE 2 | MODE 1 | MODE 0 | ROTATION/MIRROR-IMAGE ASSIGNMENT |
|--------|--------|--------|----------------------------------|
| 0 | 0 | 0 | 0° WITHOUT MIRROR IMAGE |
| 0 | 0 | 1 | 0° WITH MIRROR IMAGE |
| 0 | 1 | 1 | 90° ROTATION TO LEFT WITHOUT MIRROR IMAGE |
| 0 | 1 | 0 | 90° ROTATION TO LEFT WITH MIRROR IMAGE |
| 1 | 1 | 0 | 180° ROTATION WITHOUT MIRROR IMAGE |
| 1 | 1 | 1 | 180° ROTATION WITH MIRROR IMAGE |
| 1 | 0 | 1 | 270° ROTATION TO LEFT WITHOUT MIRROR IMAGE |
| 1 | 0 | 0 | 270° ROTATION TO LEFT WITH MIRROR IMAGE |

FIG. 16 (B)

$$OUT7 = IN7 \cdot \overline{S2} \cdot \overline{S1} \cdot \overline{S0} + IN6 \cdot \overline{S2} \cdot \overline{S1} \cdot S0 + IN5 \cdot \overline{S2} \cdot S1 \cdot \overline{S0} + IN4 \cdot \overline{S2} \cdot S1 \cdot S0$$
$$+ IN3 \cdot S2 \cdot \overline{S1} \cdot \overline{S0} + IN2 \cdot S2 \cdot \overline{S1} \cdot S0 + IN1 \cdot S2 \cdot S1 \cdot \overline{S0} + IN0 \cdot S2 \cdot S1 \cdot S0$$

$$OUT6 = IN6 \cdot \overline{S2} \cdot \overline{S1} \cdot \overline{S0} + IN7 \cdot \overline{S2} \cdot \overline{S1} \cdot S0 + IN4 \cdot \overline{S2} \cdot S1 \cdot \overline{S0} + IN5 \cdot \overline{S2} \cdot S1 \cdot S0$$
$$+ IN2 \cdot S2 \cdot \overline{S1} \cdot \overline{S0} + IN3 \cdot S2 \cdot \overline{S1} \cdot S0 + IN0 \cdot S2 \cdot S1 \cdot \overline{S0} + IN1 \cdot S2 \cdot S1 \cdot S0$$

$$OUT5 = IN5 \cdot \overline{S2} \cdot \overline{S1} \cdot \overline{S0} + IN4 \cdot \overline{S2} \cdot \overline{S1} \cdot S0 + IN7 \cdot \overline{S2} \cdot S1 \cdot \overline{S0} + IN6 \cdot \overline{S2} \cdot S1 \cdot S0$$
$$+ IN1 \cdot S2 \cdot \overline{S1} \cdot \overline{S0} + IN0 \cdot S2 \cdot \overline{S1} \cdot S0 + IN3 \cdot S2 \cdot S1 \cdot \overline{S0} + IN2 \cdot S2 \cdot S1 \cdot S0$$

$$OUT4 = IN4 \cdot \overline{S2} \cdot \overline{S1} \cdot \overline{S0} + IN5 \cdot \overline{S2} \cdot \overline{S1} \cdot S0 + IN6 \cdot \overline{S2} \cdot S1 \cdot \overline{S0} + IN7 \cdot \overline{S2} \cdot S1 \cdot S0$$
$$+ IN0 \cdot S2 \cdot \overline{S1} \cdot \overline{S0} + IN1 \cdot S2 \cdot \overline{S1} \cdot S0 + IN2 \cdot S2 \cdot S1 \cdot \overline{S0} + IN3 \cdot S2 \cdot S1 \cdot S0$$

$$OUT3 = IN3 \cdot \overline{S2} \cdot \overline{S1} \cdot \overline{S0} + IN2 \cdot \overline{S2} \cdot \overline{S1} \cdot S0 + IN1 \cdot \overline{S2} \cdot S1 \cdot \overline{S0} + IN0 \cdot \overline{S2} \cdot S1 \cdot S0$$
$$+ IN7 \cdot S2 \cdot \overline{S1} \cdot \overline{S0} + IN6 \cdot S2 \cdot \overline{S1} \cdot S0 + IN5 \cdot S2 \cdot S1 \cdot \overline{S0} + IN4 \cdot S2 \cdot S1 \cdot S0$$

$$OUT2 = IN2 \cdot \overline{S2} \cdot \overline{S1} \cdot \overline{S0} + IN3 \cdot \overline{S2} \cdot \overline{S1} \cdot S0 + IN0 \cdot \overline{S2} \cdot S1 \cdot \overline{S0} + IN1 \cdot \overline{S2} \cdot S1 \cdot S0$$
$$+ IN6 \cdot S2 \cdot \overline{S1} \cdot \overline{S0} + IN7 \cdot S2 \cdot \overline{S1} \cdot S0 + IN4 \cdot S2 \cdot S1 \cdot \overline{S0} + IN5 \cdot S2 \cdot S1 \cdot S0$$

$$OUT1 = IN1 \cdot \overline{S2} \cdot \overline{S1} \cdot \overline{S0} + IN0 \cdot \overline{S2} \cdot \overline{S1} \cdot S0 + IN3 \cdot \overline{S2} \cdot S1 \cdot \overline{S0} + IN2 \cdot \overline{S2} \cdot S1 \cdot S0$$
$$+ IN5 \cdot S2 \cdot \overline{S1} \cdot \overline{S0} + IN4 \cdot S2 \cdot \overline{S1} \cdot S0 + IN7 \cdot S2 \cdot S1 \cdot \overline{S0} + IN6 \cdot S2 \cdot S1 \cdot S0$$

$$OUT0 = IN0 \cdot \overline{S2} \cdot \overline{S1} \cdot \overline{S0} + IN1 \cdot \overline{S2} \cdot \overline{S1} \cdot S0 + IN2 \cdot \overline{S2} \cdot S1 \cdot \overline{S0} + IN3 \cdot \overline{S2} \cdot S1 \cdot S0$$
$$+ IN4 \cdot S2 \cdot \overline{S1} \cdot \overline{S0} + IN5 \cdot S2 \cdot \overline{S1} \cdot S0 + IN6 \cdot S2 \cdot S1 \cdot \overline{S0} + IN7 \cdot S2 \cdot S1 \cdot S0$$

FIG. 18

| MODE 2 | MODE 1 | MODE 0 | ROTATION/MIRROR-IMAGE ASSIGNMENT |
|---|---|---|---|
| 0 | 0 | 0 | 270° ROTATION TO LEFT WITH MIRROR IMAGE |
| 0 | 0 | 1 | 90° ROTATION TO LEFT WITHOUT MIRROR IMAGE |
| 0 | 1 | 1 | 0° WITH MIRROR IMAGE |
| 0 | 1 | 0 | 180° ROTATION WITHOUT MIRROR IMAGE |
| 1 | 1 | 0 | 90° ROTATION TO LEFT WITH MIRROR IMAGE |
| 1 | 1 | 1 | 270° ROTATION TO LEFT WITHOUT MIRROR IMAGE |
| 1 | 0 | 1 | 180° ROTATION WITH MIRROR IMAGE |
| 1 | 0 | 0 | 0° WITHOUT MIRROR IMAGE |

FIG. 19

| MODE 2 | MODE 1 | MODE 0 | r/c | ROTATION/MIRROR-IMAGE ASSIGNMENT | DIRECTION OF ACCESS |
|---|---|---|---|---|---|
| 0 | 0 | 0 | 0 | 0° WITHOUT MIRROR IMAGE | DIRECTION OF ROWS |
| 0 | 0 | 0 | 1 | | DIRECTION OF COLUMNS |
| 0 | 0 | 1 | 0 | 0° WITH MIRROR IMAGE | DIRECTION OF ROWS |
| 0 | 0 | 1 | 1 | | DIRECTION OF COLUMNS |
| 0 | 1 | 1 | 0 | 90° ROTATION TO LEFT WITHOUT MIRROR IMAGE | DIRECTION OF ROWS |
| 0 | 1 | 1 | 1 | | DIRECTION OF COLUMNS |
| 0 | 1 | 0 | 0 | 90° ROTATION TO LEFT WITH MIRROR IMAGE | DIRECTION OF ROWS |
| 0 | 1 | 0 | 1 | | DIRECTION OF COLUMNS |
| 1 | 1 | 0 | 0 | 180° ROTATION WITHOUT MIRROR IMAGE | DIRECTION OF ROWS |
| 1 | 1 | 0 | 1 | | DIRECTION OF COLUMNS |
| 1 | 1 | 1 | 0 | 180° ROTATION WITH MIRROR IMAGE | DIRECTION OF ROWS |
| 1 | 1 | 1 | 1 | | DIRECTION OF COLUMNS |
| 1 | 0 | 1 | 0 | 270° ROTATION TO LEFT WITHOUT MIRROR IMAGE | DIRECTION OF ROWS |
| 1 | 0 | 1 | 1 | | DIRECTION OF COLUMNS |
| 1 | 0 | 0 | 0 | 270° ROTATION TO LEFT WITH MIRROR IMAGE | DIRECTION OF ROWS |
| 1 | 0 | 0 | 1 | | DIRECTION OF COLUMNS |

FIG. 22
PRIOR ART

| ROW | RA2~0 | | | COLUMN→1 2 3 4 5 6 7 8 | OUTPUT CHARACTER PATTERN 07 06 05 04 03 02 01 00 |
|---|---|---|---|---|---|
| 1 | 0 0 0 | | | | 0 1 1 1 1 0 0 0 |
| 2 | 0 0 1 | | | | 0 1 0 0 0 1 0 0 |
| 3 | 0 1 0 | | | | 0 1 0 0 0 1 0 0 |
| 4 | 0 1 1 | | | | 0 1 1 1 1 0 0 0 |
| 5 | 1 0 0 | | | | 0 1 0 1 0 0 0 0 |
| 6 | 1 0 1 | | | | 0 1 0 0 1 0 0 0 |
| 7 | 1 1 0 | | | | 0 1 0 0 0 1 0 0 |
| 8 | 1 1 1 | | | | 0 0 0 0 0 0 0 0 |

COLUMN → 1 2 3 4 5 6 7 8
ROW 1–8

231

CRT PICTURE SURFACE

FIG. 31 (A)
PRIOR ART

| BLINK | SECRET | REVERSE | MODE |
|---|---|---|---|
| 0 | 0 | 0 | NORMAL |
| 0 | 0 | 1 | REVERSE |
| 0 | 1 | 0 | SECRET |
| 0 | 1 | 1 | REVERSE/SECRET |
| 1 | 0 | 0 | BLINK |
| 1 | 0 | 1 | REVERSE/BLINK |
| 1 | 1 | 0 | SECRET (=SECRET/BLINK) |
| 1 | 1 | 1 | REVERSE/SECRET (=REVERSE/SECRET/BLINK) |

| ROW | RA 2~0 | 07 | 06 | 05 | 04 | 03 | 02 | 01 | 00 |
|---|---|---|---|---|---|---|---|---|---|
| 1 | 0 0 0 | 0 | 1 | 1 | 1 | 1 | 0 | 0 | 0 |
| 2 | 0 0 1 | 0 | 1 | 0 | 0 | 0 | 1 | 0 | 0 |
| 3 | 0 1 0 | 0 | 1 | 0 | 0 | 0 | 1 | 0 | 0 |
| 4 | 0 1 1 | 0 | 1 | 1 | 1 | 1 | 0 | 0 | 0 |
| 5 | 1 0 0 | 0 | 1 | 0 | 1 | 0 | 0 | 0 | 0 |
| 6 | 1 0 1 | 0 | 1 | 0 | 0 | 1 | 0 | 0 | 0 |
| 7 | 1 1 0 | 0 | 1 | 0 | 0 | 0 | 1 | 0 | 0 |
| 8 | 1 1 1 | 0 | 0 | 0 | 0 | 0 | 0 | 0 | 0 |

COLUMN → 1 2 3 4 5 6 7 8

FIG. 39 (A)
PRIOR ART

| REVERSAL | UNDERLINE | OVERLINE | MODE |
|---|---|---|---|
| 0 | 0 | 0 | NORMAL PRINTING |
| 0 | 0 | 1 | OVERLINE |
| 0 | 1 | 0 | UNDERLINE |
| 0 | 1 | 1 | UNDER/OVERLINE |
| 1 | 0 | 0 | REVERSAL PRINTING |
| 1 | 0 | 1 | OVERLINE IN REVERSAL PRINTING |
| 1 | 1 | 0 | UNDERLINE REVERSAL PRINTING |
| 1 | 1 | 1 | UNDER/OVERLINE IN REVERSAL PRINTING |

FIG. 40 (A)
PRIOR ART
| HALF STEP | DOUBLE PRINTING | MODE |
|---|---|---|
| 0 | 0 | NORMAL PRINTING |
| 0 | 1 | DOUBLE-SIZE PRINTING |
| 1 | 0 | REDUCED-SIZE PRINTING |
| 1 | 1 | EMPHASIZING PRINTING |
FIG. 40 (B)
PRIOR ART
NORMAL PRINTING 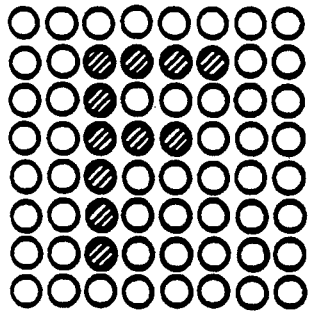
DOUBLE-SIZE PRINTING 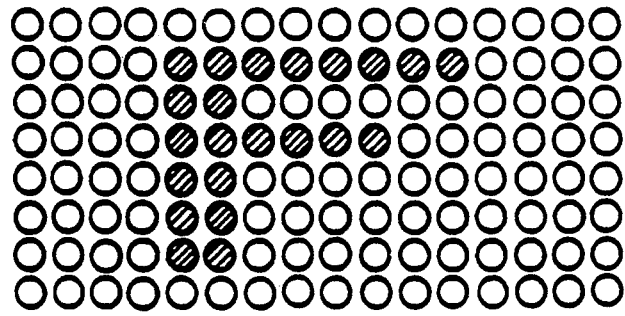
REDUCED-SIZE PRINTING 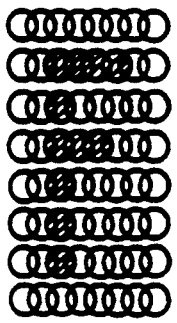
EMPHASIZING PRINTING 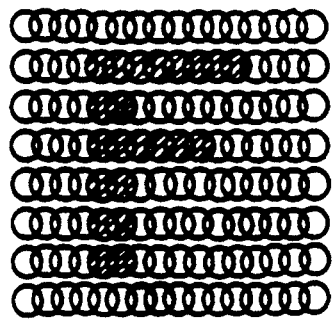

COLUMN → 1 2 3 4 5 6 7 8

| | 1 | 2 | 3 | 4 | 5 | 6 | 7 | 8 |
|---|---|---|---|---|---|---|---|---|
| CA2 | 0 | 0 | 0 | 0 | 1 | 1 | 1 | 1 |
| CA1 | 0 | 0 | 1 | 1 | 0 | 0 | 1 | 1 |
| CA0 | 0 | 1 | 0 | 1 | 0 | 1 | 0 | 1 |

ROW

| | 1 | 2 | 3 | 4 | 5 | 6 | 7 | 8 |
|---|---|---|---|---|---|---|---|---|
| O7 | 0 | 1 | 1 | 1 | 1 | 0 | 0 | 0 |
| O6 | 0 | 1 | 0 | 0 | 0 | 1 | 0 | 0 |
| O5 | 0 | 1 | 0 | 0 | 0 | 1 | 0 | 0 |
| O4 | 0 | 1 | 1 | 1 | 1 | 0 | 0 | 0 |
| O3 | 0 | 1 | 0 | 1 | 0 | 0 | 0 | 0 |
| O2 | 0 | 1 | 0 | 0 | 1 | 0 | 0 | 0 |
| O1 | 0 | 1 | 0 | 0 | 0 | 1 | 0 | 0 |
| O0 | 0 | 0 | 0 | 0 | 0 | 0 | 0 | 0 |

```
COLUMN → 1 2 3 4 5 6 7 8           450
ROW                            07 06 05 04 03 02 01 00
  1    0 0 0                    0  1  1  1  1  0  0  0
  2    0 0 1                    0  1  0  0  0  1  0  0
  3    0 1 0                    0  1  0  0  0  1  0  0
  4    0 1 1                    0  1  1  1  1  0  0  0
  5    1 0 0                    0  1  0  1  0  0  0  0
  6    1 0 1                    0  1  0  0  1  0  0  0
  7    1 1 0                    0  1  0  0  0  1  0  0
  8    1 1 1                    0  0  0  0  0  0  0  0
       ↑ ↑ ↑
       │ │ └── RA0 ⎫
       │ └──── RA1 ⎬ ROW ASSIGNMENT
       └────── RA2 ⎭
```

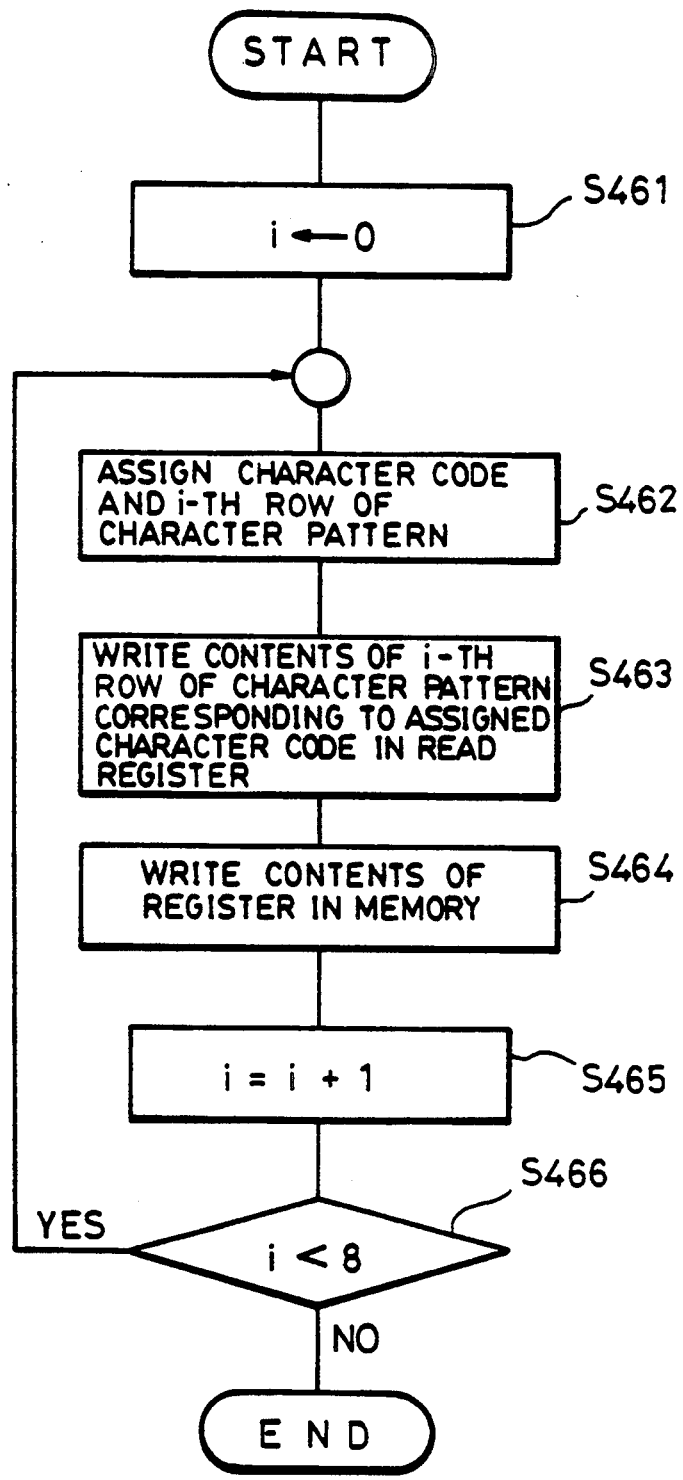

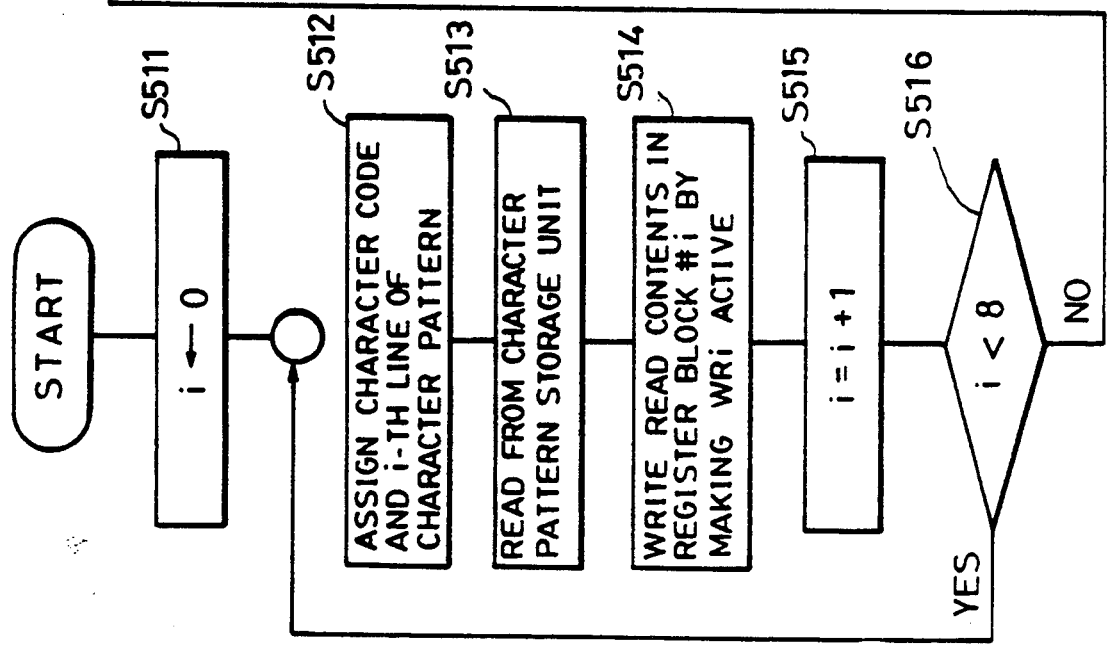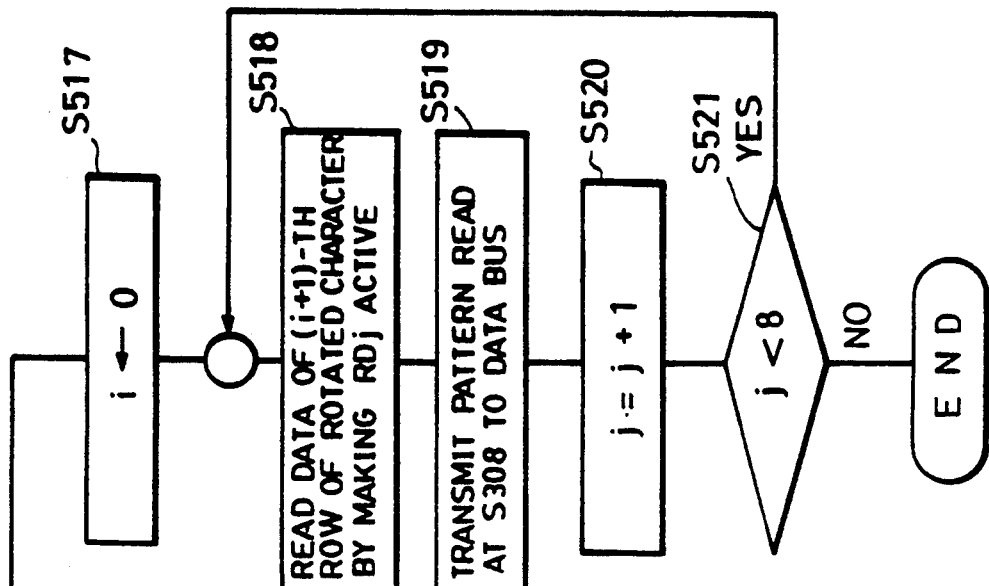
FIG. 51 PRIOR ART

FIG. 54 (B)

$OUT7 = IN7 \cdot \overline{S2} \cdot \overline{S1} \cdot \overline{S0} + IN6 \cdot \overline{S2} \cdot \overline{S1} \cdot S0 + IN5 \cdot \overline{S2} \cdot S1 \cdot \overline{S0} + IN4 \cdot \overline{S2} \cdot S1 \cdot S0$
$\phantom{OUT7 =} + IN3 \cdot S2 \cdot \overline{S1} \cdot \overline{S0} + IN2 \cdot S2 \cdot \overline{S1} \cdot S0 + IN1 \cdot S2 \cdot S1 \cdot \overline{S0} + IN0 \cdot S2 \cdot S1 \cdot S0$ $OUT6 = IN6 \cdot \overline{S2} \cdot \overline{S1} \cdot \overline{S0} + IN7 \cdot \overline{S2} \cdot \overline{S1} \cdot S0 + IN4 \cdot \overline{S2} \cdot S1 \cdot \overline{S0} + IN5 \cdot \overline{S2} \cdot S1 \cdot S0$
$\phantom{OUT6 =} + IN2 \cdot S2 \cdot \overline{S1} \cdot \overline{S0} + IN3 \cdot S2 \cdot \overline{S1} \cdot S0 + IN0 \cdot S2 \cdot S1 \cdot \overline{S0} + IN1 \cdot S2 \cdot S1 \cdot S0$ $OUT5 = IN5 \cdot \overline{S2} \cdot \overline{S1} \cdot \overline{S0} + IN4 \cdot \overline{S2} \cdot \overline{S1} \cdot S0 + IN7 \cdot \overline{S2} \cdot S1 \cdot \overline{S0} + IN6 \cdot \overline{S2} \cdot S1 \cdot S0$
$\phantom{OUT5 =} + IN1 \cdot S2 \cdot \overline{S1} \cdot \overline{S0} + IN0 \cdot S2 \cdot \overline{S1} \cdot S0 + IN3 \cdot S2 \cdot S1 \cdot \overline{S0} + IN2 \cdot S2 \cdot S1 \cdot S0$ $OUT4 = IN4 \cdot \overline{S2} \cdot \overline{S1} \cdot \overline{S0} + IN5 \cdot \overline{S2} \cdot \overline{S1} \cdot S0 + IN6 \cdot \overline{S2} \cdot S1 \cdot \overline{S0} + IN7 \cdot \overline{S2} \cdot S1 \cdot S0$
$\phantom{OUT4 =} + IN0 \cdot S2 \cdot \overline{S1} \cdot \overline{S0} + IN1 \cdot S2 \cdot \overline{S1} \cdot S0 + IN2 \cdot S2 \cdot S1 \cdot \overline{S0} + IN3 \cdot S2 \cdot S1 \cdot S0$ $OUT3 = IN3 \cdot \overline{S2} \cdot \overline{S1} \cdot \overline{S0} + IN2 \cdot \overline{S2} \cdot \overline{S1} \cdot S0 + IN1 \cdot \overline{S2} \cdot S1 \cdot \overline{S0} + IN0 \cdot \overline{S2} \cdot S1 \cdot S0$
$\phantom{OUT3 =} + IN7 \cdot S2 \cdot \overline{S1} \cdot \overline{S0} + IN6 \cdot S2 \cdot \overline{S1} \cdot S0 + IN5 \cdot S2 \cdot S1 \cdot \overline{S0} + IN4 \cdot S2 \cdot S1 \cdot S0$ $OUU2 = IN2 \cdot \overline{S2} \cdot \overline{S1} \cdot \overline{S0} + IN3 \cdot \overline{S2} \cdot \overline{S1} \cdot S0 + IN0 \cdot \overline{S2} \cdot S1 \cdot \overline{S0} + IN1 \cdot \overline{S2} \cdot S1 \cdot S0$
$\phantom{OUU2 =} + IN6 \cdot S2 \cdot \overline{S1} \cdot \overline{S0} + IN7 \cdot S2 \cdot \overline{S1} \cdot S0 + IN4 \cdot S2 \cdot S1 \cdot \overline{S0} + IN5 \cdot S2 \cdot S1 \cdot S0$ $OUT1 = IN1 \cdot \overline{S2} \cdot \overline{S1} \cdot \overline{S0} + IN0 \cdot \overline{S2} \cdot \overline{S1} \cdot S0 + IN3 \cdot \overline{S2} \cdot S1 \cdot \overline{S0} + IN2 \cdot \overline{S2} \cdot S1 \cdot S0$
$\phantom{OUT1 =} + IN5 \cdot S2 \cdot \overline{S1} \cdot \overline{S0} + IN4 \cdot S2 \cdot \overline{S1} \cdot S0 + IN7 \cdot S2 \cdot S1 \cdot \overline{S0} + IN6 \cdot S2 \cdot S1 \cdot S0$ $OUT0 = IN0 \cdot \overline{S2} \cdot \overline{S1} \cdot \overline{S0} + IN1 \cdot \overline{S2} \cdot \overline{S1} \cdot S0 + IN2 \cdot \overline{S2} \cdot S1 \cdot \overline{S0} + IN3 \cdot \overline{S2} \cdot S1 \cdot S0$
$\phantom{OUT0 =} + IN4 \cdot S2 \cdot \overline{S1} \cdot \overline{S0} + IN5 \cdot S2 \cdot \overline{S1} \cdot S0 + IN6 \cdot S2 \cdot S1 \cdot \overline{S0} + IN7 \cdot S2 \cdot S1 \cdot S0$

FIG. 55

| WLNAn | IN7 | IN6 | IN5 | IN4 | IN3 | IN2 | IN1 | IN0 |
|---|---|---|---|---|---|---|---|---|
| 000 | $d_{07}$ | $d_{06}$ | $d_{05}$ | $d_{04}$ | $d_{03}$ | $d_{02}$ | $d_{01}$ | $d_{00}$ |
| 001 | $d_{17}$ | $d_{16}$ | $d_{15}$ | $d_{14}$ | $d_{13}$ | $d_{12}$ | $d_{11}$ | $d_{10}$ |
| 010 | $d_{27}$ | $d_{26}$ | $d_{25}$ | $d_{24}$ | $d_{23}$ | $d_{22}$ | $d_{21}$ | $d_{20}$ |
| 011 | $d_{37}$ | $d_{36}$ | $d_{35}$ | $d_{34}$ | $d_{33}$ | $d_{32}$ | $d_{31}$ | $d_{30}$ |
| 100 | $d_{47}$ | $d_{46}$ | $d_{45}$ | $d_{44}$ | $d_{43}$ | $d_{42}$ | $d_{41}$ | $d_{40}$ |
| 101 | $d_{57}$ | $d_{56}$ | $d_{55}$ | $d_{54}$ | $d_{53}$ | $d_{52}$ | $d_{51}$ | $d_{50}$ |
| 110 | $d_{67}$ | $d_{66}$ | $d_{65}$ | $d_{64}$ | $d_{63}$ | $d_{62}$ | $d_{61}$ | $d_{60}$ |
| 111 | $d_{77}$ | $d_{76}$ | $d_{75}$ | $d_{74}$ | $d_{73}$ | $d_{72}$ | $d_{71}$ | $d_{70}$ |

— 551

INPUT IMAGE DATA
8 PICTURE ELEMENTS × 8 LINES

⇓ REARRANGEMENT

| MAn | OUT7 | OUT6 | OUT5 | OUT4 | OUT3 | OUT2 | OUT1 | OUT0 |
|---|---|---|---|---|---|---|---|---|
| 000 | $d_{07}$ | $d_{06}$ | $d_{05}$ | $d_{04}$ | $d_{03}$ | $d_{02}$ | $d_{01}$ | $d_{00}$ |
| 001 | $d_{16}$ | $d_{17}$ | $d_{14}$ | $d_{15}$ | $d_{12}$ | $d_{13}$ | $d_{10}$ | $d_{11}$ |
| 010 | $d_{25}$ | $d_{24}$ | $d_{27}$ | $d_{26}$ | $d_{21}$ | $d_{20}$ | $d_{23}$ | $d_{22}$ |
| 011 | $d_{34}$ | $d_{35}$ | $d_{36}$ | $d_{37}$ | $d_{30}$ | $d_{31}$ | $d_{32}$ | $d_{33}$ |
| 100 | $d_{43}$ | $d_{42}$ | $d_{41}$ | $d_{40}$ | $d_{47}$ | $d_{46}$ | $d_{45}$ | $d_{44}$ |
| 101 | $d_{52}$ | $d_{53}$ | $d_{50}$ | $d_{51}$ | $d_{56}$ | $d_{57}$ | $d_{54}$ | $d_{55}$ |
| 110 | $d_{61}$ | $d_{60}$ | $d_{63}$ | $d_{62}$ | $d_{65}$ | $d_{64}$ | $d_{67}$ | $d_{66}$ |
| 111 | $d_{70}$ | $d_{71}$ | $d_{72}$ | $d_{73}$ | $d_{74}$ | $d_{75}$ | $d_{76}$ | $d_{77}$ |

— 552

REARRANGED IMAGE DATA TO BE WRITTEN WITHIN MAIN STORAGE

STORE IN STORAGE UNIT #7, #6, #5, #4, #3, #2, #1, #0

FIG. 56(A)

| MODE 2 | MODE 1 | MODE 0 | ROTATION/MIRROR-IMAGE ASSIGNMENT |
|---|---|---|---|
| 0 | 0 | 0 | 0° WITHOUT MIRROR IMAGE |
| 0 | 0 | 1 | 0° WITH MIRROR IMAGE |
| 0 | 1 | 1 | 90° ROTATION TO LEFT WITHOUT MIRROR IMAGE |
| 0 | 1 | 0 | 90° ROTATION TO LEFT WITH MIRROR IMAGE |
| 1 | 1 | 0 | 180° ROTATION WITHOUT MIRROR IMAGE |
| 1 | 1 | 1 | 180° ROTATION WITH MIRROR IMAGE |
| 1 | 0 | 1 | 270° ROTATION TO LEFT WITHOUT MIRROR IMAGE |
| 1 | 0 | 0 | 270° ROTATION TO LEFT WITH MIRROR IMAGE |

0° WITHOUT MIRROR IMAGE

BCAn = A6~0

BRAn = A15~10

0° WITH MIRROR IMAGE

BCAn = $\overline{A6\sim0}$

BRAn = A15~10

90° TO LEFT WITHOUT MIRROR IMAGE

BCAn = A15~9
BRAn = $\overline{A5\sim0}$

90° TO LEFT WITH MIRROR IMAGE

BCAn = $\overline{A15\sim9}$
BRAn = $\overline{A5\sim0}$

180° WITHOUT MIRROR IMAGE $BCAn = \overline{A6\sim0}$ $BRAn = \overline{A15\sim10}$

180° WITH MIRROR IMAGE $BCAn = A6\sim0$ $BRAn = \overline{A15\sim10}$

270° TO LEFT WITHOUT
MIRROR IMAGE $BCAn = \overline{A15\sim9}$ $BRAn = A5\sim0$

270° TO LEFT WITH
MIRROR IMAGE $BCAn = A15\sim9$ $BRAn = A5\sim0$

FIG. 69

ASSIGNMENT OF 0°

| RLNA 2~0 | #7 | #6 | #5 | #4 | #3 | #2 | #1 | #0 |
|---|---|---|---|---|---|---|---|---|
| 000 | 000 | 000 | 000 | 000 | 000 | 000 | 000 | 000 |
| 001 | 001 | 001 | 001 | 001 | 001 | 001 | 001 | 001 |
| 010 | 010 | 010 | 010 | 010 | 010 | 010 | 010 | 010 |
| 011 | 011 | 011 | 011 | 011 | 011 | 011 | 011 | 011 |
| 100 | 100 | 100 | 100 | 100 | 100 | 100 | 100 | 100 |
| 101 | 101 | 101 | 101 | 101 | 101 | 101 | 101 | 101 |
| 110 | 110 | 110 | 110 | 110 | 110 | 110 | 110 | 110 |
| 111 | 111 | 111 | 111 | 111 | 111 | 111 | 111 | 111 |

ASSIGNMENT OF 90° TO LEFT

| RLNA 2~0 | #7 | #6 | #5 | #4 | #3 | #2 | #1 | #0 |
|---|---|---|---|---|---|---|---|---|
| | | | | MA2~MA0 | | | | |
| 000 | 111 | 110 | 101 | 100 | 011 | 010 | 001 | 000 |
| 001 | 110 | 111 | 100 | 101 | 010 | 011 | 000 | 001 |
| 010 | 101 | 100 | 111 | 110 | 001 | 000 | 011 | 010 |
| 011 | 100 | 101 | 110 | 111 | 000 | 001 | 010 | 011 |
| 100 | 011 | 010 | 001 | 000 | 111 | 110 | 101 | 100 |
| 101 | 010 | 011 | 000 | 001 | 110 | 111 | 100 | 101 |
| 110 | 001 | 000 | 011 | 010 | 101 | 100 | 111 | 110 |
| 111 | 000 | 001 | 0 0 | 011 | 100 | 101 | 110 | 111 |

FIG. 72(A)

ASSIGNMENT OF 180°

| RLNA 2~0 | #7 | #6 | #5 | #4 | MA2~MA0 #3 | #2 | #1 | #0 |
|---|---|---|---|---|---|---|---|---|
| 000 | 111 | 111 | 111 | 111 | 111 | 111 | 111 | 111 |
| 001 | 110 | 110 | 110 | 110 | 110 | 110 | 110 | 110 |
| 010 | 101 | 101 | 101 | 101 | 101 | 101 | 101 | 101 |
| 011 | 100 | 100 | 100 | 100 | 100 | 100 | 100 | 100 |
| 100 | 011 | 011 | 011 | 011 | 011 | 011 | 011 | 011 |
| 101 | 010 | 010 | 010 | 010 | 010 | 010 | 010 | 010 |
| 110 | 001 | 001 | 001 | 001 | 001 | 001 | 001 | 001 |
| 111 | 000 | 000 | 000 | 000 | 000 | 000 | 000 | 000 |

FIG. 73(A)

ASSIGNMENT OF 270° TO LEFT

| RLNA 2~0 | #7 | #6 | #5 | #4 | #3 | #2 | #1 | #0 |
|---|---|---|---|---|---|---|---|---|
| | | | | MA2~MA0 | | | | |
| 000 | 000 | 001 | 010 | 011 | 100 | 101 | 110 | 111 |
| 001 | 001 | 000 | 011 | 010 | 101 | 100 | 111 | 110 |
| 010 | 010 | 011 | 000 | 001 | 110 | 111 | 100 | 101 |
| 011 | 011 | 010 | 001 | 000 | 111 | 110 | 101 | 100 |
| 100 | 100 | 101 | 110 | 111 | 000 | 001 | 010 | 011 |
| 101 | 101 | 100 | 111 | 110 | 001 | 000 | 011 | 010 |
| 110 | 110 | 111 | 100 | 101 | 010 | 011 | 000 | 001 |
| 111 | 111 | 110 | 101 | 100 | 011 | 010 | 001 | 000 |

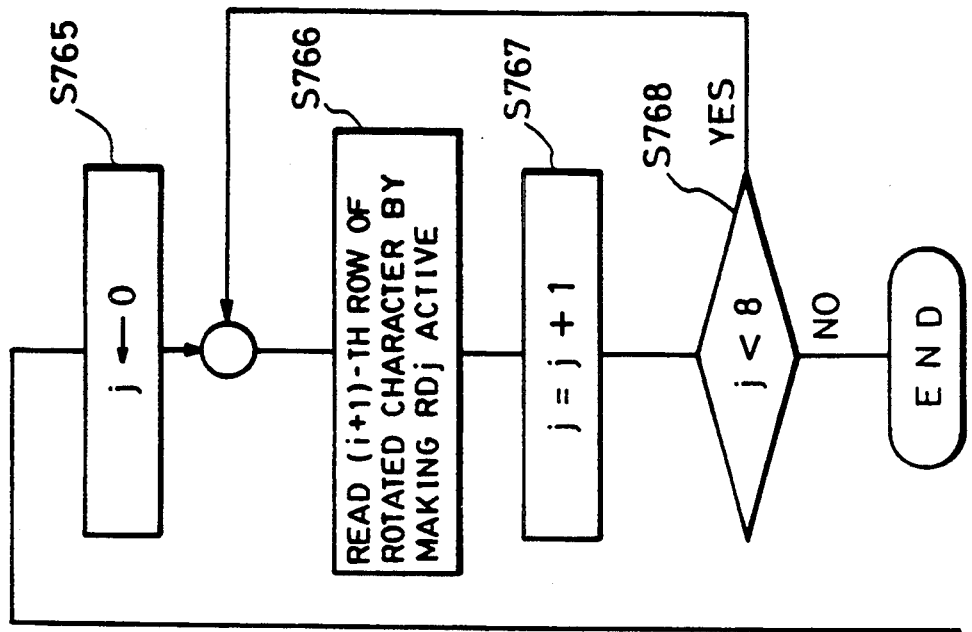
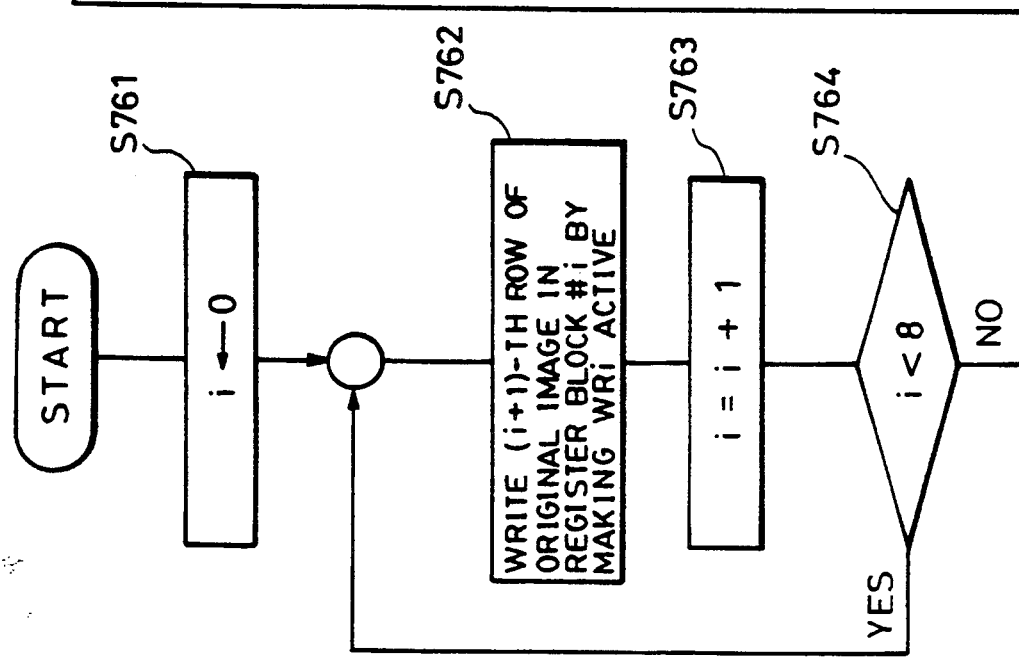
FIG. 76 PRIOR ART

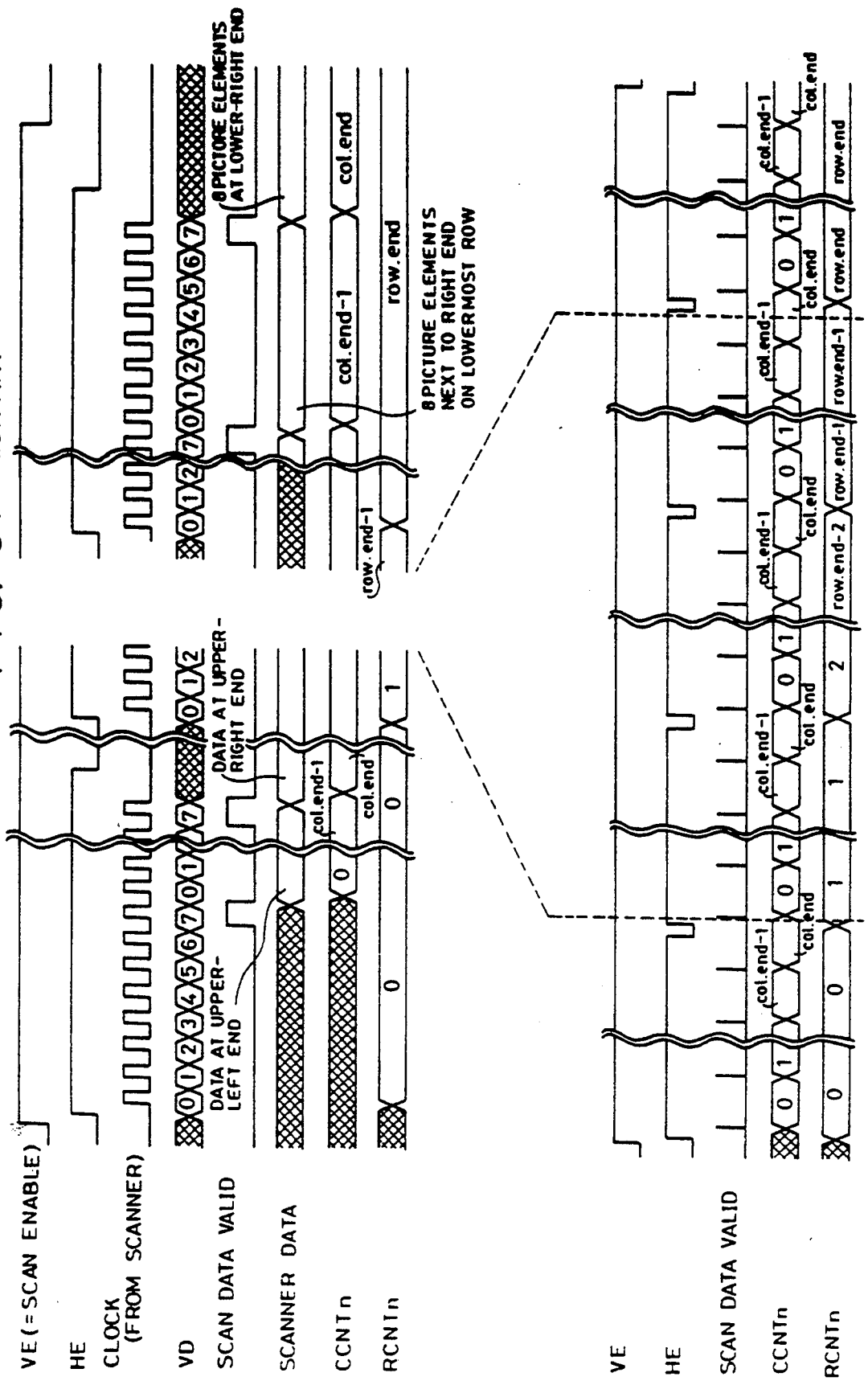

IMAGE PROCESSING APPARATUS

This application is a continuation of application Ser. No. 07/721,093 filed Jun. 13, 1991, now abandoned.

BACKGROUND OF THE INVENTION

1. Field of the Invention

This invention relates to an apparatus for processing an image, such as a character pattern or the like, and more particularly, to an image processing apparatus for generating a pattern of a rotated character or a mirror-image character, or the like.

2. Description of the Related Art

In a conventional character pattern generator of an image processing apparatus, a character code and row assignment are received as address inputs, and the pattern of the corresponding row of the character is obtained as data. FIG. 21 illustrates a conventional character pattern generator for generating a character pattern configured by a dot pattern comprising 8 dots×8 dots. In such a character pattern generator 210, the pattern of the corresponding row of a character is output using a character code and row assignments (RA2-RA0). In the case shown in FIG. 21, portion #7 of a storage unit 211 stores the first column of the character pattern, portion #6 stores the second column of the character pattern, and portions #5-#0 store information in the same manner, each corresponding to a column of the character pattern. A character pattern "R" shown in FIG. 22 will now be specifically explained. When reading the character pattern, a character code corresponding to the character pattern "R" is first input to a character-code input unit 214. Subsequently, row assigning codes (RA2, RA1, RA0) are input to a row-assigning-code input unit 212. At that time, if the line assigning codes are (RA2, RA1, RA0)=(0, 0, 0), the left-end pattern, the second pattern from the left, the third pattern from the left, and further in the same manner the right-end pattern of the first row of the character pattern "R" are output from output port Q7 of portion #7, Q6 of portion #6, Q5 of portion #5, and further in the same manner Q0 of portion #0 of the storage unit 211, respectively. Character output pattern 213 becomes (07, 06, 05, 04, 03, 02, 01, 00)=(0, 1, 1, 1, 1, 0, 0, 0), which is the pattern of the first row of the character pattern "R". If the row assigning codes are (RA2, RA1, RA0)=(0, 0, 1), character output pattern 213 outputs (07, 06, 05, 04, 03, 02, 01, 00)=(0, 1, 0, 0, 0, 1, 0, 0), which is the pattern of the second row of the character pattern "R". By these sequentially changing the row assigning codes as (RA2, RA1, RA0)=(0, 0, 0)−(1, 1, 1), a pattern for 8 rows of the character code "R" can be obtained. By arranging the output patterns as shown in FIG. 22, character pattern 221 for the character "R" can be obtained. The relationship between the row assigning codes (RA2, RA1, RA0) and the rows is as shown in FIG. 22.

However, the above-described conventional approach has the disadvantages that, when trying to obtain a rotated/mirror-image character pattern for the same character pattern, complicated additional circuitry is needed, and processing time is increased.

In order to explain the above-described problems, a case wherein character pattern 231 is obtained by rotating the character pattern "R", as shown in FIG. 23, will be considered. The i-th (i=1-8) row of the rotated character corresponds to the i-th column of the original character pattern "R" shown in FIG. 22. In order to obtain the pattern of the third row of the rotated character, the row assigning codes first assign (RA2, RA1, RA0)=(0, 0, 0) for the original character pattern "R" to obtain the output of character output pattern 05. This output corresponds to the right-end pattern of the third row of the rotated character. Subsequently, the row assigning codes assign (RA2, RA1, RA0)=(0, 0, 1) to obtain the output of character output pattern 05. This output corresponds to the second pattern from the right end of the third row of the rotated character. In the same manner, by sequentially changing the row assigning code as (0, 1, 0), (0, 1, 1), (1, 0, 0) (1, 0, 1), (1, 1, 0), (1, 1, 1), latching the outputs of character output pattern 05 at respective accesses, and sequentially arranging the outputs, the pattern of the third row of the rotated character is finally obtained. For other rows, character output patterns are obtained in the same manner as when obtaining the third row of the rotated character.

As described above, in order to obtain the pattern of a certain row of the rotated character, 8 successive accesses are needed, and circuitry for latching one bit necessary at each access and sequentially rearranging latched bits is also needed. Of course, this case represents a character pattern comprising 8 dots×8 dots. As the dot-matrix size increase, the number of accesses required for each such rotational or other special output also increases. In order to avoid this problem, it is possible to consider a method wherein the pattern of the rotated character is stored separately, as another character (i.e., "R" is stored twice, once upright and once in the rotated position). However, this approach is not practical because the capacity of the storage unit for storing the character patterns must be greatly increased.

A conventional display control device of an image processing apparatus for storing a character pattern in a video RAM and controlling the display of the pattern is configured as shown in FIG. 29. A displaying operation in such a display control device 290 is performed according to the following procedure. That is, a character pattern generator 293 outputs dot pattern corresponding to a character code according to the assigned character code and row assigning codes. Subsequently, a mode control unit 294 processes the character pattern in accordance with assigned attribute data, and outputs the processed character pattern to a parallel/serial conversion unit 295. Finally, the output is transmitted to a display device 291 via a video signal generation unit 296. As a result, the display device 291 performs display in accordance with the output pattern.

A conventional mode control unit has a circuit configuration as shown in FIG. 30. In such a circuit configuration, the mode control unit can select reverse, secret, blink and a combination of these elements as a display mode.

If it is assured that the above-described modes, reverse, select and blink, are controlled with three kinds of digital signals (0 or 1) independent of one another, in the mode control unit shown in FIG. 30, the signals at "pattern in" are output to "pattern out" when the signals reverse, secret and blink are all 0. Hence, a character pattern stored in the character pattern generator is displayed as it is (this mode will be hereinafter termed the normal mode). When only the reverse signal is 1, the input at "pattern in" is inverted by an exclusive OR circuit (hereinafter termed an exor circuit) without being marked by a logical product circuit (hereinafter termed an AND circuit), and output to "pattern out".

Hence, a reversed character pattern is displayed (this mode will be hereinafter termed a reverse mode). When only the secret signal is 1, the input at "pattern in" is masked by the AND circuit, and is output to "pattern out" without being inverted by the exor circuit. Hence, a signal "0" is transferred to the display device from the output "pattern out" irrespective of the character pattern (this mode will be hereinafter termed a secret mode). When only the blink signal is 1, the input at "pattern in" is periodically masked by a blink gate signal in the AND circuit, and is not inverted by the exor circuit. Hence, the character pattern and an all "0" pattern are periodically and alternately transferred to the display device (this mode will be hereinafter termed a blink mode). An explanation may be provided in the same manner when any two signals from among the reverse, secret and blink signals are 1, or when all three signals are 1.

If the above-described control is applied to the case of the character pattern "R", any mode may be selected from 8 kinds of mode, as shown in FIG. 31(A), the displays of the character pattern "R" being shown in FIG. 31(B).

An explanation will now be provided how a character pattern is stored and output in the character pattern generator 293. FIG. 32 shows a storage unit which stores a character pattern configured by a dot pattern of 8 dots×8 dots for one character. FIG. 33 shows a dot pattern of the character pattern "R" considered in this case. In a conventional approach, a character pattern, for example "R", is stored as it is. That is, portions #7, #6, . . . #0 of a storage unit 321 store only dot patterns of the first column, the second column etc., and the eighth column of respective rows of the character pattern, respectively. Accordingly, when reading the character pattern "R" using row assigning codes 322 comprising 3 bits, if, for example, the fifth row is assigned as (RA2, RA1, RA0)=(1, 0, 0), output 193 of the storage unit becomes (07, 06, 05, 04, 03, 02, 01, 00)=(0, 1, 0, 1, 0, 0, 0, 0), and the dot pattern of the fifth row is output as it is. By thus storing the character pattern as it is, and outputting a dot pattern for every row using row assigning codes, the character pattern is generated.

In the above-described conventional approach however, although it is possible to perform display such as reverse, secret, blink or the like of the corresponding character pattern using one character pattern, in order to display a rotated or mirror-image character pattern, the rotated/mirror-image character pattern must be stored in the character pattern generator in addition to the original character pattern. Accordingly, when displaying a rotated/mirror-image character pattern on the display device, the conventional approach has the disadvantage of greatly increasing the required capacity of the character pattern storage unit.

In a conventional printer device of an image processing apparatus, a character code and its attribute data are converted into the corresponding dot pattern having the form of a matrix according to print data, and the converted dot pattern is transmitted to a print head to perform printing. FIG. 37 is a block diagram showing an example of the configuration of a conventional printer device. A printing operation in such a printer device is performed in the following manner. That is, a character pattern generator 373, serving as a component of a printer device 370, outputs a dot pattern corresponding to an assigned row of a character pattern corresponding to an assigned character code according to the assigned character code and row assigning codes. Subsequently, a mode control unit 374 processes the character pattern in accordance with assigned attribute data, and outputs the processed character pattern to a print head 371 via a print head driver unit 375. As a result, the print head 371 performs printing in accordance with the output pattern.

A conventional mode control unit has, for example, a circuit configuration as shown in FIG. 38. In such a circuit configuration, the mode control unit can select underline, overline, black-and-white reversal of printing (hereinafter termed reversal) and a combination of these elements as a print mode.

If it is assumed that the above-described modes, underline, overline and reversal, are controlled by three kinds of digital signals (0 or 1) independent of one another, in the mode control unit shown in FIG. 38, the signals at "pattern in" are output to "pattern out" when the signals underline, overline and reversal are all 0. Hence, a character pattern stored in the character pattern generator is displayed as it is. When only the reverse signal is 1, the input at "pattern in" is inverted by an exclusive OR circuit, and is output to "pattern out". Hence, a reversed character pattern is printed. When only the underlined signal is 1, the output at "pattern out" of the lowermost row becomes "1" by a logical sum circuit irrespective of the pattern, and the input signals at "pattern in" are output to "pattern out" as they are for other patterns. Hence, a character pattern having an underline is printed (this printing will be hereinafter termed underline). When only the overline signal is 1, a patten wherein the uppermost row is "1" is output to "pattern out" in the same manner as in the underline mode. Hence, a character pattern having an overline is printed (this printing will be hereinafter termed overline). An explanation may be provided in the same manner when any two signals from among the underline, overline and reversal signals are 1, or when all three signals are 1.

If the above-described control is applied to the case of a character pattern "F", any mode may be selected from 8 kinds of modes shown in FIG. 39(A). If printing is performed using such modes, the character pattern "F" appears with the patterns shown in FIG. 39(B).

In the case of normal printing, a print head configured by 8 dots×8 dots for one character will now be considered.

A conventional print head is configured so as to vertically arrange print storage, and provide printing mechanisms for respective columns (in this case, the number of printing mechanisms is 8). Referring to FIG. 37, the movement of the print head 371 is controlled by a print head movement control unit 376. The print head movement control unit 376 provides two control digital signals, i.e., a half-step control signal and a double-printing control signal for the print head 371. By combining 0 and 1 of such control signals, print head control can be performed with four kinds of modes as shown in FIG. 40(A). First, when performing normal printing, ever time each column of a character pattern is printed, the print head movement control unit 376 moves the print head in units of a step, and completes printing of one character by printing 8 columns. Subsequently, by printing respective columns of the character pattern twice (double printing), a character pattern having a width twice that for normal printing can be printed (this printing will be hereinafter termed double-size printing). On the contrary, by making the movement of the print head half that for normal printing (half step), a character having a width half that obtained in normal printing can be printed (this printing will be hereinafter termed reduced-size printing). Further, if the print head is moved at half step and double-size printing is performed, a character having the same width as in normal printing and a print density twice that of normal printing can be printed (this printing will be hereinafter termed emphasizing printing). FIG. 40(B) shows an example wherein the above-described control is applied using the character pattern "F".

An explanation will now be provided how a character pattern is stored and output in the character pattern generator 373. FIG. 41(A) shows a storage unit which stores a character pattern configured by a dot pattern of 8 dots×8 dots for one character. FIG. 41(B) shows a dot pattern of the character pattern "R" considered in this case. In a conventional approach, a character pattern, for example "R", is stored as it is. That is, portions #7, #6, ... #0 of a storage unit 411 store only dot patterns of the first row, the second row, etc., and the eighth row of respective columns of the character pattern, respectively. Accordingly, when reading the character pattern "R" using a column assigning code 412 comprising 3 bits, if, for example, the fifth column is assigned as (CA2, CA1, CA0)=(1, 0, 0), output 183 of the storage unit becomes (07, 06, 05, 04, 03, 02, 01, 00)=(1, 0, 0, 1, 0, 1, 0, 0), and the dot pattern of the fifth column is output as it is. By thus storing the character pattern as it is, and outputting a dot pattern for respective columns using column assigning codes, the character pattern is generated.

In the above-described conventional approach, however, although it is possible to perform printing, such as reversal, overline, underline, double-size printing, reduced-size printing, emphasizing printing or the like, of the corresponding character pattern using one character pattern, in order to print a rotated or mirror-image character pattern, the rotated or mirror-image character pattern must be stored in the character pattern generator in addition to the original character pattern. Accordingly, when printing a rotated/mirror-image character pattern by the printer device, the conventional approach has the disadvantage of greatly increasing the required capacity of the character pattern storage unit.

In a conventional image processing apparatus for processing a figure pattern or the like, when, for example, writing a character pattern in a memory as image information, or writing the character pattern in a frame memory in order to display it, the character pattern is read from a character pattern storage unit, and written in these memories. A conventional character pattern storage unit 440 of an image processing apparatus has a configuration as shown in FIG. 44. When a character code and a row (raster) are assigned, the portion of the row of the character pattern corresponding to the character code is output. Accordingly, when writing a character pattern subjected to pattern expansion in the memory using such a character pattern storage unit as unit 440, processing as shown in the flowchart of FIG. 46 is performed.

For example, a case wherein a character "R" having a character pattern 450 comprising 8 dots×8 dots shown in FIG. 45 is read and written in a memory will be considered. By assigning a character code and row assignment (RA2, RA1, RA0)=(0, 0, 0) in the character pattern storage unit 440, the left-end dot, the second dot from the left, the third dot from the left, and further in the same manner the right-end dot of the first row of the character pattern "R" shown in FIG. 45 are obtained from output ports Q7 of portion #7, Q6 of portion #6, Q5 of portion #5, etc., and Q0 of portion #0 of the storage unit 440, respectively. Character output pattern 141 becomes (07, 06, 05, 04, 04, 03, 02, 01, 00)=(0, 1, 1, 1, 1, 0, 0, 0). Subsequently, by assigning that (RA2, RA1, RA0)=(0, 0, 1), the pattern of the second row of the character pattern "R" (07, 06, 05, 04, 03, 02, 01, 00)=(0, 1, 0, 0, 0, 1, 0, 0) is output. This pattern is written in the next portion of the memory via a register. By thus outputting row assignment (RA2, RA1, RA0)=(0, 0, 0)–(1, 1, 1), and sequentially writing the respective output character patterns 141 in the memory, a pattern for 8 rows of the character code "R" is read and written.

Next a case wherein, for example, a character pattern 470 shown in FIG. 47 obtained by rotating the character pattern "R" shown in FIG. 45 is written in the memory will be considered. In gross, two conventional methods are present: one using software, and other using dedicated hardware.

First, an explanation will be provided of the method using software with reference to the flowchart of FIG. 48(A). First, a character code and row assignment i (i=)0–7) are assigned in the character pattern storage unit 440 (S482). As an example, the character pattern 450 shown in FIG. 45 is read for the amount of one row, and stored in register 1 (S483). By repeating this operation 8 times, the entire character pattern shown in FIG. 45 is stored in registers 0–7 (S482–S485). Subsequently, by shifting register 0 to the left by one bit, the left-end bit of the pattern is written in register c (1-bit register) (S488). As shown in FIG. 48(B), the contents of register c and register 8 are shifted to the right by one bit so as to shift the value of register c to the most significant bit (MSB) (b7) of register 8 (S489). Subsequently, in the same manner, the contents of register 1 are shifted to the left by one bit, and the contents of register 8 are shifted to the right by one bit, whereby the left-end bit of pattern data stored in register 1 is shifted to the MSB of register 8. By repeating such operation to register 7, the left-end bits (MSBs) of respective patterns stored in registers 0–7 are stored, and arranged in register 8, and all the contents of registers 0–7 are shifted to the left by one bit. By writing the contents of register 8 at that time, the first row of the pattern 470 shown in FIG. 47 is written in the memory (S492). Further, in the same manner, by repeating the shift operation of registers 0–7 and register 8 eight times at S 488–S491, the pattern data 470 shown in FIG. 47 are written in the memory at step S492. Thus, pattern data obtained by rotating the character pattern 450 shown in FIG. 45 90° to the right are formed in the memory.

On the other hand, the circuit configuration of suitable known dedicated hardware is as shown in FIG. 49. FIG. 51 shows a flowchart of rotation processing by a write/read control unit. The hardware comprises a pattern rotator 490 for rotating a pattern 90° clockwise. First, a pattern is read by performing row assignment i (i=0–7) from the above-described character pattern storage unit 440 (S512–S513). By making a write control signal $WR_i$ for writing the contents of the read pattern in register block #i of the pattern rotator active, pattern data for one row are written in the register block #i (S514). Each register block 502 has a configuration as shown in FIG. 50, and includes an 8-bit register 501. After writing all the character pattern in register block 491 by making write control signals $WR_i$ (i=0-7) active, data stored in the register block 491 are read by making read control signals $RD_0$ active. At that time, by making the signal $RD_0$ active, the contents (8 bits) of bit 7 (the most significant bit) of the register 501 of each register block are output from each register block and transmitted to data bus 493. Hence, the pattern of the first row of the rotated character shown in FIG. 47 is obtained. In the same manner, by reading data by making a read control signal $RD_1$ active, the pattern of the second row of the rotated character shown in FIG. 47 is obtained. By writing data thus read by sequentially making read control signals $RD_0$-$RD_7$ active in the memory, the rotation operation is completed (S517-S521), and the character pattern shown in FIG. 47 is finally obtained.

The above-described conventional approach, however, has the following disadvantages. That is, in order to obtain the pattern of a rotated or mirror-image character (90° rotation to the right in the above-described example), software or hardware processing is necessary. In software processing, the burden on the bus master (for example, a CPU) is increased, and processing speed becomes much slower than when obtaining the pattern of the original character. In hardware processing, the configuration of hardware (the pattern rotator 490) becomes complicated. Particularly when the size of a character pattern is increased, the overall circuit complexity rises due to the number of bits of a register, selector circuits within respective register blocks, and the circuit configuration of a write/read control unit. Also in this case, processing speed becomes more or less slower than the processing speed of the original character by the amount of writing and reading operation in the pattern rotator. Furthermore, when a plurality of pattern rotators of a number of bits smaller than the size of the character pattern are used in order to reduce the scale of the hardware, (i.e., the pattern rotator, one character pattern must be dealt with dividing it in a plurality of portions, thereby increasing processing time.

Another possible approach wherein a rotated or mirror-image character is registered with another character code and stored in a character storage unit drastically increases the required storage capacity, and so is not practical.

If the rotation of an image is performed only by software, much time is needed for processing. Hence, in most cases, dedicated hardware for image rotation is used. For example, a conventional 8×8 (indicating an image comprising 8 lines×8 picture elements per line) image rotating device 740 is configured as shown in FIG. 74, and provides an image obtained by rotating an 8×88 image 90° clockwise.

An explanation will now be provided of processing for providing an image obtained by rotating 8×8 image data 90° clockwise, or to the right, using the above-described image rotating device 740, with reference to a flowchart of rotation processing by a write-read control unit 743 shown in FIG. 76. First, the contents of the i-th row (i=0-7) counted from the head of the image data are written in register block #i of the image rotating device 740 by making the write control signal $WR_i$ active (S102). Picture elements of the image data correspond to $D_7$-$D_0$ from the left in an input buffer unit 744 and a register block 742. As shown in FIG. 75, each register block 741 includes an 8-bit register 751. After writing all the image data for 8 rows in the image rotating device 740 by making the write control signal $WR_i$ (i=0-7) active (S762-S764), data stored in the corresponding register address of the register block 742 are read by making the read control signal $RD_0$ active. At that time, as can be understood from FIG. 75, if the signal $RD_0$ is made active, register $R_7$ for the seventh bit, which is the most significant bit, of each register block 741 becomes active, and the contents (8 bits) of bit 7 ($D_7$) are output from each register block 741. As a result, the left-end data of each row of the original image, that is, data of the first row of an image obtained by rotating the original image 90° clockwise can be obtained. In the same manner, by reading data by making the read control signal $RD_1$ active, data of the second row of the image rotated 90° clockwise can be obtained. By outputting data thus read by sequentially making signals $RD_0$-$RD_7$ active via an output data buffer 745 (S766-S768), the output data have been rotated 90° clockwise relative to the input data.

In order to obtain an image rotated 90° counterclockwise using, for example, the image rotating device 740, the first line through the eighth row of the 8×8 image are written in register blocks #7-#0, respectively. Although the writing method differs from the writing method in the case of rotating 90° clockwise, the same reading method can be used. The read image is an image rotated 90° counterclockwise from the original image.

The above-described conventional approach, however, has the following disadvantages.

(1) When the capacity of image data is large, circuit complexity increases greatly due to the number of bits of a register, selector circuits within a register block, and the scale of the circuit configuration of a write/read control unit for generating read control signals $RD_i$ and write control signals $WR_i$. Hence, the practical use of an image rotating device for dealing with image data having large capacity was difficult. Accordingly, when dealing with image data having large capacity, a method has generally been adopted wherein the image data are divided into several portions, each of which is rotated by a small-scale image rotating device, and rotation in units of the divided portion is performed using software. Such a method, however, requires after all a long processing time for software processing.

(2) when reading the same image data performing different rotation or mirror-image processing (in the above-described approach, 90° rotation clockwise and 90° rotation counterclockwise), the same image data must be rewritten number of times proportional to the frequency of processing.

A conventional image processing apparatus 800 for storing image data and controlling, for example, print outputs of the image data is configured as shown in FIG. 80. If it is assumed that the leading address of a storage unit 860 is address 0 (an address as seen from the bus master is obtained by adding an offset address to this address), and input/output of image data is performed in units of 8 picture elements, and the image data are stored in the storage unit 860 such that, as shown in FIG. 81, a predetermined number of picture elements laterally arranged in the upper left of the image data (8 picture elements in the case of FIG. 81) are stored in address 0. The next right 8 picture elements are stored in address 1, and the remaining picture elements are sequentially stored in the same manner to the 8 picture elements in the final column. The left-end picture elements on the next row are stored in the rear (not always immediately next) address portion of the final column, and picture elements on that row are sequentially stored in the storage unit in the same manner.

Accordingly, as shown in FIG. 81, the address of two-dimensional data, such as image data, in units of data (8 picture elements in the present case) in the storage unit on the y-th row counted from 0 and the x-th column counted from 0 is expressed by (pitch$\times$y+x), where the pitch indicates the value of the final address on each row in the storage unit arranged in the form of a matrix, and pitch $\geq$ the length of a column of image data (hereinafter termed the col.end). Usually, from the viewpoint of easiness of dealing with addresses in software, and simplification of peripheral circuitry of hardware, a numerical value ($2^n$) having a power of 2 is used as the value of the pitch. By adopting such a value, for example, an address in the storage unit during a printing operation generated in a printer control unit 830 of the image processing apparatus 800 shown in FIG. 80 may be obtained by merely connecting respective outputs from a counter for counting in the row direction and a counter for counting in the column direction, and so an arithmetic circuit is not needed.

Next, an explanation will be provided of the case of a printer, such as a laser-beam printer, which transmits and prints data for every line of an image. It is assumed that the printer has the configuration shown in FIG. 80. FIG. 83 illustrates waveforms of various kinds of signals indicating timings during printing. When it is desired to write image data in the storage unit 860 or print edited image data, a bus master 810 issues a print request command to a bus control unit 820. The bus control unit 820 generates a print request signal after receiving the print request command, and transmits the print request signal to the printer control unit 830, which transmits the request to a printer (not shown) via a printer I/F unit 840. After preparing for printing, the printer issues a synchronizing signal in units of a page. FIG. 82 is a block diagram of the inside of the printer control unit 830. The printer control unit 830 clears values in two counters, i.e., a column-direction counter 821 and a line-direction counter 822, to zero by the synchronizing signal in units of a page shown in FIG. 83, generates a print-enable signal, controls so as to switch an address selector unit 880 to an address during printing, and transmits a print data request signal to the bus control unit 820. Outputs from the two counters 821 and 822 are connected, and the connected signal is provided as an address for the storage unit 860 via an address selector unit 880. Accordingly, address 0 is assigned as the address of the storage unit 860 when issuing the synchronizing signal in units of a page, and at the same time the print data request signal is transmitted to the bus control unit 820, whereby a control signal is transmitted from the bus control unit 820 to the storage unit 860, and data stored in address 0 are transmitted to the printer via an output data buffer 870 and the printer I/F 840. When the next timing clock signal has been issued, only the column-direction counter 821 is incremented, and at the same time a print data request signal is issued, whereby data stored in address 1 of the storage unit 860 are transferred to the printer as print data. The same operation is repeated until the value of the column-direction counter becomes col.end. At that time, the printer control unit 830 recognized that it has transmitted image data for one line to the printer. Hence, the printer control unit 830 changes the state of the column-direction counter 821 from count enable to disable, stops the generation of the print data request signal, and assumes a state of awaiting a synchronizing signal in units of a line. On the other hand, after preparing for a printing operation for the next line, the printer issues a synchronizing signal in units of a line. At that time, the printer control unit 830 clears the column-direction counter 821 to zero, increments the line-direction counter 822, and generates again a print data request signal. Subsequently, the contents of address (x+pitch) of the storage unit 860 are transmitted to the printer. Thus, print data for the second line are sequentially transmitted by intermittently-issued timing clock signals. In such a way, print data for one line are transmitted at every synchronizing signal in units of a line. When the last data on the final line have been transmitted, the output of the column-direction counter 821 becomes col.end, and the output of the line-direction counter 822 becomes line.end (the value of the final line of the image data). When detecting these values col.end and line.end, the printer control unit 830 generates a print end signal, thereby setting the print enable signal in a disable state. At that time, the bus control unit 820 is made to receive an access from the bus master 810, and the address selector 880 is switched so as to be able to receive an access from the bus master 810.

The above-described conventional approach, however, has the following disadvantages.

That is, usually, cut sheets which can be used in a printer comprise paper not square in size, such as A4, A5, B4 or the like. The image processing apparatus stores image data in accordance with the size of paper, and performs editing of the data. Although some image processing apparatuses can deal with two directions, i.e., vertically-long and horizontally-long directions, of the same paper when performing print output of the data, most apparatuses support print output of only one direction, for example vertically-long direction, of paper for reasons relating to production cost and the like. In such a case, in order to perform print output of a horizontal-long image edited by the image processing apparatus, an image rotated by 90° must be transmitted to the printer. However, in the above-described conventional approach, software processing is needed in order to obtain data of the rotated image, and the load on the bus master is increased for that processing. As a result, during print output, other processing cannot be performed, or the speed of other processing is greatly reduced.

By the same reason, also when performing print output of a mirror image (reversal) of stored image data, the load on the bus master is increased. As a result, during print output, other processing cannot be performed, or the speed of other processing is greatly reduced.

A conventional image processing apparatus for storing image data and controlling the display of the image is configured as shown in FIG. 85. For the purpose of explanation, it is assumed that the unit of input/output of image data of the image processing apparatus is 8 bits, and image data comprise one bit for one picture element. If the leading storage address of a storage unit 851 is assumed to be address 0 (an address as seen from the bus master is obtained by adding an offset address to this address), image data having a two-dimensional matrix structure are sequentially stored starting from the upper left end from address 0 to address col.end of a storage unit 851 in the direction of columns for respective 8 picture elements on the first row, as shown in FIG. 86.

Subsequently, image data for the second row are stored from address pitch to address (pitch + col.end). Further, in the same manner, the image data are stored in the storage unit 851 until the final row (row.end). In general, pitch≧col.end. Usually, from the viewpoint of easiness of dealing with addresses in software, and simplification of peripheral circuitry of hardware, a numerical value ($2^n$) having a power of 2 is used as the value of the pitch.

Accordingly, the address of the storage unit 851 wherein the x-th data counted from 0 in units of 8 picture elements on the y-th row counted from 0 are stored is expressed by (pitch×y+x). If the storage address is thus defined, an address in the storage unit 851 generated in a display device control unit 852 may be obtained by merely connecting respective outputs form a counter for counting in the horizontal direction and a counter for counting in the vertical direction, and so an arithmetic circuit is not needed.

Next, an explanation will be provided of a procedure of transmitting image data to a display device comprising, for example, a raster-scanning-type CRT display (hereinafter termed a CRT). In image data display using a raster-scanning method, in general, the CRT is scanned from the left to the right to sequentially display every picture element. When scanning reaches the right end, scanning returns to the left end without performing display. By repeating this operation, picture elements on every line are displayed from above to below. In such scanning, the timing of scanning in the horizontal direction is based on a horizontal synchronizing signal (hereinafter termed an HSYNC signal). If scanning reaches the lowermost portion of the CRT while continuing scanning in the horizontal direction, scanning is returned to the uppermost portion of the CRT without performing display. The same operation is repeated thereafter. The timing of scanning in the vertical direction is based on a vertical synchronizing signal (hereinafter termed a VSYNC signal). FIG. 87 schematically illustrates the way of scanning. In FIG. 87, solid lines represent scanning while performing display, and broken lines represent scanning in a state of not performing display. FIGS. 88 and 89 are block diagrams of the display device control unit 852 and a display device I/F unit 853, respectively. The display device control unit 852 clears a vertical-direction counter 882 by a VSYNC signal, and clears a horizontal-direction counter 881 by an HSYNC signal which follows. A LOAD signal from the display device I/F unit 853 is transmitted to the display device control unit 852, which generates a display enable signal according to the LOAD signal to switch an address selector unit 854 to an address during display, and also generates a display data request signal to request the storage unit 851 to transfer image data. The display device I/F unit 853 generates a VSYNC signal and an HSYNC signal, serving as synchronizing signals for the display device, and a blank signal indicating a non-display period, latches image display data (for 8 picture elements in this case) transmitted from the storage unit in a parallel/serial converter 891 by the LOAD signal, and transmits serialized data to the display device. A blank signal indicating a non-display period relative to horizontal-direction scanning will be termed an HBLANK signal, and a blank signal indicating a non-display period relative to vertical-direction scanning will be termed a VBLANK signal. FIG. 90 is a timing chart of control signals for scanning the CRT in order to display image data. FIG. 91 is a timing chart which shows control timings of one-line scanning when starting display in detail. Outputs of the above-described two counters (the horizontal-direction counter and the vertical-direction counter) are connected to provide an storage address to the storage unit 851 via an address selector unit 854. First, when starting display, the address of the storage unit 851 is set to address 0. When a display data request signal has been transmitted to a bus control unit 855, a control signal is transmitted from the bus control unit 855 to the storage unit 851, and data of 8 picture elements at the upper left end of image data stored in address 0 are transmitted to the display device I/F unit 853 as display data. At the timing of the next display data request signal turned on, only the horizontal-direction counter 881 is incremented, and image data stored in address 1 of the storage unit 851 are transmitted to the display device as display data. Subsequently, in the same manner, the transmission of image data is repeated until an HBLANK signal is turned on. When an HBLANK signal has been turned on, the display of image data for one line has been completed. By the generation of the next HSYNC signal, in the display device control unit 852, the horizontal-direction counter 881 is cleared, the vertical-direction counter 882 is incremented, and transfer of image data for the next line is started. Address (pitch×1) is transmitted to the storage unit 851 as an address, an image data for the second line are output from the storage unit 851 as display data. Thus, image data for one line are transmitted to the display device at every HSYNC signal. When the last data of the final line have been transmitted, a VBLANK signal is turned on. At the next VSYNC signal, scanning is resumed from the upper-left end of the CRT. Subsequently, this operation is repeated.

In the above-described conventional approach, however, a reading operation for image data for one line is synchronized with the timing of an HSYNC signal. Hence, when a vertically-long CRT is adopted, if it is attempted to continue scanning with the same frequency of the VSYNC signal as in a horizontally-long CRT, the frequency of the HSYNC signal must be increased in order to suppress flicker on the CRT picture surface. However, if the frequency of the HSYNC signal is increased, it is necessary to increase reading speed of image data from the storage unit, necessitating adoption of a high-speed memory in the storage unit. Furthermore, in order to increase the frequency of the HSYNC signal, current flowing through the deflection yoke (a coil for controlling the magnetic field in order to deflect electrons emitted from the electric gun) within the CRT must by increased, causing problems of heat generation and requiring higher-grade components. As a result, the conventional approach has the disadvantage of increasing the cost of a vertically-long CRT.

A conventional image processing apparatus for storing and editing image data transmitted from an image input device is configured as shown in FIG. 93. Image data are stored in a storage unit 931 in the following manner: If the leading address of the storage unit 931 is assumed to be address 0 (an address as seen from a bus master 932 is obtained by adding an offset address to this address), a predetermined number of picture elements laterally arranged in the upper left of the image data (8 picture elements in the case of FIG. 93) are stored in address 0. The next right 8 picture elements are stored in address 1, and the remaining picture elements are sequentially stored in the same manner until 8 picture elements in the portion of col.end. The left-end picture elements on the next row are stored in the rear (not always immediately next) address portion of the col.end, and picture elements on that row are sequentially stored in the storage unit 931 in the same manner.

Accordingly, as shown in FIG. 94, the address of the storage units wherein the x-th data counted from 0 in units of 8 picture elements on the y-th row counted from 0 is expressed by (pitch×y+x), where pitch≧col.end. Usually, from the viewpoint of easiness of dealing with addresses in software, and simplification of peripheral circuitry of hardware, a numerical value ($2^n$) having a power of 2 is used as the value of the pitch. In this case, an address in the storage unit 931 when inputting image data generated by a scanner controls unit may be obtained by merely connecting respective outputs from a counter for counting in the row direction and a counter for counting in the column direction, and so an arithmetic circuit is not needed.

An explanation will now be provided of a scanner which transfers every picture element of image data in the row direction (main spanning), and transfers every line from above to below (sub-scanning). FIG. 97 illustrates timing when inputting image data. As shown in FIG. 93, if it is desired to input image data from the scanner, a bus master 932 issues a scanner input request. A bus control unit 933 generates a scan req. signal according to the scanner input request, and transmits the scan req. signal to a scanner control unit 934. The scanner control unit 934 transmits the request to the scanner via a scanner I/F unit 935. After preparing for the transfer of image data, the scanner outputs data serialized in units of a picture element and a timing clock signal for receiving the data together with a data valid signal. FIGS. 95 and 96 are block diagrams of the scanner I/F unit 935 and the scanner control unit 934.

FIG. 97 is a timing chart. An explanation will now be provided of an operation according to this timing chart. Before the scanner transmits image data, a valid signal (HE signal) in units of a page is made low. Hence, flip-flops 957, 963 and 964 are cleared, whereby a 3-bit counted 952, a column-direction counter 961 and a row-direction counter 962 are cleared, respectively. At that time, an address (RCNTn.CCNtn) transmitted from the scanner control unit 934 to an address selector unit 936 becomes 0, which address is an address storing data at the upper-left end of the storage unit 931. When the scanner has prepared for the transfer of image data, the data valid signal in units of a page becomes high, and at the same time the scan enable signal becomes high, whereby the address selector unit 936 switches the signal to be added to the address of the storage unit 931 from the address of the bus master 932 to outputs from the column-direction counter 961 and the row-direction counter 962 of the scanner control unit 934. The bus master 932 can know the above-described processing via the bus control unit 933. Subsequently, since the valid signal in units of a line becomes high, the output of the flip-flop 964 becomes high, whereby the cleared state of the row-direction counter 962 is released (its output RCNTn remains 0). Subsequently, serialized image data (VD signals) are transmitted from the scanner together with clock signals. By the first clock signal, the first VD signal is latched by a serial/parallel conversion unit (S/P unit) 951, the output of the flip-flop 957 becomes high, and the cleared state of the 3-bit counter 952 is released. By the next clock signal, the next VD signal is latched by the S/P unit 951, and the 3-bit counter 952 starts counting to have the value 1. At the 8-th clock signal, the conversion of the serialized image data into 8-picture-element parallel data has been completed, and the carry output of the 3-bit counter 951 becomes high, making the scan data valid signal high. By the scan data valid signal, the output of the flip-flop 963 becomes high, and the cleared state of the column-direction counter 961 is released (its output CCNTn remains 0). The scan data valid signal is transmitted to the bus control unit 933 to notify that data to be written in the storage unit 931 are prepared. The bus control unit 933 write the data from the scanner in the storage unit 931 before the completion of the conversion of the next 8-picture-element data into parallel data. Since the address of the storage unit 931 at that time is address 0 because address RCNTn.CCNTn is 0, the first 8-picture-element data are written in address 0. By the succeeding 8 clock signals, the next 8-picture-element data are prepared in the S/P unit 951 in the same manner, and a scan data valid signal is output according to the carry output of the 3-bit counter 952. Since the column-direction counter 961 is incremented by this scan data valid signal, the 8-picture-element data at that time are written in address 1 of the storage unit 931. By repeating this operation, image data for the first row are written in continuous addresses starting from address 0. After transferring image data for one row, the scanner makes the valid signal in units of a row low. Hence, the flip-flops 957, 963 are cleared, and the 3-bit counter 952 and the column-direction counter 961 are cleared again. After the completion of the preparation of the transfer of image data for the next row, the scanner makes again the valid signal in units of a row high. At that time, the row-direction counter 962 is incremented. As a result, the address of the storage unit 931 becomes address (pitch×1). Subsequently, the scanner transfers image data for the next row with repeating the same operation as in the case of the first row. Hence, the image data for the second row are written in continuous addresses starting from address (pitch×1) of the storage unit 931. The same operation is performed for image data for rows after the third row. After the completion of the transfer of all image data, the scanner makes the valid signal in units of a page low, whereby the scan enable signal becomes low, and the address selector unit 936 switches so as to add the address of the bus master 932 as the address of the storage unit 931. Accordingly, the bus master 932 can read image data from the scanner stored in the storage unit 931, and can edit the image data by changing the contents of the storage unit 931.

Usually, copy paper which can be used in a scanner comprises paper not square in size, such as A4, A5, B4 or the like. An image processing apparatus reads, stores and edits images in accordance with the size of paper. Some image processing apparatuses can deal with two directions, i.e., vertically-long and horizontally-long directions, of the same paper. No problem will arise if the scanner supports the two directions. However, if the scanner supports only one direction, for example the vertically-long direction, of paper for reasons relating to production cost and the like, when dealing with a horizontally-long image, image data transferred from the scanner must be rotated by 90° in the image processing apparatus. However, in the above-described conventional approach, software processing is needed in order to obtain data of the rotated image, increasing the load of the bus master 932 for that processing. As a result, the conventional approach has the disadvantage that other processing cannot be performed during an image reading operation.

By the same reason, also when storing a mirror image (reversal) of image data input from the scanner, the conventional approach has the disadvantage that the load of the bus master 932 is increased.

SUMMARY OF THE INVENTION

The present invention has been made in consideration of the above-described problems in the conventional approaches.

It is an object of the present invention to provide an image processing apparatus which can generate a rotated/mirror image of a character pattern without complicating circuit configuration and increasing the capacity of a storage unit.

It is a further object of the present invention to provide a display control device of an image processing apparatus which can display, for example, a rotated/mirror image of a character pattern using a single character pattern.

It is a still further object of the present invention to provide a printer device of an image processing apparatus which can print, for example, a rotated/mirror image of a character pattern using a single character pattern.

It is still another object of the present invention to provide an image processing apparatus which can obtain, for example, a rotated/mirror image of a figure pattern efficiently and at a high speed with a simple configuration.

It is a still a further object of the present invention to provide an image processing apparatus which can efficiently write image data and read image data subjected to rotation/mirror-image processing or the like with a simple configuration.

It is still another object of the present invention to provide an image processing apparatus which can reduce the load on a bus master when outputting image data.

It is still another object of the present invention to provide an image processing apparatus which can efficiently input and output image data with a simple configuration.

It is still another object of the present invention to provide an image processing apparatus which can store/edit image data converted from image data transmitted from a scanner in accordance with assignment of rotation/mirror-image processing.

BRIEF DESCRIPTION OF THE DRAWINGS

FIG. 2 illustrates how a character pattern comprising 8 dots×8 dots is stored in storage units;

FIG. 3(A) shows the relationship between row-assigning codes and row addresses of the respective storage units when assigning 0° rotation;

FIG. 4(A) shows the relationship between row-assigning codes and row addresses of the respective storage units when assigning 90° rotation counterclockwise;

FIG. 6(A) shows the relationship between row-assigning codes and row addresses of the respective storage units when assigning 270° rotation counterclockwise;

FIG. 8(A) shows the relationship between row-assigning codes and row addresses of the respective storage units when assigning 180° rotation;

FIG. 8(B) illustrates how the character pattern comprising 8 dots×8 dots is read while performing 180°-rotation/mirror-image processing;

FIG. 10(A) shows the relationship between row-assigning codes and row addresses of the respective storage units when assigning 0° rotation according to the other rearranging method;

FIG. 10(B) illustrates how the character pattern comprising 8 dots×8 dots is read from the storage units according to the rearranging method of FIG. 9;

FIG. 11(A) shows the relationship between row-assigning codes and row addresses of the respective storage units when assigning 90° rotation to the left according to the rear-ranging method of FIG. 9;

FIG. 11(B) illustrates how the character pattern comprising 8 dots×8 dots is read while performing 90° rotation to the left according to the rearranging method of FIG. 9;

FIG. 12(A) shows the relationship between row-assigning codes and row addresses of the respective storage units when assigning 180° rotation according to the rearranging method of FIG. 9;

FIG. 13(A) shows the relationship between row-assigning codes and row addresses of the respective storage units when assigning 270° rotation according to the rearranging method of FIG. 9;

FIG. 14(A) illustrates how rotation/mirror-image processing is assigned;

FIG. 16(B) shows logical expressions of a rearranging method;

FIG. 18 illustrates how rotation/mirror-image processing is assigned assuming column-direction access;

FIG. 19 illustrates how directions of access and rotation/mirror-image processing are assigned;

FIGS. 21-23 are diagrams illustrating a conventional approach;

FIGS. 37-41(B) are diagrams illustrating a conventional approach;

FIGS. 44-51 are diagrams illustrating a conventional approach;

FIG. 54(B) is a diagram showing logical expressions corresponding to an input data rearranging method;

FIG. 55 illustrates correspondence between input image data and the inside of 8 picture elements × 8 line blocks of a storage unit;

FIG. 56(A) illustrates rotation/mirror-image assignment;

FIGS. 69-73(B) illustrate rotation/mirror-image processing within the 8 lines × 8 picture elements block;

FIGS. 74-76 illustrate a conventional approach;

FIG. 97 is a timing chart illustrating timings when inputting image data in a conventional approach.

DETAILED DESCRIPTION OF THE PREFERRED EMBODIMENTS

First Embodiment

Figure 1:
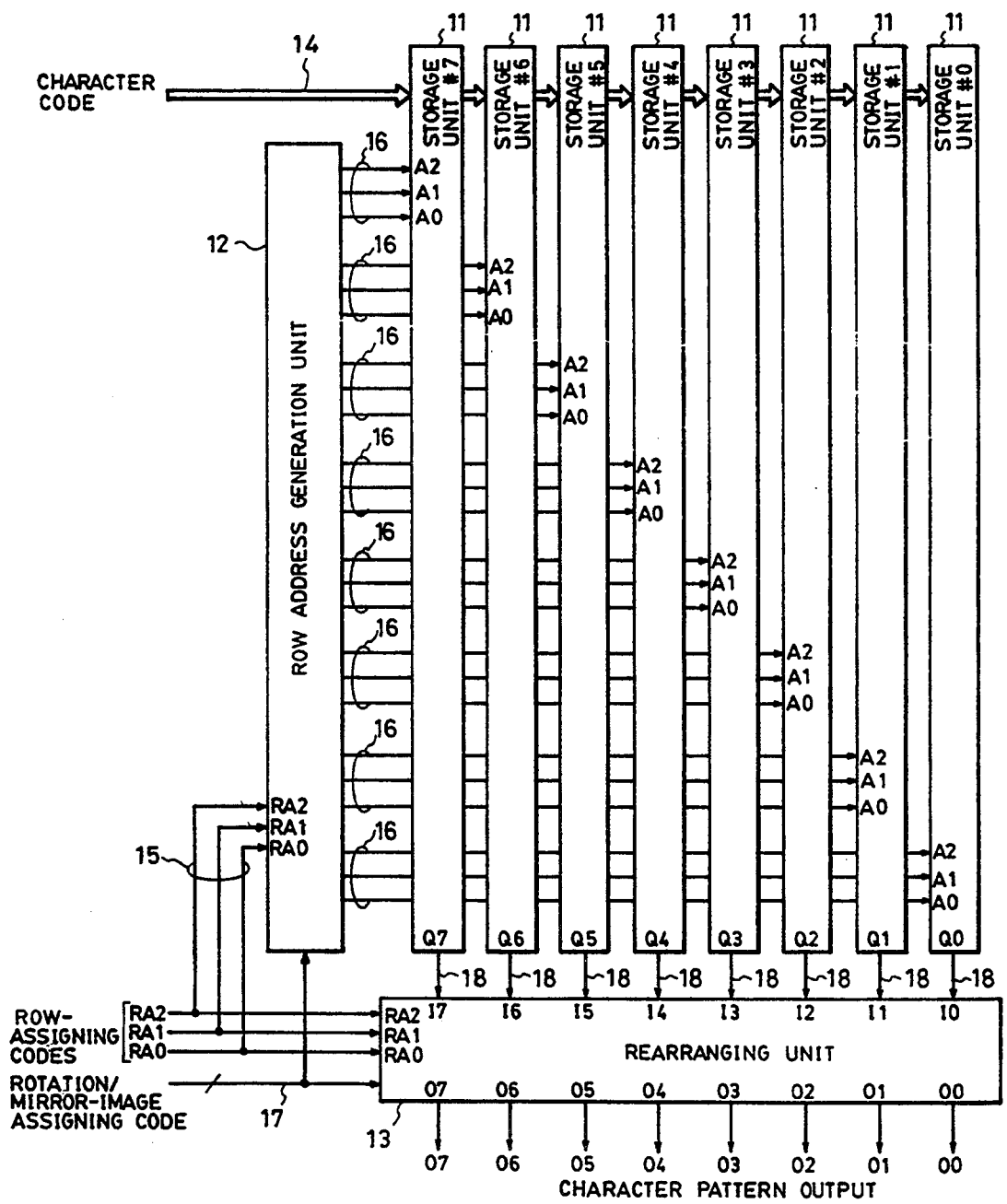
FIG. 1 is a block diagram showing the configuration of a character pattern generator according to a first embodiment of the present invention.

A detailed explanation will now be provided of a first embodiment of the present invention with reference to the attached drawings. FIG. 1 is a block diagram showing the configuration of a character pattern generator for a pattern comprising 8 dots × 8 dots according to the first embodiment. In FIG. 1, each storage unit 11 stores a character pattern. A row address generation unit 11 stores a character pattern. A row address generation unit 12 generates row addresses according to row assignment and rotation/mirror-image assignment. A rearranging unit 13 determines a rearranging method according to row assignment and rotation/mirror-image assignment.

Figure 3B:
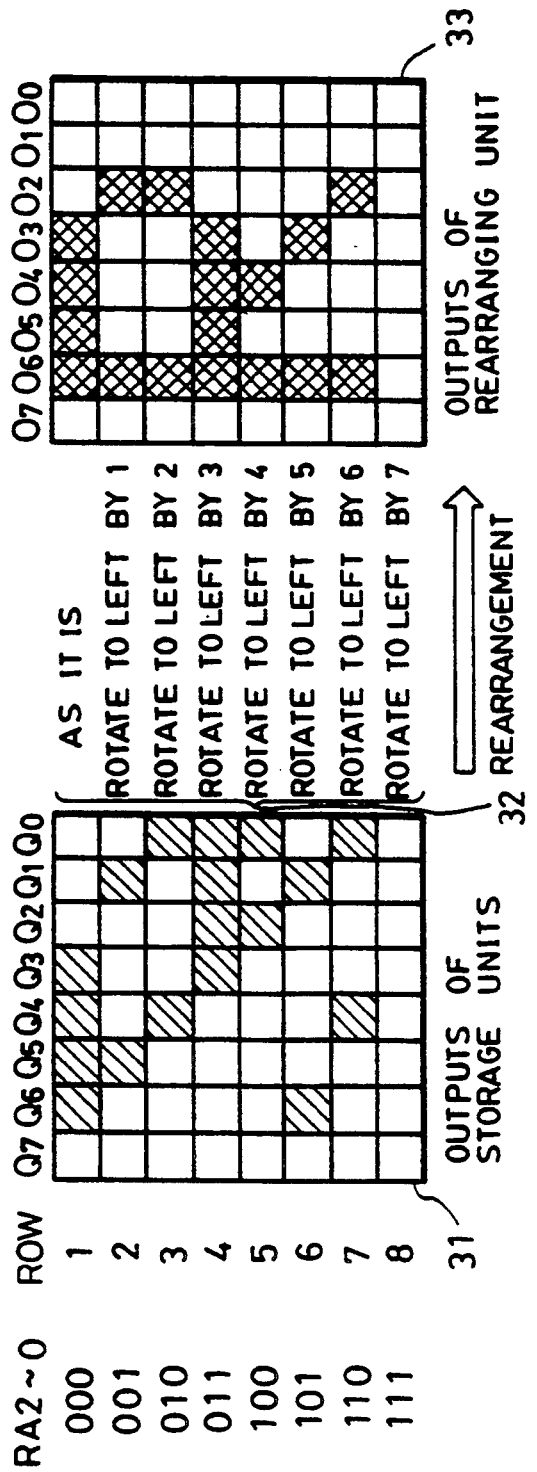
FIG. 3(B) illustrates how the character pattern comprising 8 dots×8 dots is read from the storage units.

It is assumed that a character pattern is stored in the storage units 11 with respective rows being previous rearranged. For example, as shown in FIG. 2, a character pattern "R" 21 is stored within the storage units 11 as an image represented by reference numeral 22 wherein each row is sequentially rotated clockwise by 1 bit, 2 bits, . . . , starting from the second row. The row address generation unit 12 generates row addresses 16 for respective storage units 11 (#7–#0). It is assumed that, when the output of rotation/mirror-image assigning codes of 0° without a mirror image, that is, an original character pattern, is requested, the row address generation unit 12 provides row addresses 16 (A2, A1, A0) of all the storage units 11 (#7–#0) without changing row-assigning codes 15 (RA2-0). This processing is shown in the diagram of FIG. 3(A) which represents the relationship between row-assigning codes (RA2-0) and row addresses of the storage units 11 (#7-#0). At that time, the outputs of the storage units 11 corresponding to the row-assigning codes 15 (RA2-0) are as shown by reference numeral 31 in FIG. 3(B). The rearranging unit 13 reads the character pattern stored in the storage units 11 through output ports 18 and rearrange the character pattern. When the rotation/mirror-image assigning code 17 is 0° without mirror-image processing, if the read character pattern is rotated as shown by reference numeral 32 in FIG. 3(B), the original pattern as shown by reference numeral 33 in FIG. 3(B) is obtained.

Figure 4B:
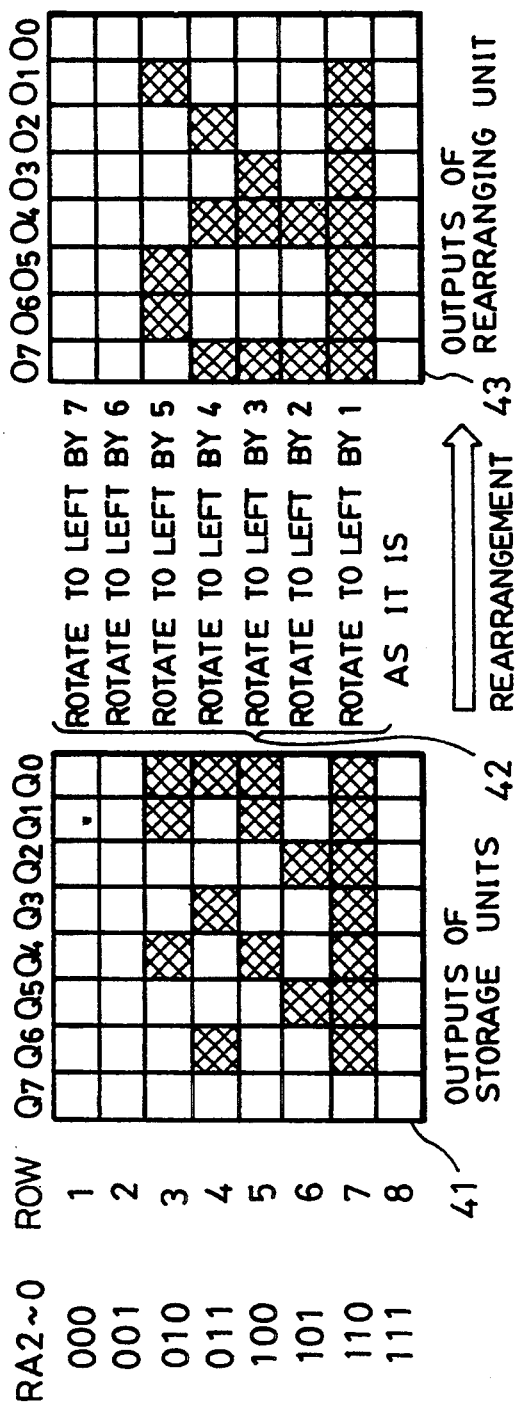
FIG. 4(B) illustrates how the character pattern comprising 8 dots×8 dots is read while performing 90° rotation counterclockwise.
Figure 5:
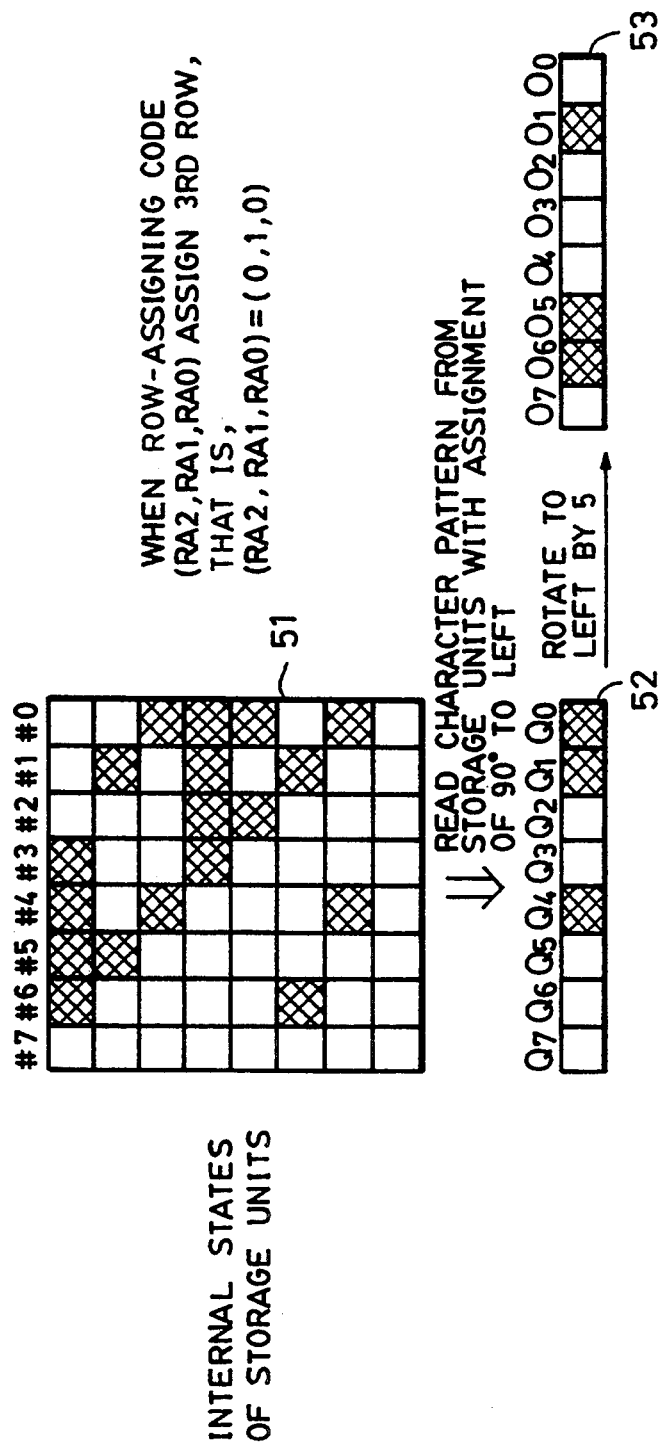
FIG. 5 illustrates a reading operation of the character pattern from the storage unit and rearrangement of the character pattern when assigning 90° rotation counterclockwise.

Next, a case wherein the pattern of a character rotated 90° counterclockwise will be considered. In this case, the row address generation unit 12 provides the respective storage units 11 with rows addresses 16 (A2-0) shown in FIG. 4(A) in accordance with the row-assigning codes 15 (RA2-0). For example, if the row-assigning codes 15 are (RA2, RA1, RA0)=(0, 1, 0) (that is, the third row is assigned), the row addresses 16 of the #7, #6, #5, #4, #3, #2, #1 and #0 storage units 11 are (A2, A1, A0)=(0, 1, 1), (A2, A1, A0)=(1, 0, 0), (A2, A1, A0)=(0, 1, 0), (A2, A1, A0)=(1, 0, 1), (A2, A1, A0)=(1, 1, 0), (A2, A1, A0)=(1, 1, 1), (A2, A1, A0)=(0, 0, 0), (A2, A1, A0)=(0, 0, 1), and (A2, A1, A0)=(0, 1, 0), respectively. In this case, the output pattern of the third row when reading the character pattern from the storage units 11 is as shown by reference numeral 52 in FIG. 5, wherein portions represented by thick lines in reference numeral 51 in FIG. 5 are taken out to the output ports 18. If this output pattern 52 is rotated counterclockwise by 5 dots by the rearranging unit 13, the pattern of the third row of the character pattern rotated 90° counterclockwise is obtained. This approach has a feature in that the frequency of access to the storage units 11 necessary for obtaining the pattern of a certain row of the character rotated 90° counterclockwise is only 1. After performing such an operation, the entire character pattern taken out from the storage units 11 is as shown in reference numeral 41 in FIG. 4(B). If this character pattern is rearranged according to the rearranging method shown by reference numeral 42 in FIG. 4(B) by the rearranging unit 13, the character pattern rotated 90° counterclockwise shown by reference numeral 43 in FIG. 4(B) is obtained.

Figure 6B:
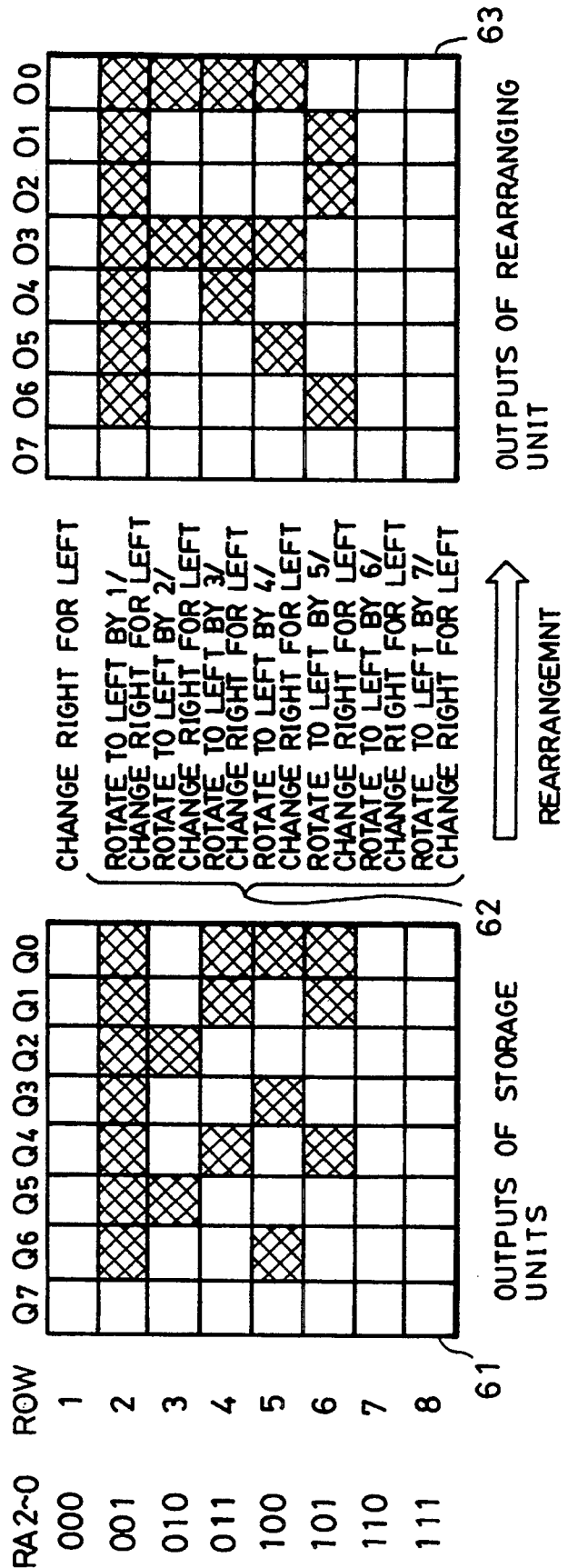
FIG. 6(B) illustrates how the character pattern comprising 8 dots×8 dots is read while performing 270° rotation counterclockwise.
Figure 7:
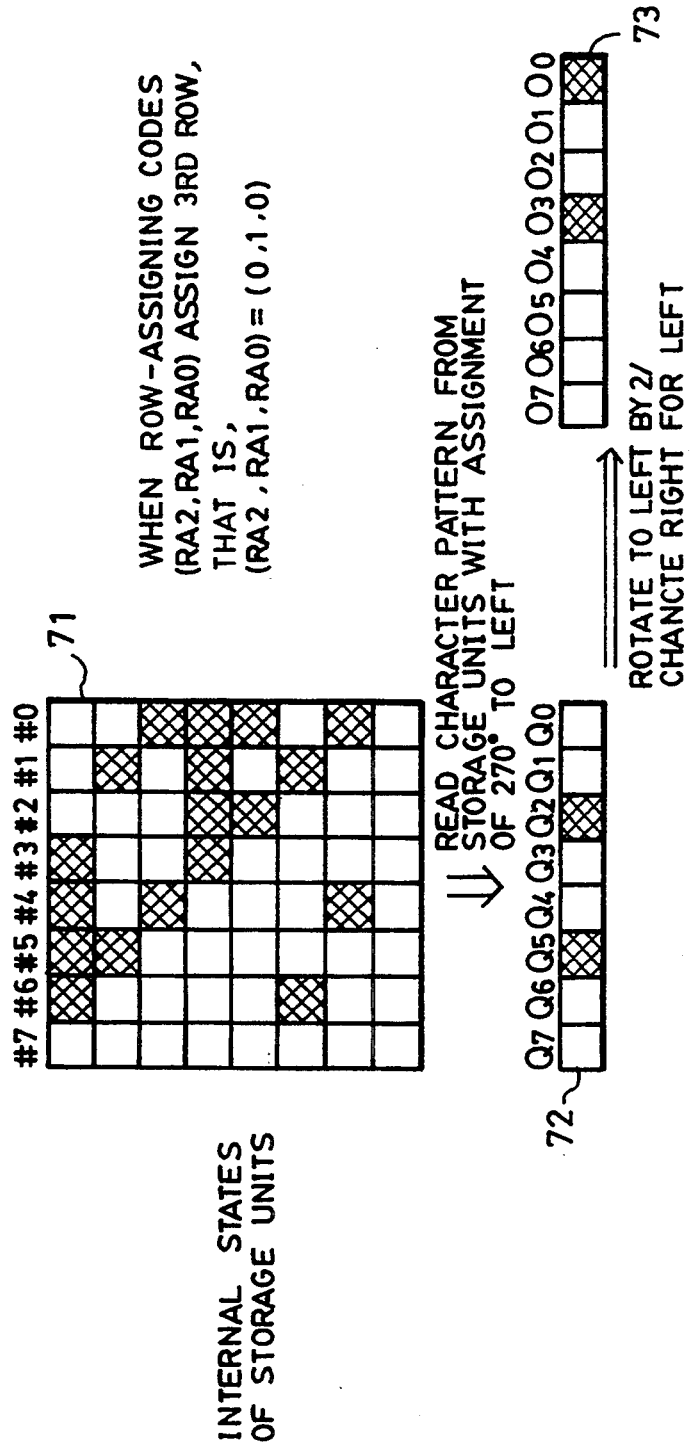
FIG. 7 illustrates a reading operation of the character pattern from the storage unit and rearrangement of the character pattern when assigning 270° rotation counterclockwise.

Further, a case wherein the character pattern rotated 270° counterclockwise is obtained will be considered. In this case, the row address generation unit 12 provides the respective storage units 11 with the row addresses 16 (A2-0) shown in FIG. 6(A) in accordance with the row-assigning codes 15 (RA2-0). For example, when the character pattern is read from the storage units 11 with the row-assigning codes 15 of (RA2, RA1, RA0)=(0, 1, 0) (that is, the third row is assigned), the output pattern of the third row becomes as shown by reference numeral 72 in FIG. 7, wherein portions represented by thick lines shown in reference numeral 71 in FIG. 7 are taken out to the output ports 18. By rotating this output pattern 72 counterclockwise by 2 dots and then changing right for left by the rearranging unit 13, the third row of the character pattern rotated 270° counterclockwise is obtained. Also in this case, only one access to the storage units 11 is sufficient. By performing such as an operation, the entire character pattern taken out from the storage units 11 is as shown in reference numeral 61 in FIG. 6(B). If this character pattern is rearranged by the rearranging unit 13 according to the rearranging method shown by reference numeral 62 in FIG. 6(B), the character pattern rotated 270° counterclockwise shown in reference numeral 63 in FIG. 6(B) is obtained.

Further, a case wherein the character pattern rotated 180° is obtained, and a case wherein the mirror-image character pattern is further obtained will be considered. Also in these cases, as in the cases of 90° rotation counterclockwise and 270° rotation counterclockwise, the row address generation unit 12 provides the respective storage units 11 with the row addresses 16 (A2-0) shown in FIG. 8(A) in accordance with the row-assigning codes 15 (A2-0). In order to obtain the mirror-image character pattern, an operation to change the left-side 4 dots for the right-side 4 dots by the rearranging unit 13 is added (this operation is not performed for the pattern for which an operation of changing right for left has been performed). This operation of changing right for left has been performed linked with rotation processing. When an operation of changing right for left is performed at rotation processing (for example, 180° rotation), the operation of changing right for left is not performed even if mirror-image assignment has been made. This rule is shown for cases wherein mirror-image assignment is present and not present at 180° rotation shown in FIG. 8(B). In FIG. 8(B), a character pattern 81 comprising 8 dots × 8 dots taken out from the storage units 11 according to 180° rotation assignment is rearranged in the rearranging unit 13 in accordance with a rearranging method 82 when mirror-image assignment is not present, to output a character pattern 83, but is rearranged according to a rearranging method 84 when mirror-image assignment is present, to output a character pattern 85. That is, since the operation of changing right for left has already been performed for the character pattern at 180° rotation, the operation of changing right for left at mirror-image assignment becomes unnecessary.

An explanation has been provided of an example wherein the rearranged pattern obtained by rotating respective rows of the original character pattern as shown in FIG. 2 is stored in the storage units 11. Any other rearranging methods, however, may also be applied. An explanation will now be provided of a rearranging method wherein the configuration of rearranging circuitry is simplified. The rearranging method will be explained with reference to FIG. 9. The rearranging method is as follows: First, for rows wherein RA2=1 (the 5th-8th rows of a character pattern 91 shown in FIG. 9), the left-side 4 dots are changed for the right-side 4 dots. For rows wherein RA2=0 (the 1st-4h rows of the character pattern 91 shown in FIG. 9), this changing operation is not performed. Next, for rows wherein RA1=1 (the 3rd, 4th, 7th and 8th rows of the character pattern 91 shown in FIG. 9), the 1st and 2nd, and 5th and 6th two dots from the left end are changed for the respective 3rd and 4th, and 7th and 8th two dots from the left end, respectively. For rows wherein RA1=0 (the 1st, 2nd, 5th and 6th rows of the character pattern 91 shown in FIG. 9), this changing operation is not performed. Further, for lines wherein RA0=1 (the 2nd, 4th, 6th and 8th rows of the character pattern 91 shown in FIG. 9), the 1st, 3rd, 5th and 7th dots from the left end are changed for the 2nd, 4th, 6th and 8th dots from the left end, respectively. For rows wherein RA0=0 (the 1st, 3rd, 5th and 7th rows of the character pattern 91 shown in FIG. 9), this changing operation is not performed. Accordingly, rearrangement is not performed for the first row since RA2-RA0 are all 0. On the other hand, right and left are reversed for the eighth row since RA2-RA0 are all 1. For the convenience of explanation, a rearranging method for respective rows will be represented by swap S2 S1 S0 (S2, S1 and S0 have a value 0 or 1; a case S2=S1=S0=0, that is, swap000, indicates no rearrangement).

swap000: (b7, b6, b5, b4, b3, b2, b1, b0) →(b7, b6, b5, b4, b3, b2, b1, b0)

swap001: (b7, b6, b5, b4, b3, b2, b1, b0) →(b6, b7, b4, b5, b2, b3, b0, b1)

swap010: (b7, b6, b5, b4, b3, b2, b1, b0) →(b5, b4, b7, b6, b1, b0, b3, b2)

swap011: (b7, b6, b5, b4, b3, b2, b1, b0) →(b4, b5, b6, b7, b0, b1, b2, b3)

swap100: (b7, b6, b5, b4, b3, b2, b1, b0) →(b3, b2, b1, b0, b7, b6, b5, b4)

swap101: (b7, b6, b5, b4, b3, b2, b1, b0) →(b2, b3, b0, b1, b6, b7, b4, b5)

swap110: (b7, b6, b5, b4, b3, b2, b1, b0) →(b1, b0, b3, b2, b5, b4, b7, b6)

swap111: (b7, b6, b5, b4, b3, b2, b1, b0) →(b0, b1, b2, b3, b4, b5, b6, b7)

Figure 9:
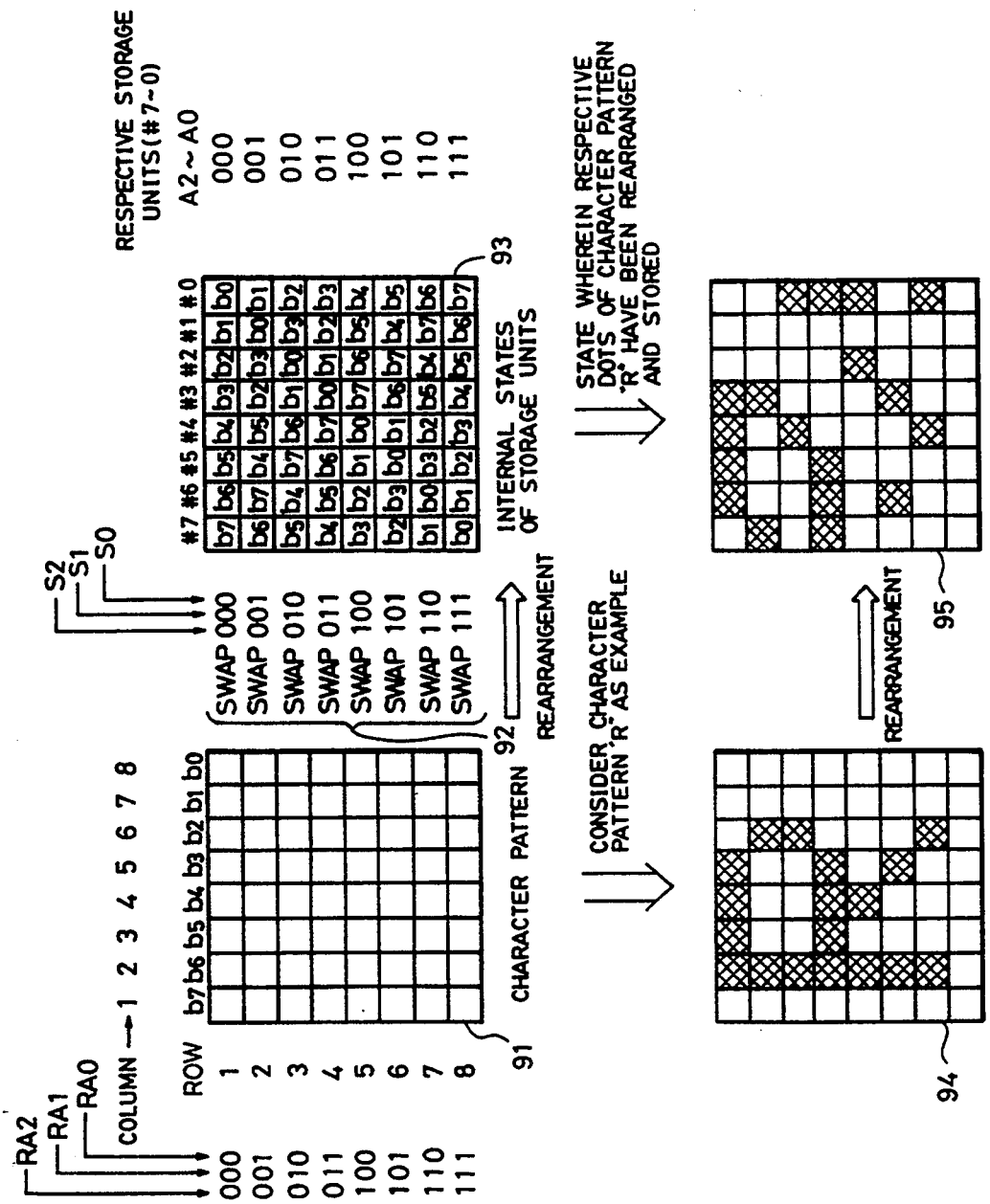
FIG. 9 illustrates how the character pattern comprising 8 dots×8 dots is stored in the storage unit according to another arranging method.
Figure 12B:
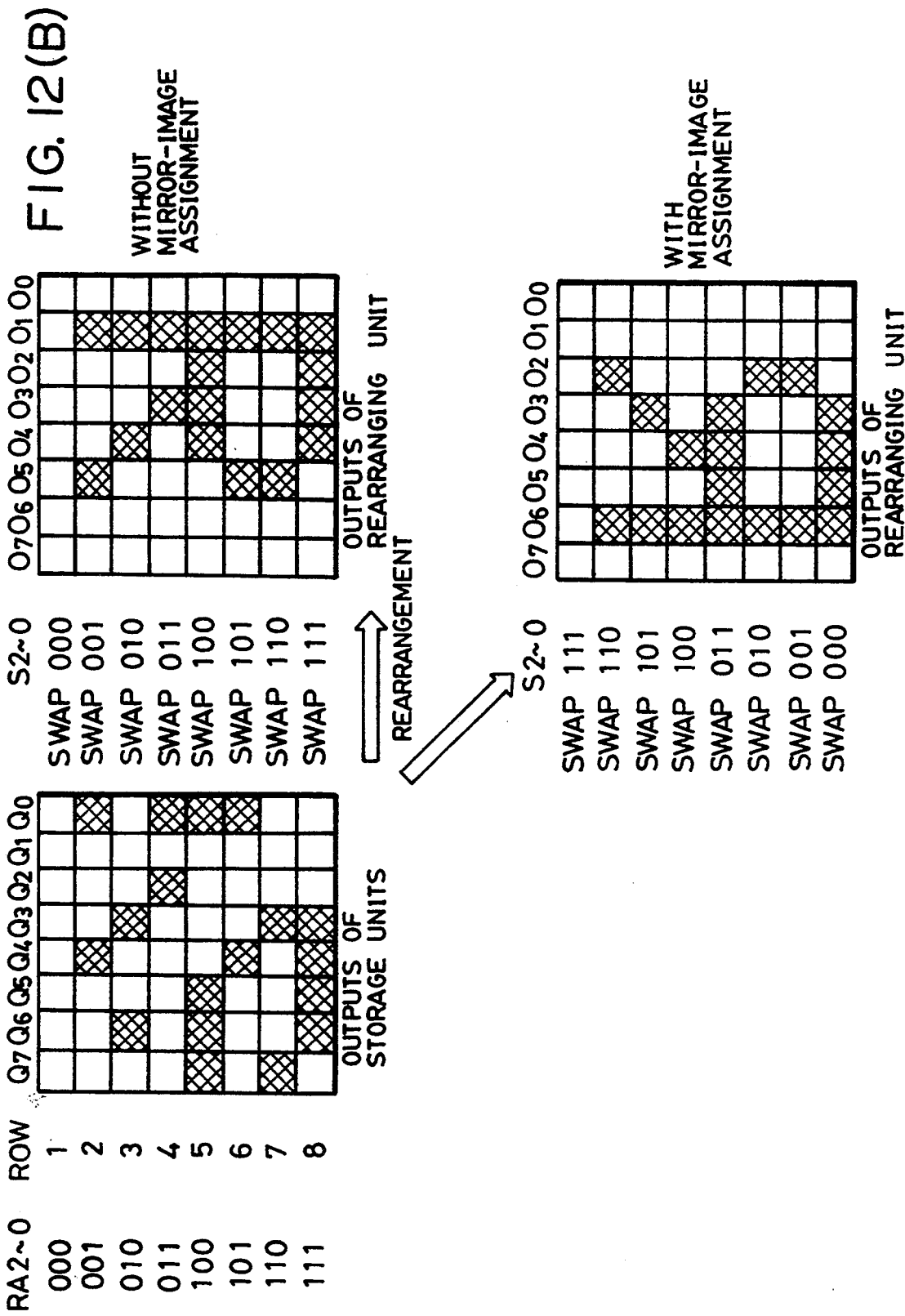
FIG. 12(B) illustrates how the character pattern comprising 8 dots×8 dots is read while performing 180° rotation according to the rearranging method of FIG. 9.
Figure 13B:
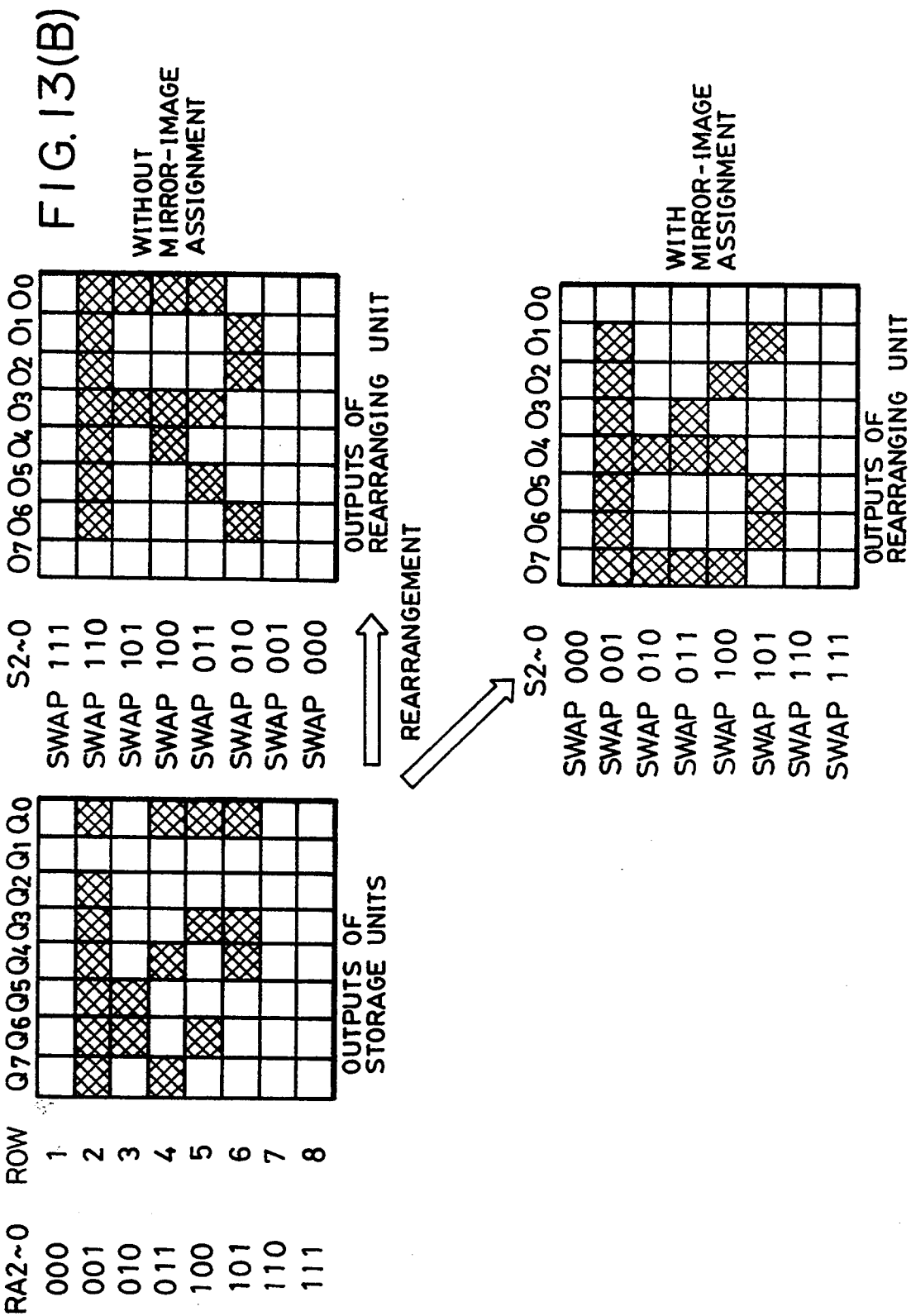
FIG. 13(B) illustrates how the character pattern comprising 8 dots×8 dots is read while performing 270° rotation to the left according to the rearranging method of FIG. 9.

Reference numerals 92 and 93 in FIG. 9 show how a character pattern is rearranged and stored in the storage units 11 according to such a rearranging method. Reference numerals 94 and 95 in FIG. 9 show how the character pattern "R" is rearranged according to the rearranging method 92 in FIG. 9.

FIGS. 10(A)-13(B) show examples of applying the rearranging method explained with reference to FIG. 9 to cases wherein character patterns are read from the storage units 11 with assigning rotation/mirror-image processing. FIGS. 10(A), 11(A), 12(A) and 13(A) show the relationship between the row-assigning codes (RA2-0) and the assignment of the row address 16 (A2-0) of the respective storage units 11 (#7-#0) in the cases of 0° rotation, 90° rotation to the left, 180° rotation, and 270° rotation to the left, respectively. FIGS. 10(B), 11(B), 12(B) and 13(B) illustrate how the character pattern stored in the storage units 11 is read to the output ports 18 (Q7-0) of the storage units 11, arranged according to the assigned rearranging method, and output from the rearranging unit 13 in the cases of 0° rotation, 90° rotation counterclockwise, 180° rotation, and 270° rotation counterclockwise, respectively, with and without mirror-image assignment.

Figure 14B:
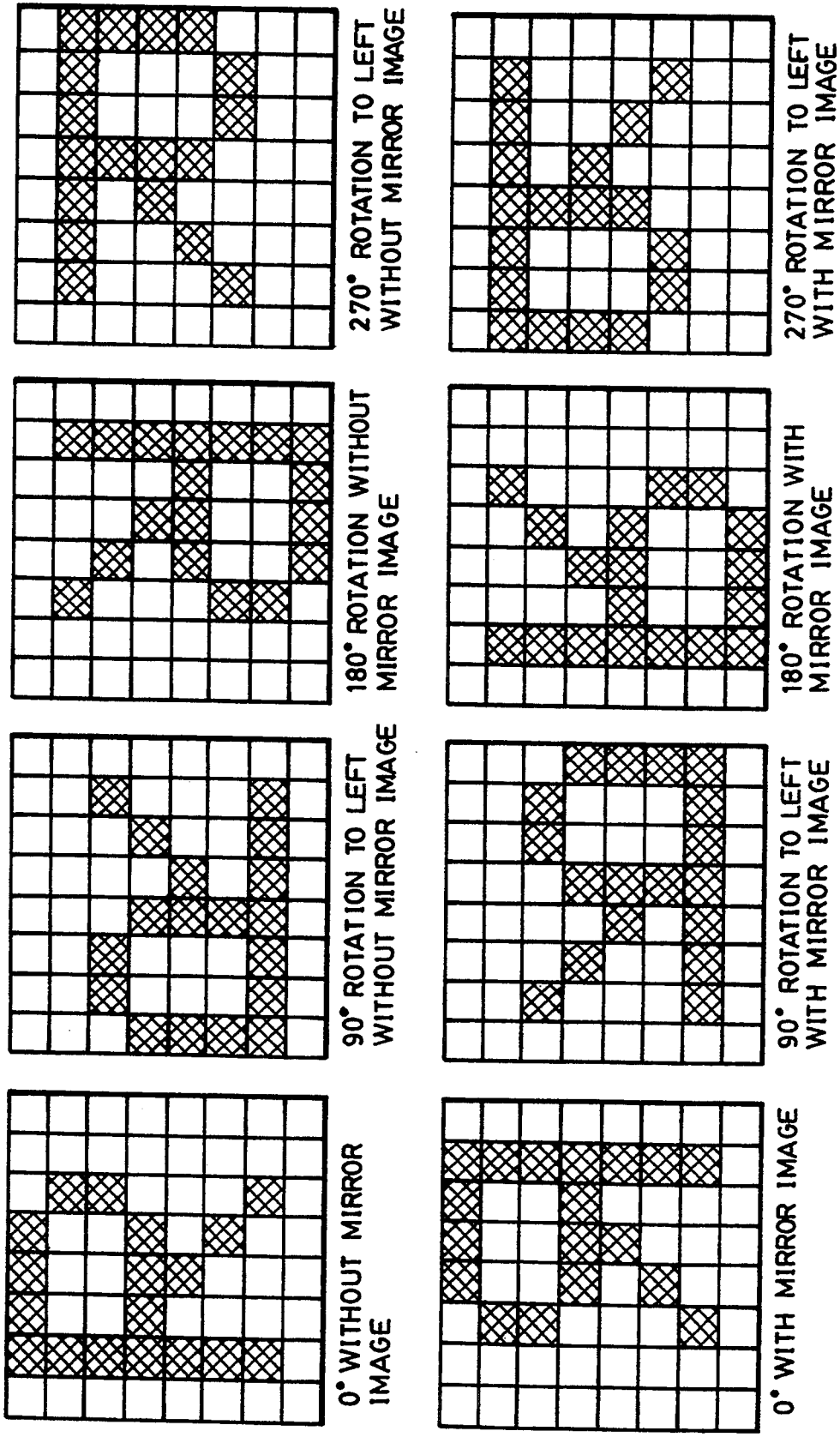
FIG. 14(B) illustrates specific examples of rotation/mirror-image processing using a character pattern "R"
Figure 15:
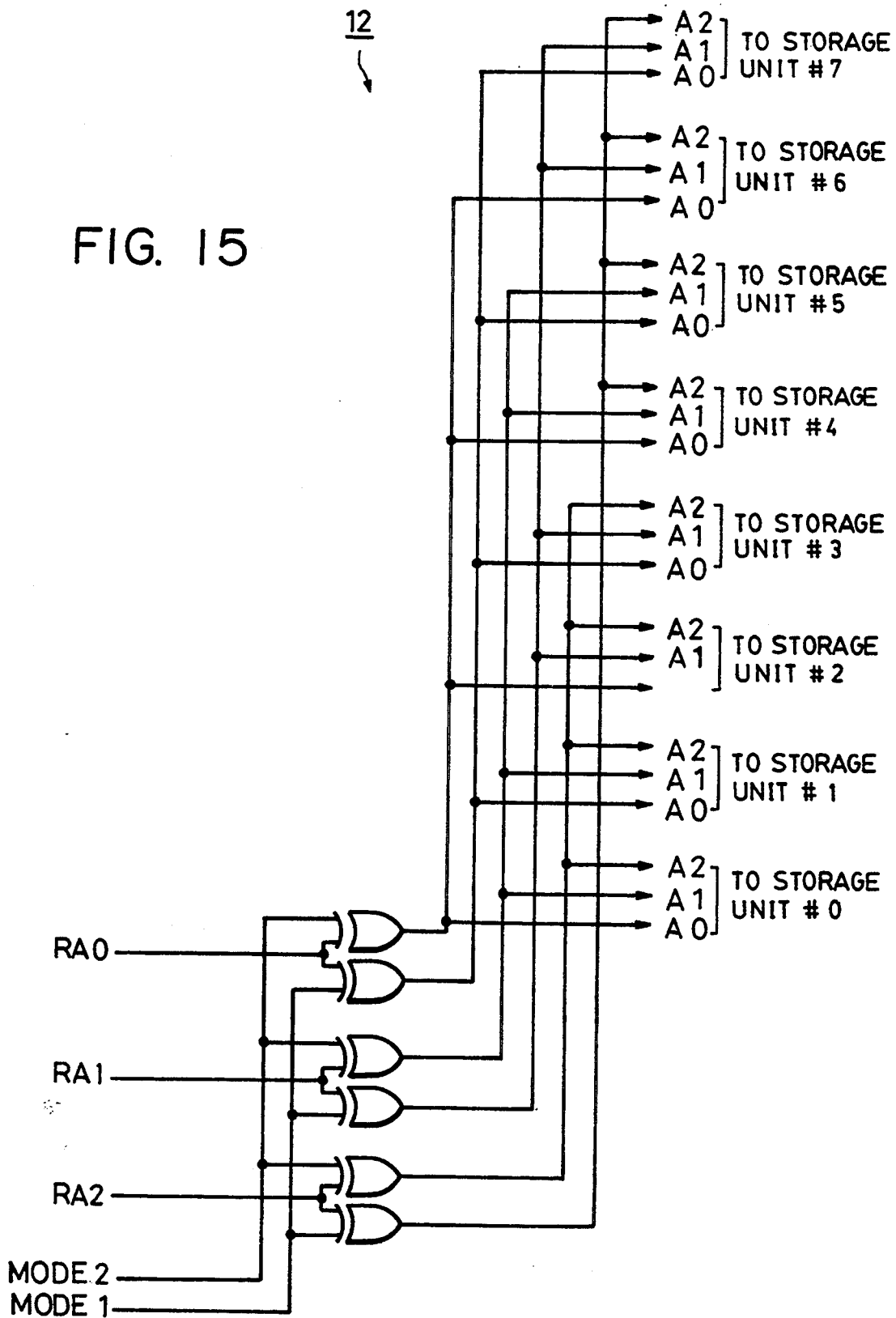
FIG. 15 is a circuit diagram of a row-address generation unit.
Figure 16A:
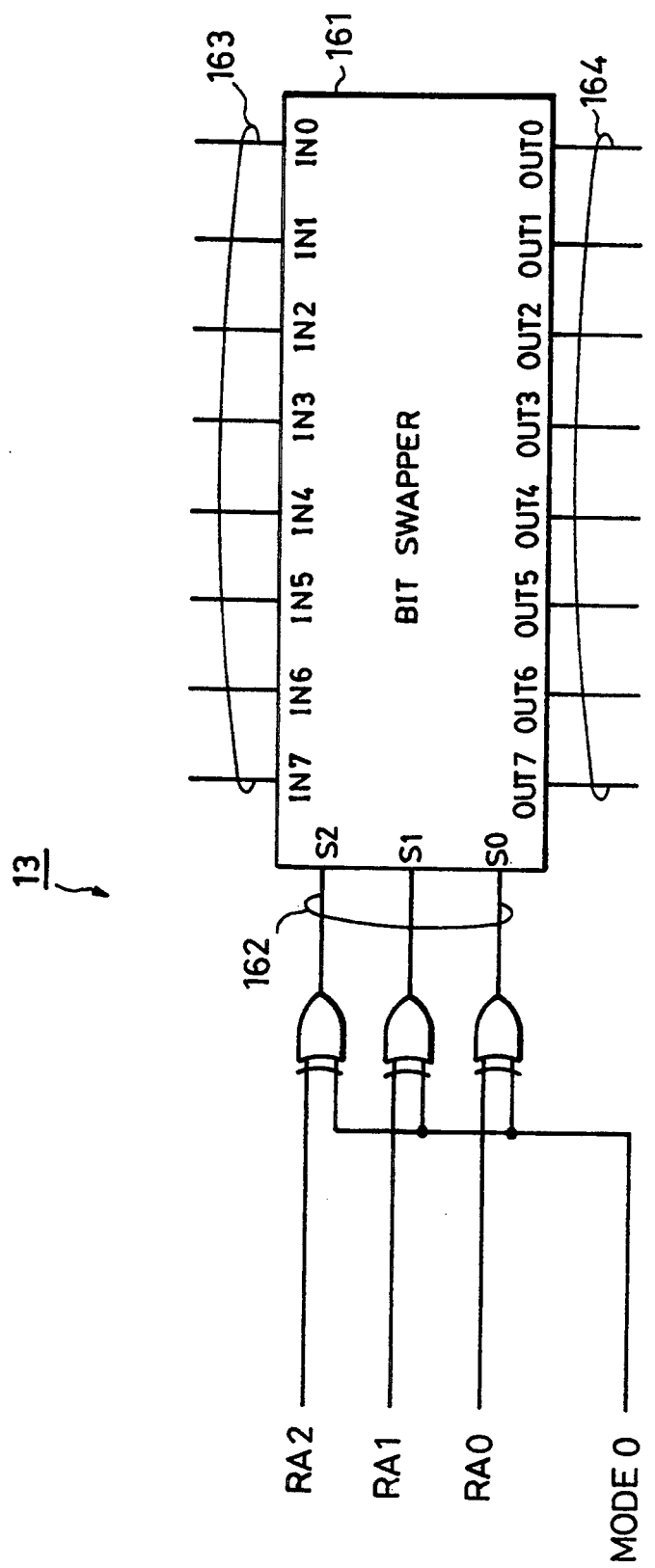
FIG. 16(A) is a circuit diagram of a rearranging unit.

When performing rearrangement according to such a rearranging method, the configuration of the row address generation unit 12 and the rearranging unit 13 becomes simplified. Furthermore, if assignment is performed using the rotation/mirror-image assigning code 17 comprising 3 bits represented by mode 2, mode1 and mode0, 8 kinds of rotation/mirror-image processing can be assigned by combining on and off of the respective bits, as shown in FIG. 14(A). FIG. 14(B) shows how the character pattern "R" is represented according to the 8 kinds of rotation/mirror-image processing shown in FIG. 14(A). The row address generation unit 12 and the rearranging unit 13 may be configured as shown in FIGS. 15 and 16(A), respectively. A bit swapper 161 shown in FIG. 16(A) performs rearrangement of bits. The bit swapper 161 assigns a rearranging method by rearrangement indicating input signals (S2-S0) 162, and performs rearrangement of bits in accordance with the above-described rearranging method (swap S2 S1 S0). This rearranging method is expressed by logical expressions shown in FIG. 16(B). As is apparent from these logical expressions, the bit swapper 161 is configured by eight 8→1 (indicating the selection of 1 datum from 8 data) bit selectors.

As described above, the present embodiment has the configuration of adding only the row address generation unit and the rearranging unit to the storage units having the entirely same storage capacity as a conventional character pattern generator, and the added row address generation unit and rearranging unit have very simple configurations. Hence, these components may be composed of ICs (integrated circuits) in the same manner as a conventional character pattern generator composed of ICs, and compact mounting of the components on a substrate may also be realized.

Although an explanation has been provided of two kinds of rearranging methods in the foregoing embodiment, the present invention may also be applied even if other rearranging methods are adopted. In such a case, the circuit configuration of the row address generation unit 12 and the rearranging unit 13 may be adapted to a rearranging method when storing a character pattern in the storage units 11.

Figure 17:
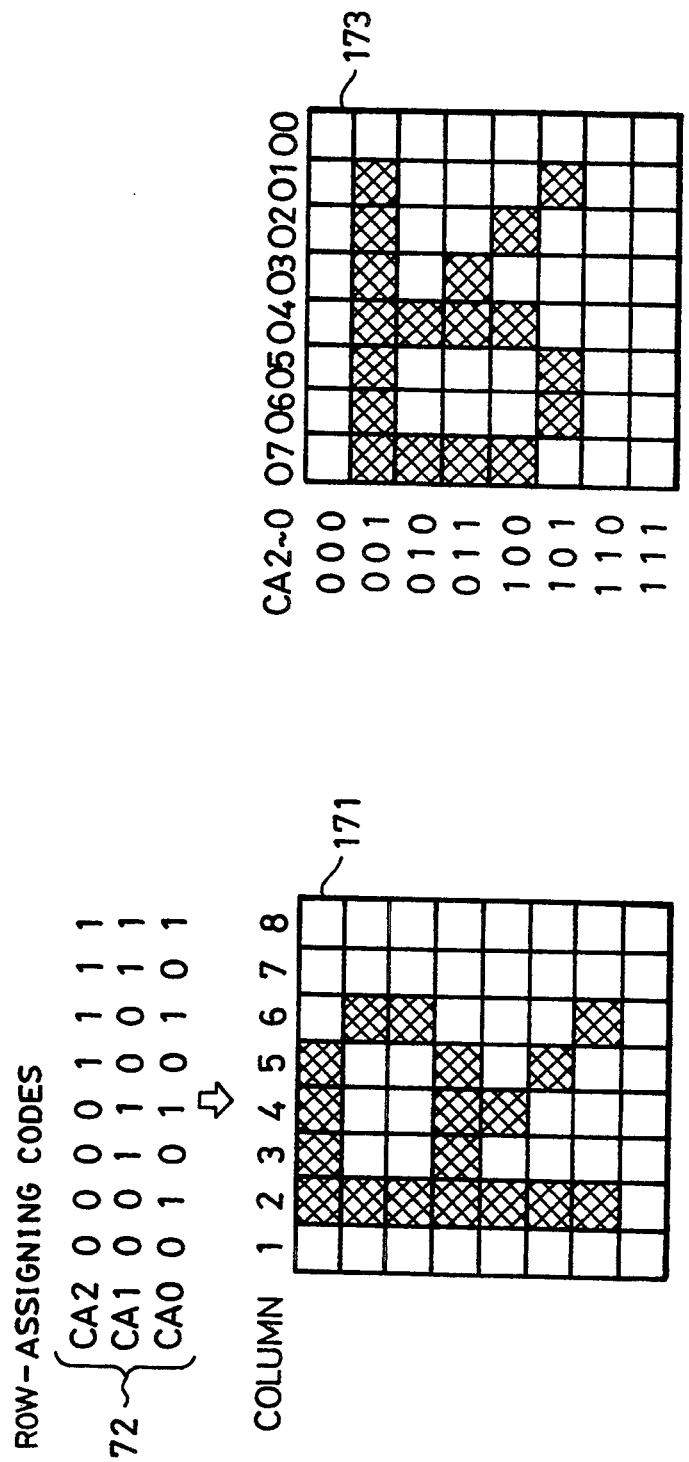
FIG. 17 illustrates rearrangement of the character pattern assuming column-direction access.

Although the foregoing embodiment assumes a character pattern generator wherein each row of a character pattern can be obtained by one access, the present invention may be course be applied to a character pattern generator which can access each column only be changing rows for columns. For example, in the foregoing embodiment explained with reference to FIGS. 9-16, rotation/mirror-image assignment is shown in FIG. 14(A), assuming that the pattern of each row is obtained by one access. When assuming that the pattern of each column is obtained by one access, the above-described assignment for rows may be changed to assignment for columns. This operation will be explained with reference to FIG. 17. First, if it is assumed that a character pattern "R" 171 is assigned by column-assigning codes (CA2-0) 172, accessed and read for every column, and patterns in the column direction can be obtained from character pattern output ports 07-00, the obtained character pattern 173 is entirely the same character patter as the character pattern in the case of 270° rotation counterclockwise shown in FIG. 13(B). By applying such a point of view to the cases of 0° rotation with mirror-image processing, 90° rotation counterclockwise with mirror-image processing and 180° rotation with mirror-image processing, if the meaning of the rotation/mirror-image assigning codes (mode 2-0) comprising three bits is changed as shown in FIG. 18, and the row-assigning codes (RA2-0) are replaced with the column-assigning codes (CA2-0), the pattern of a column can be accessed.

Comparing FIGS. 14(A) and 18 with each other, if attention is paid on mode 2 with making mode1=mode0=0, when mode2=0, while FIG. 14(A) showing the access to row patterns indicates 0° without mirror-image processing, FIG. 18 showing the access to column patterns indicates 270° rotation counterclockwise with mirror-image processing. When mode2=1, while FIG. 14(A) showing the access to row patterns indicates 270° rotation counterclockwise with mirror-image processing, FIG. 18 showing the access to column patterns indicates 0° without mirror-image processing. In other words, this property indicates that a row-direction access and a column direction access can be assigned with mode2=0 and mode2=1, respectively. As for a conventional character pattern generator composed of ICs, a generator which can access row-direction patterns and a generator which can access column-direction patterns are entirely different from each other. However, according to the present embodiment, one character pattern generator can provide patterns in a desired direction by assigning rows or columns.

Figure 20:
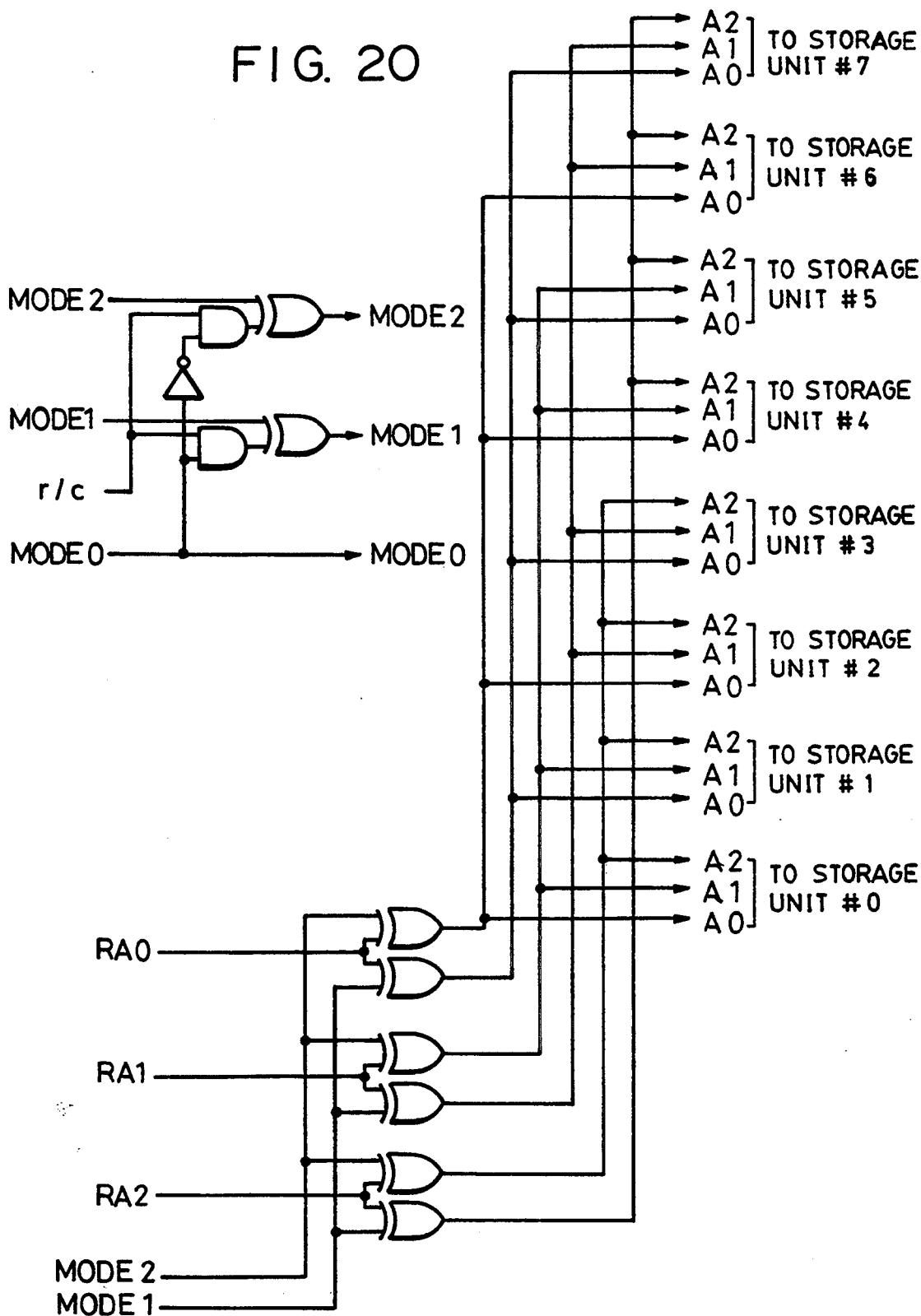
FIG. 20 is a circuit diagram of a row-address generation unit which can assign the direction of access.
Figure 21:
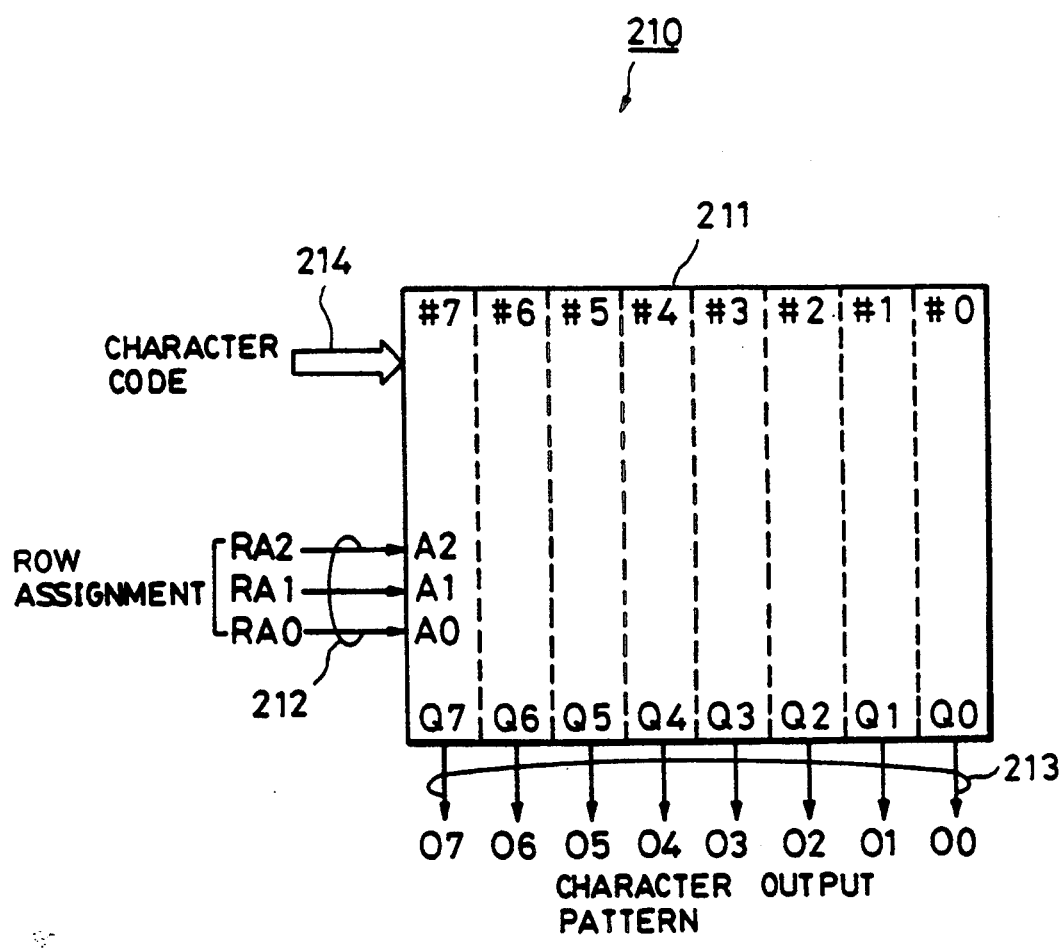

Furthermore, by introducing new rotation/mirror-image assigning codes (MODE2-0) and row/column assigning code (r/c), defining these codes as shown in FIG. 19, and configuring the row address generation unit 12 as shown in FIG. 20, it becomes possible to perform rotation/mirror-image assignment either in the case of access in units of a row or in the case of access in units of a column. At that time, the rearranging unit 13 shown in FIG. 16 may be used only by replacing mode0 with MODE0.

If r/c=0 in the row address generation unit shown in FIG. 20, mode2=MODE2, and mode1=MODE1. Hence, this row address generation unit performs the same function as the row address generation unit shown in FIG. 15, and the direction of access becomes the row direction, as shown in FIG. 19. It can be understood that the rotation/mirror-image assignment at that time is entirely the same as in the case of FIG. 14(A). On the other hand, if r/c=1 in the row address generation unit shown in FIG. 20, mode2=(MODE2 exor MODE0), and mode1=(MODE1 exor MODE0). Hence, for example, in the case of 0° without mirror-image processing in the column-direction access, MODE2-0=0, mode 2=1, mode1=0, and of course, mode0=0 (mode0=MODE0). This result coincides with 0° without mirror image processing shown in FIG. 18. In the same manner, also in other rotation/mirror-image assignment, when r/c=1 (column-direction access), the values of MODE2-0 are converted into mode2-0 shown in FIG. 18, and predetermined rotation/mirror-image assignment can be obtained. By thus assigning the row direction or the column direction by the code r/c, and assigning rotation/mirror-image processing by MODE-2-0, a character pattern corresponding the the assignment can be obtained by one access.

Second Embodiment

A second embodiment of the present invention will now be explained in detail with reference to the attached drawings.

Figure 24:
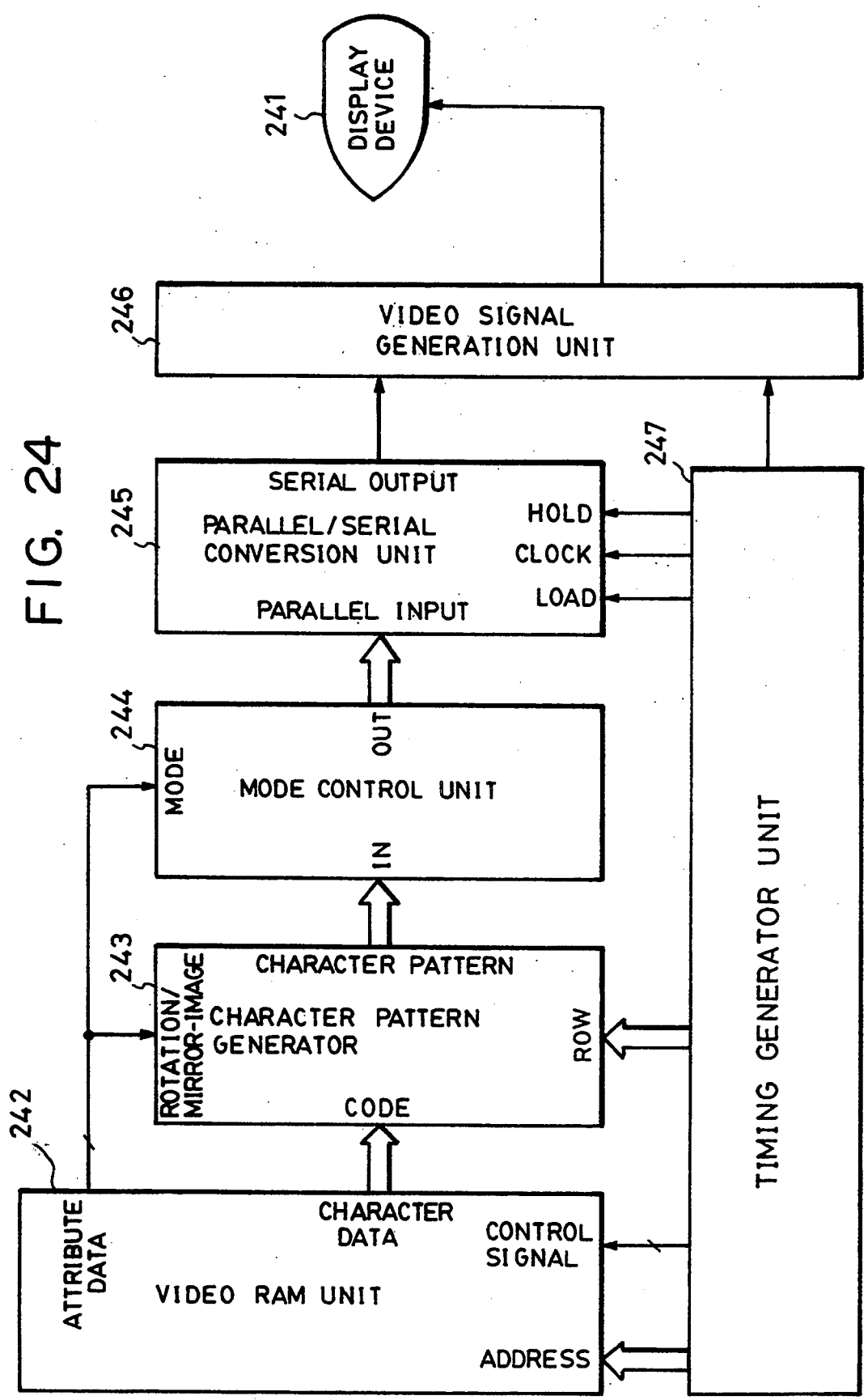
FIG. 24 is a block diagram showing the configuration of a display control apparatus according to a second embodiment of the present invention.

FIG. 24 is a block diagram showing a display control apparatus having a character pattern in the form of a matrix wherein one character comprises 8 dots×8 dots according to the second embodiment. In FIG. 24, the apparatus includes a display device 241. A video RAM unit 242 stores character codes to be displayed and their attribute data (modes or rotation/mirror-image assignment). A character pattern generator 243 generates the corresponding character pattern from a character code stored in the video RAM unit 242. A mode control unit 244 performs reverse, blink, secret or the like processing for the character pattern generated by the character pattern generator 243. A parallel/serial conversion unit 245 transfers a pattern transmitted from the mode control unit 244 to the display device 241 in units of a picture element. A video signal generator unit 246 generates a video signal from a signal transmitted from the parallel/serial conversion unit 245. A timing generator unit 247 generates character addresses and control signals for the video RAM unit 242, row-assigning signals for a character pattern for the character pattern generator 243, control signals for the parallel/serial conversion unit 245, and control signals for the video signal generation unit 246.

Figure 25:
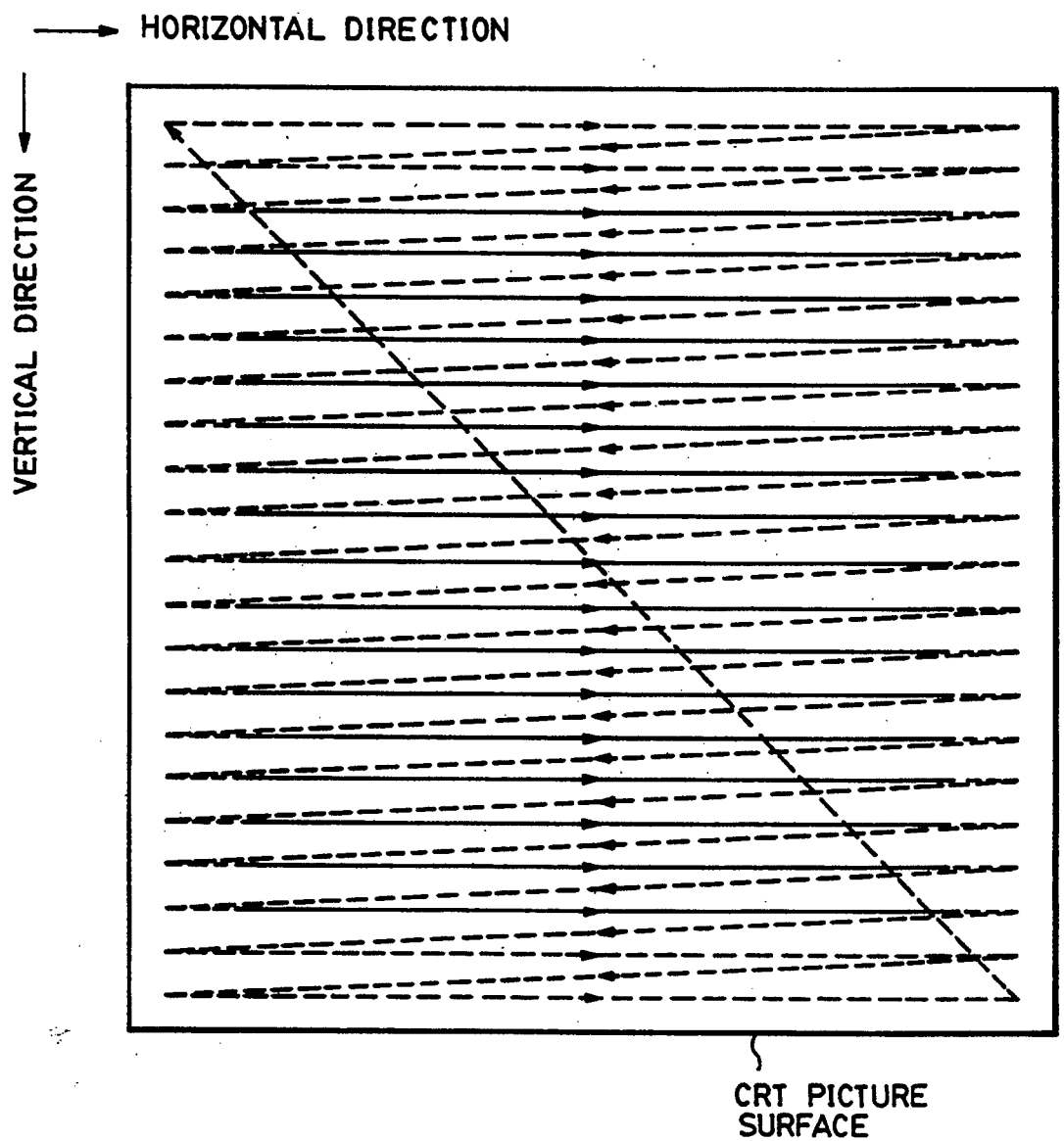
FIG. 25 illustrates scanning of a CRT.
Figure 26:
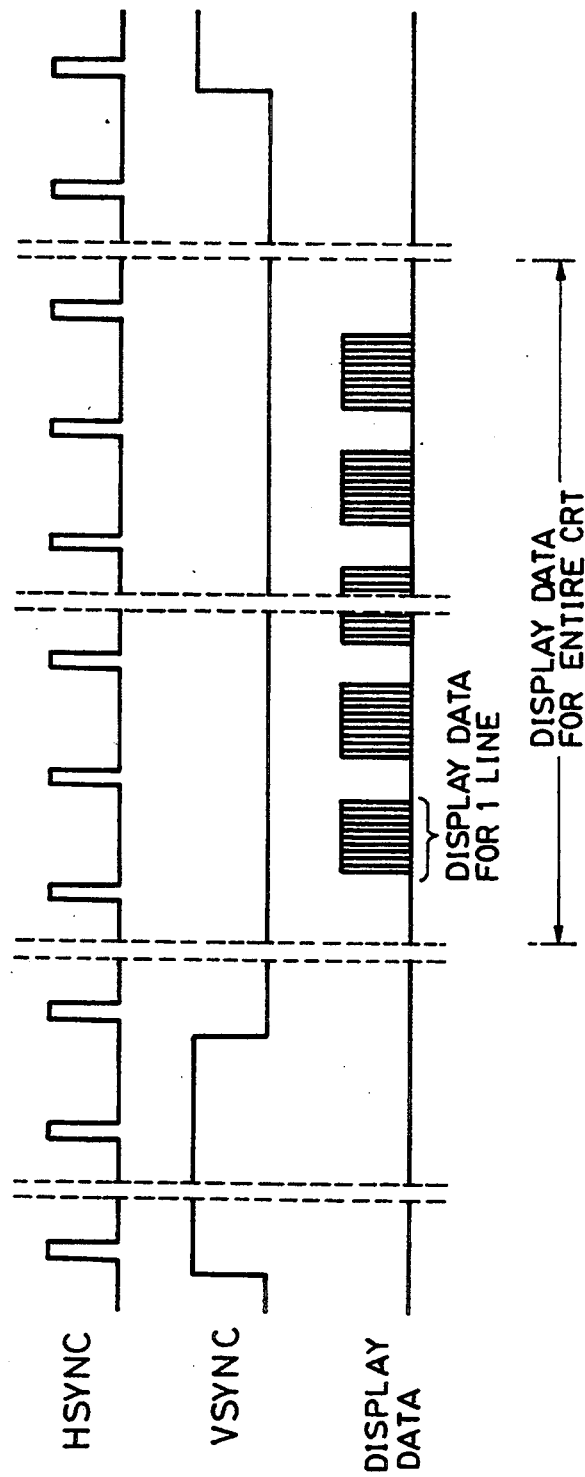
FIG. 26 is a time chart of video signals.

An explanation will now be provided of a procedure of transmitting a character pattern when the display device 241 comprises, for example, a raster-scanning-type CRT display (hereinafter termed a CRT). In the case of displaying pattern data according a raster-scanning method, in general, the CRT is scanned from the left to the right to sequentially display every picture element. When scanning reaches the right end, scanning returns to the left end without performing display. By repeating this operation, picture elements on every line are displayed from above to below. As shown in a timing chart of control signals of FIG. 26, in such scanning, the timing of scanning in the horizontal direction is based on a horizontal synchronizing signal (hereinafter termed an HSYNC signal). If scanning reaches the lowermost portion of the CRT while continuing scanning in the horizontal direction, scanning is returned to the uppermost portion of the CRT without performing display. The same operation is repeated thereafter. The timing of scanning in the vertical direction is based on a vertical synchronizing signal (hereinafter termed a VSYNC signal). FIG. 25 schematically illustrates the way of scanning. In FIG. 25, solid lines represent scanning while performing display, and broken lines represent scanning in a state of not performing display. Accordingly, in the case of a character pattern wherein one character comprises 8 dots×8 dots, a character for one line can be displayed by scanning for 8 lines.

Figure 27:
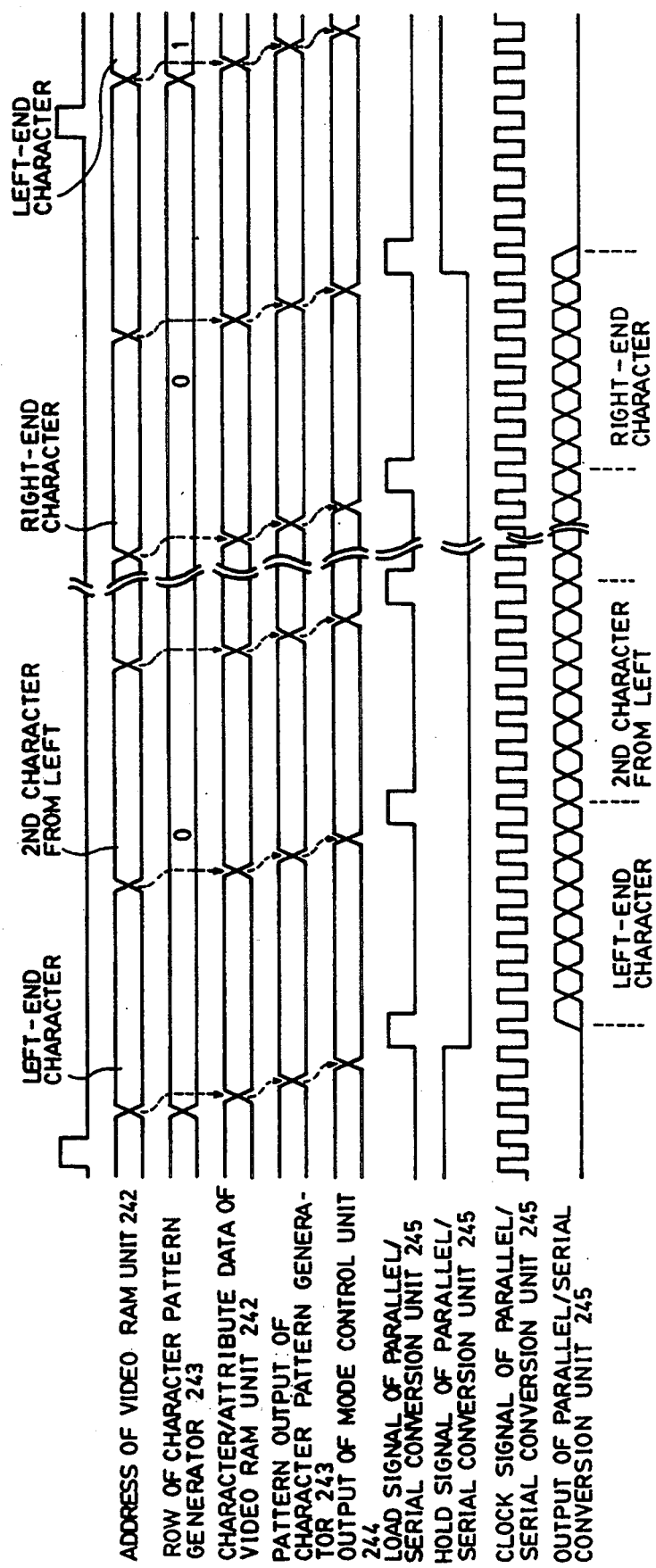
FIG. 27 is a time chart of control signals showing operations of respective units of the display control device.
Figure 28:
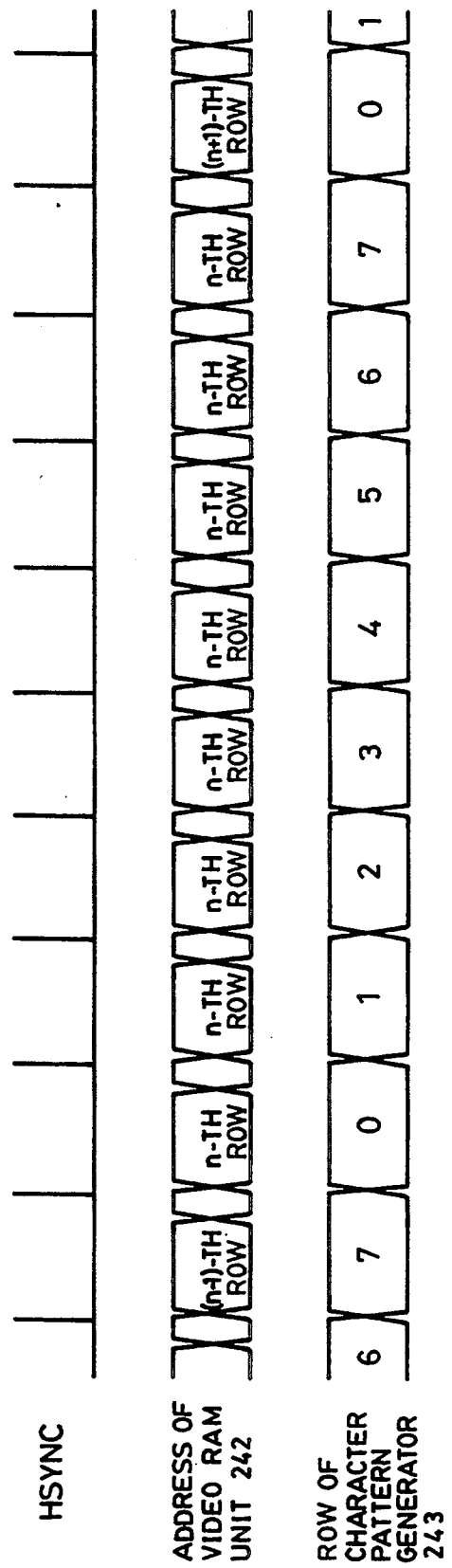
FIG. 28 is a time chart showing the relationship between character pattern signals and horizontal synchronizing signals.
Figure 29:
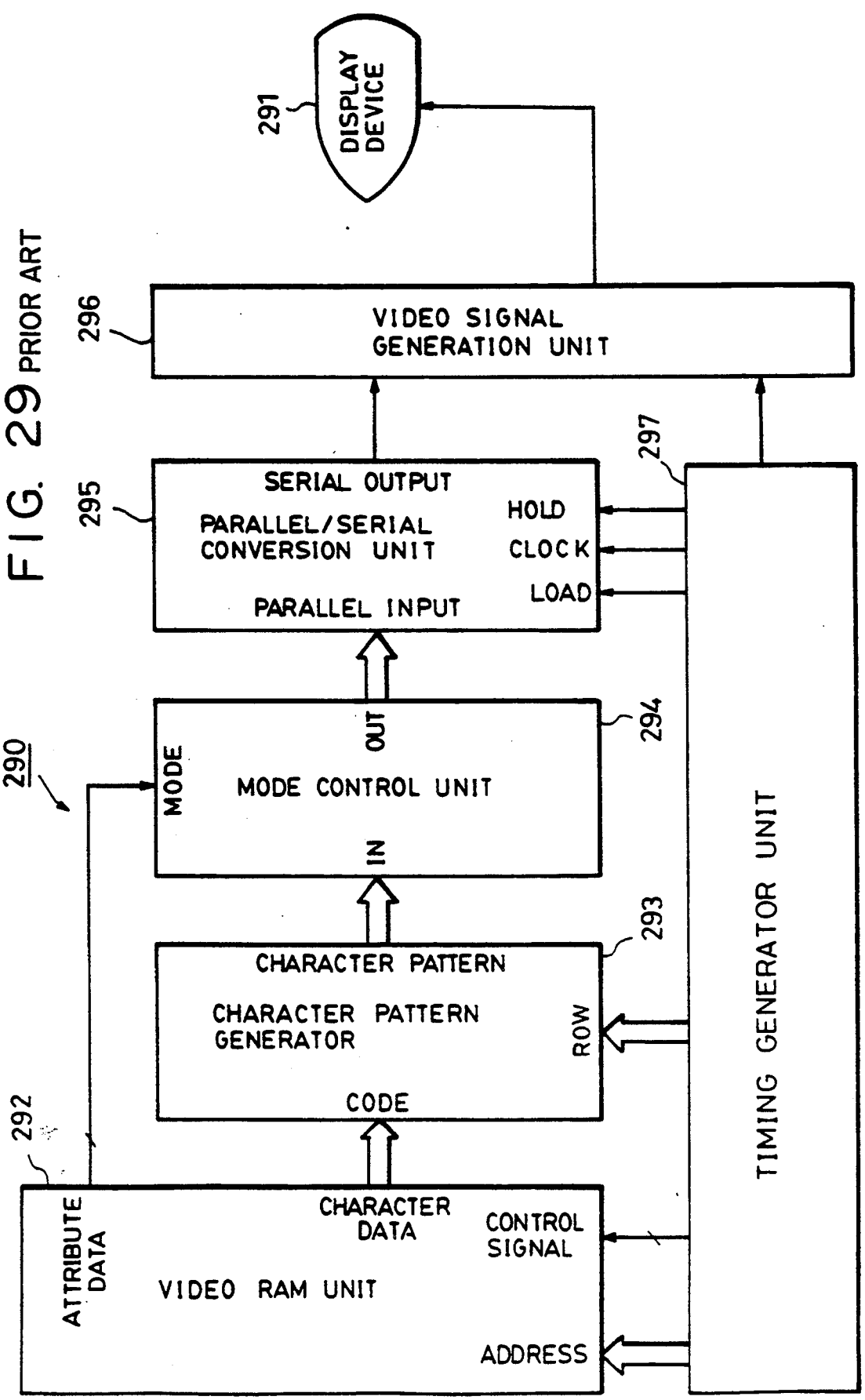
FIGS. 29-33 are diagrams illustrating a conventional approach.
Figure 30:
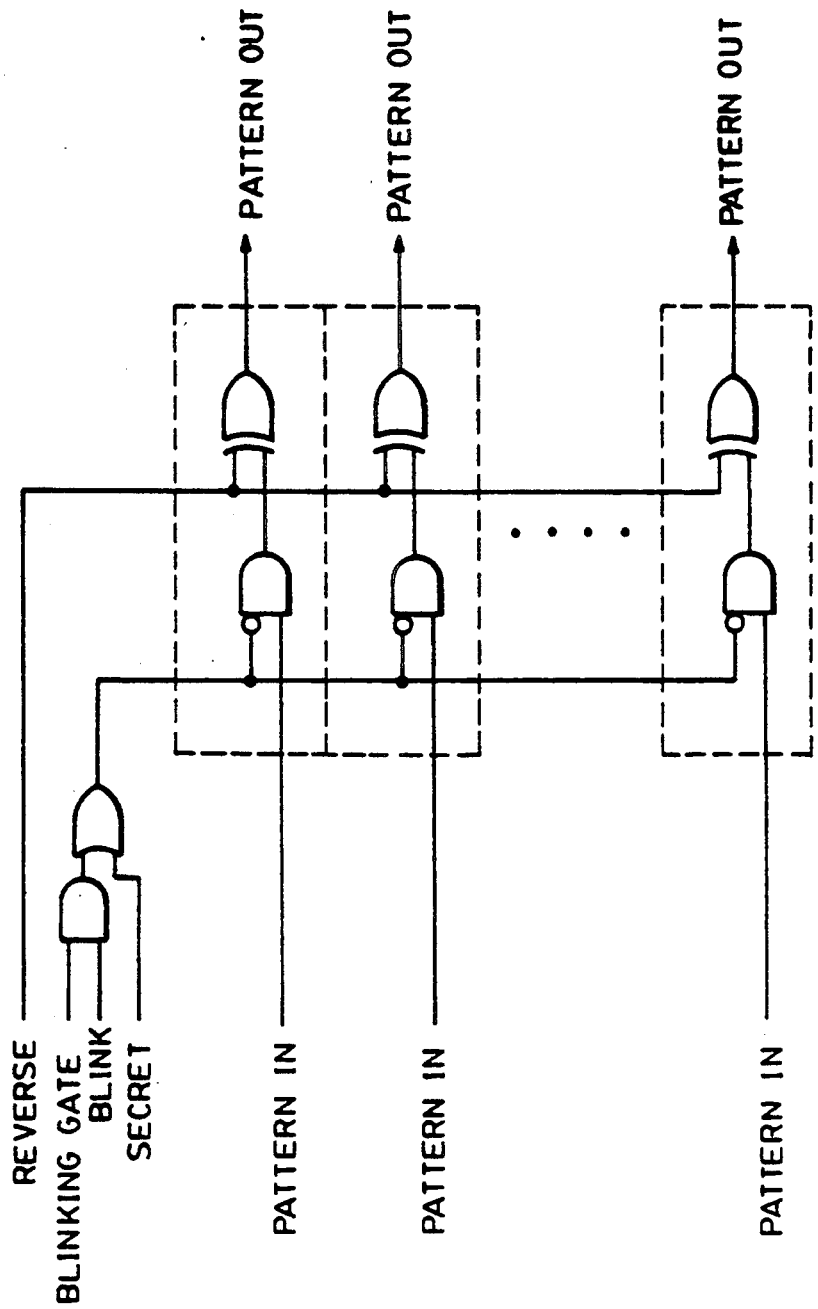
Figure 31B:
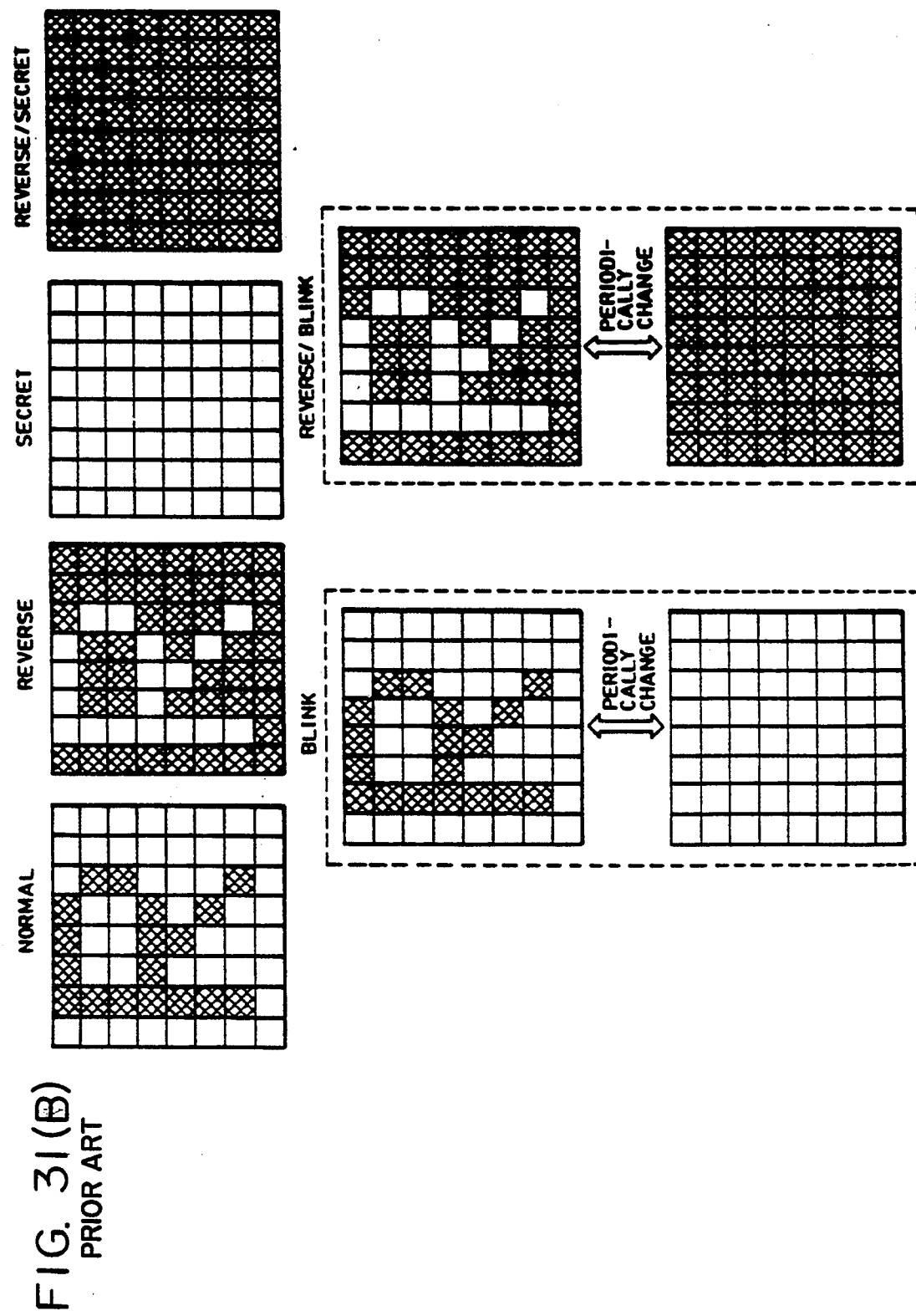
Figure 32:
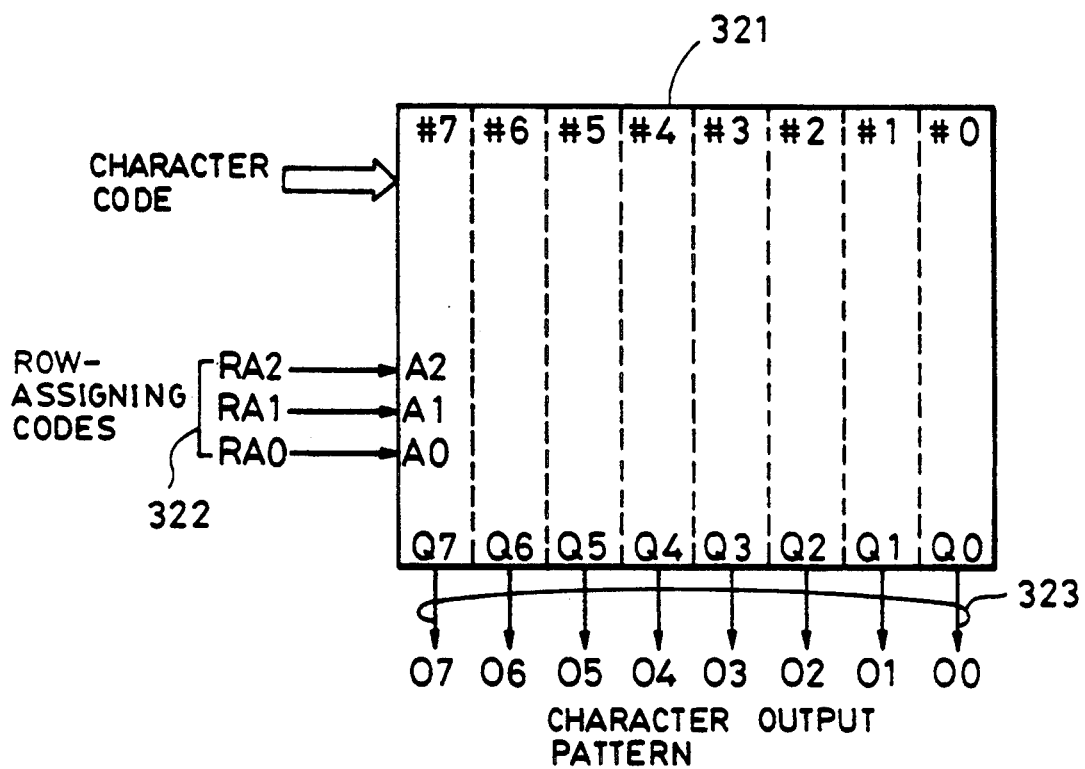
Figure 33:
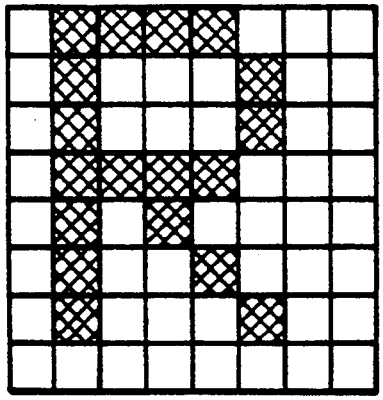

FIG. 27 is a timing chart showing control timings for 1-line scanning when starting display in detail. In synchronization with turning on of an HSYNC signal, the timing generator unit 247 generates addresses storing character-code data of a character to be displayed on the upper left end of the CRT and corresponding attribute data of the character for the video RAM unit 242. In response, the video RAM unit 242 outputs the corresponding character data and attribute data. Subsequently, the timing generator unit 247 generates a row-assigning code (at first, the first row is assigned) for the pattern generator 243. The pattern generator 243 then generates the pattern of the portion of the corresponding row of the corresponding character pattern according to the character data and attribute data output from the video RAM unit 242 and the row-assigning code transmitted from the timing generator 247. One character has a dot pattern comprising 8 dots×8 dots. Hence, as shown in FIG. 28, every time the HSYNC signal is turned on, the dot pattern is sequentially output from the first row to the eighth row of the character pattern. The thus generated character pattern is processed by the mode control unit 244. The parallel/serial conversion unit 245 outputs the character pattern in units of a picture element according to control signals (clock signals, load signals and the like) transmitted from the timing generator unit 247. The video signal generation unit 246 generates video signals for the display device 241 according to signals in units of a picture element output from the parallel/serial conversion unit 245, HSYNC signals and VSYNC signals.

Third Embodiment

A third embodiment of the present invention will now be explained in detail with reference to the attached drawings.

Figure 34:
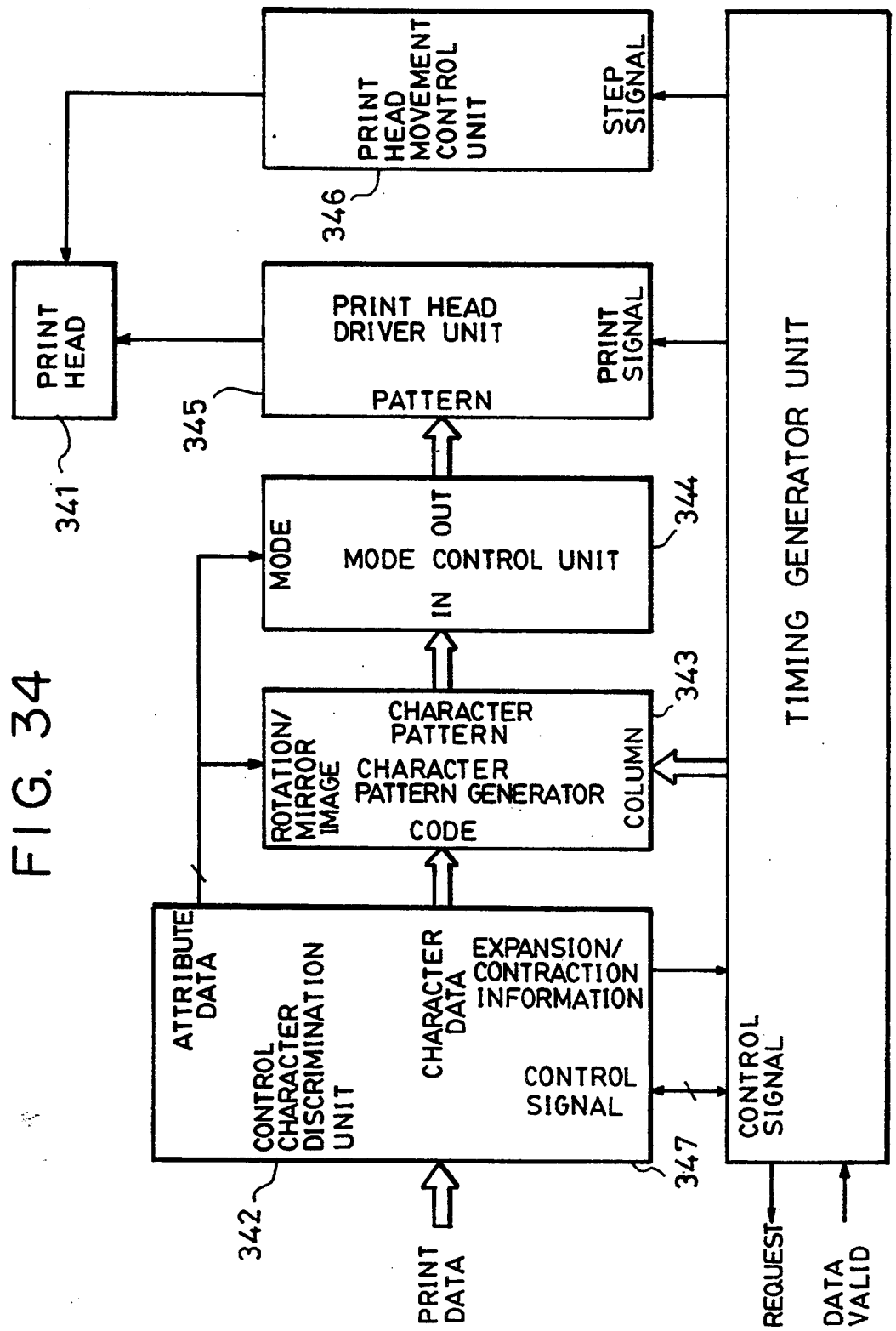
FIG. 34 is a block diagram showing the configuration of a printer device according to a third embodiment of the present invention.

FIG. 34 is a block diagram showing the configuration of a printer device having original character patterns in the form of a matrix wherein one character comprises 8 dots×8 dots according to the third embodiment. In FIG. 34, there is shown a print head 341. A control character discrimination unit 342 outputs data of a character to be printed, attribute data and expansion/contraction information of the character from print data. A character pattern generator 343 generates the corresponding character pattern from a character code transmitted from the control character discrimination unit 342. A mode control unit 344 performs processing, such as reversal, underline, overline or the like processing, of the character pattern generated by the character pattern generator 343. A print head driver unit 345 transmits signals to the print head 341 in order to print the pattern transmitted from the mode control unit 344. A print head movement control unit 346 moves the print head 341. A timing generator unit 347 performs the generation of column-assigning signals for the character pattern generator 343, print timing signals (hereinafter termed print signals) for the print head driver unit 345, control signals (hereinafter termed step signals) for the print head movement control unit 346, or the like.

Figure 35:
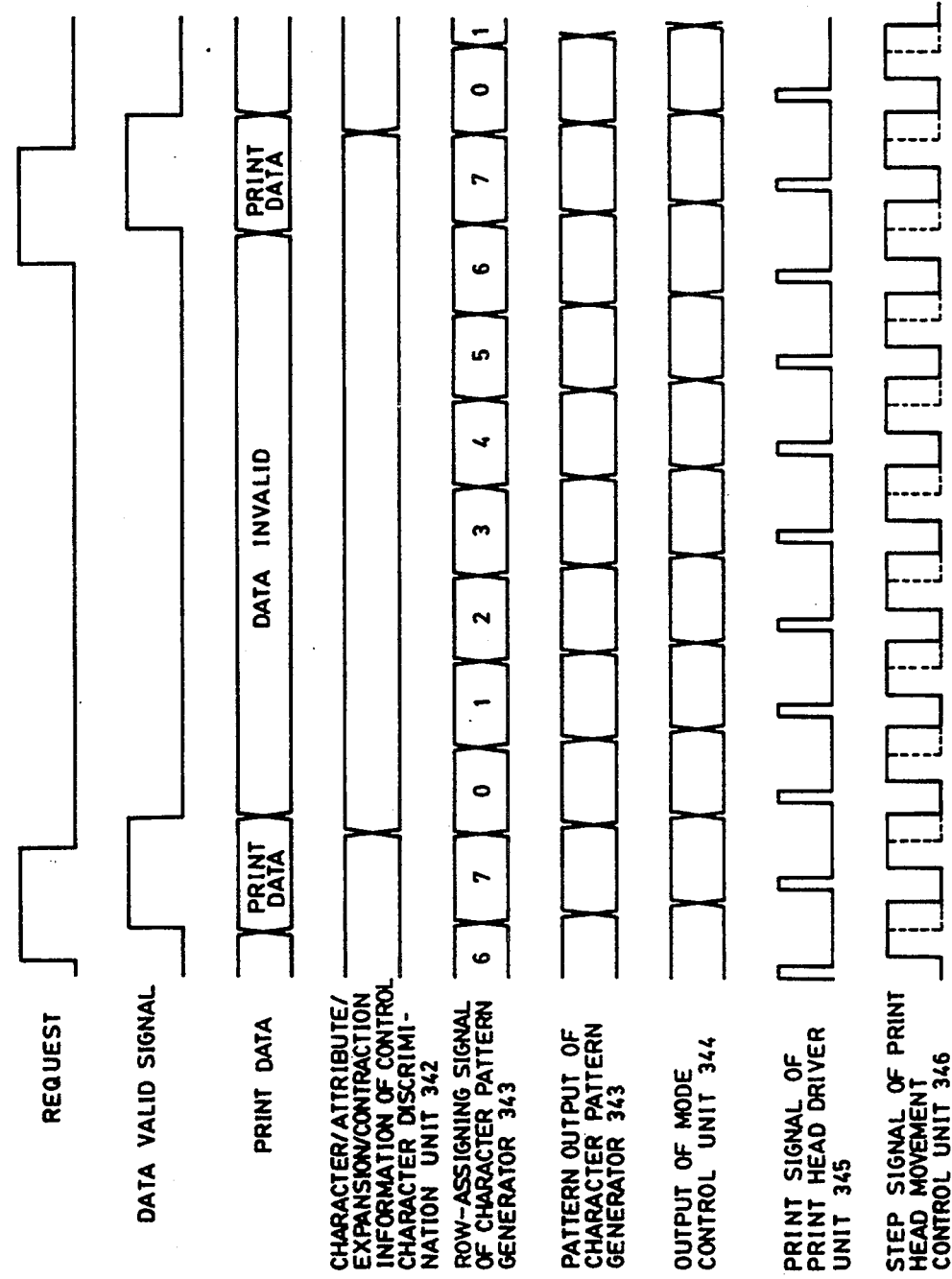
FIGS. 35 and 36 are time charts of control signals showing operations of respective units of the printer device.

First, an explanation will be provided of the operations of normal printing, double-size printing, reduced-size printing and emphasizing printing. FIG. 35 is a timing chart of control signals for controlling the operations of respective units of the printer device when printing one character. The timing generator unit 347 turns on a request signal for requesting print data. Print data are valid while a data valid signal is turned on. When the control character discrimination unit 342 has recognized the data valid signal, the request signal is turned off, and at the same time the print data are latched. By turning off the request signal, the print data and data valid signal are also turned off. According to the print data, character data, attribute data, and expansion/contraction information (information indicating double-size printing or reduced-size printing) are output from the control character discrimination unit 342 to the character pattern generator 342, the character pattern generator and the mode control unit 344, and the timing generator unit 347, respectively, while the print head 341 prints 8 columns, that is, for one character. The timing generator unit 347 outputs column-assigning signals to the character pattern generator 343 while the print head 341 prints 8 columns, that is, for one character. In FIG. 35, numerals 0-7 indicated in column-assigning signals of the character pattern generator 343 correspond to the 1st-8th column from the left of a character pattern in the form of a dot matrix comprising 8 dots×8 dots. The character pattern generator 343 outputs the portions of the corresponding columns of the corresponding character pattern in accordance with the character code, rotation/mirror-image assignment and column-assigning signals. The output pattern is processed by the mode control unit 344 and transmitted to the print head driver unit 345. At that time, the timing generator unit 347 transmits a print signal to the print head driver unit 345 making the column-assigning signal 0, to print the pattern of the left-end column of the character pattern in the from of the dot matrix, and then transmits a step signal to the print head movement control unit 346 to move the print head 341. Subsequently, the timing generator unit 347 generates a print signal and a step signal in order to print the pattern of the second column from the left of the character pattern making the column-assigning signal 1. Subsequently, by repeating the same operation until the column-assigning signal becomes 7, printing for one character is completed. In FIG. 35, by providing a step signal as shown by broken lines to reduce the amount of the movement of the print head 341 to half of a normal amount, reduced-size printing becomes possible.

Figure 36:
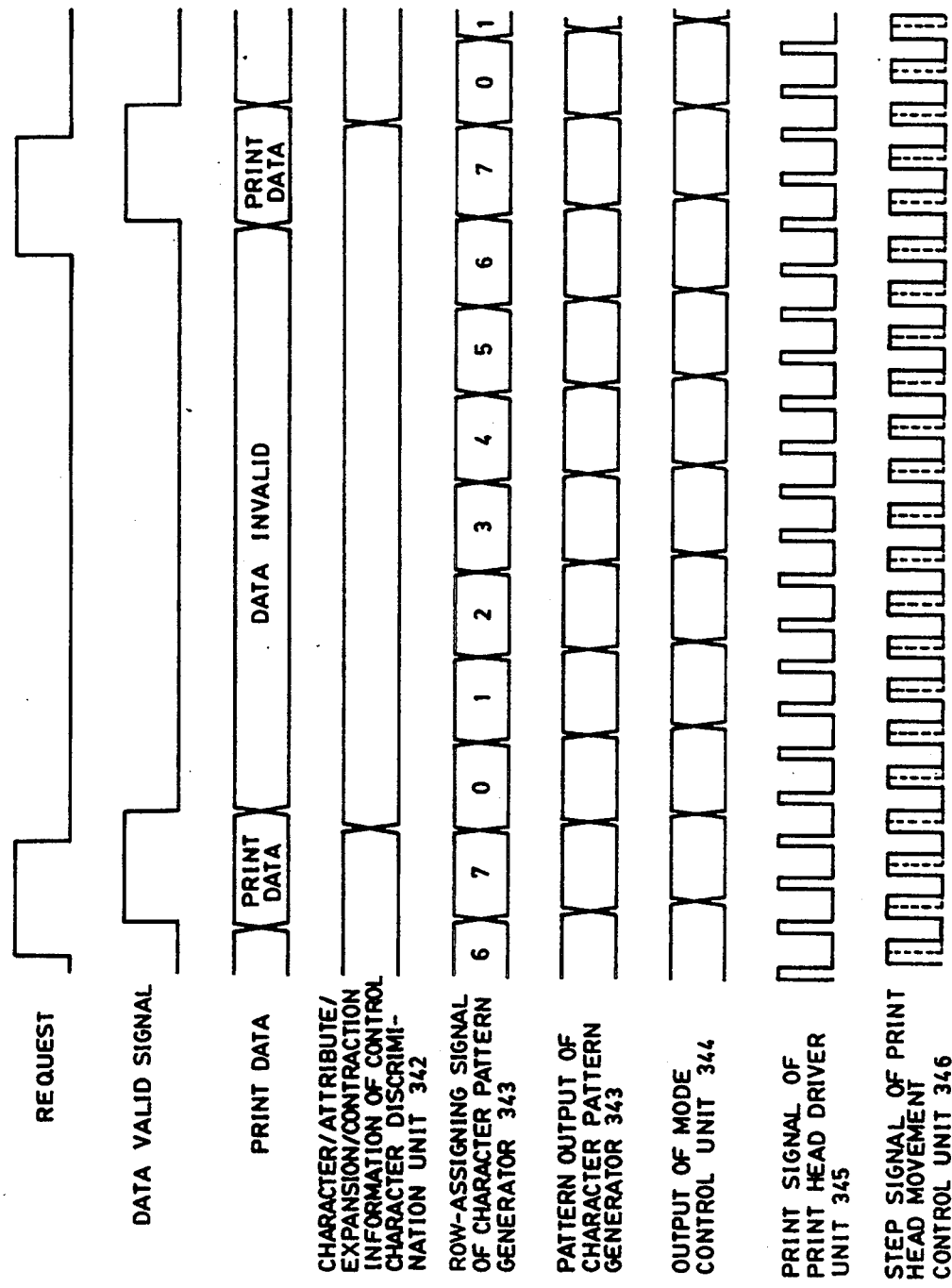
Figure 37:
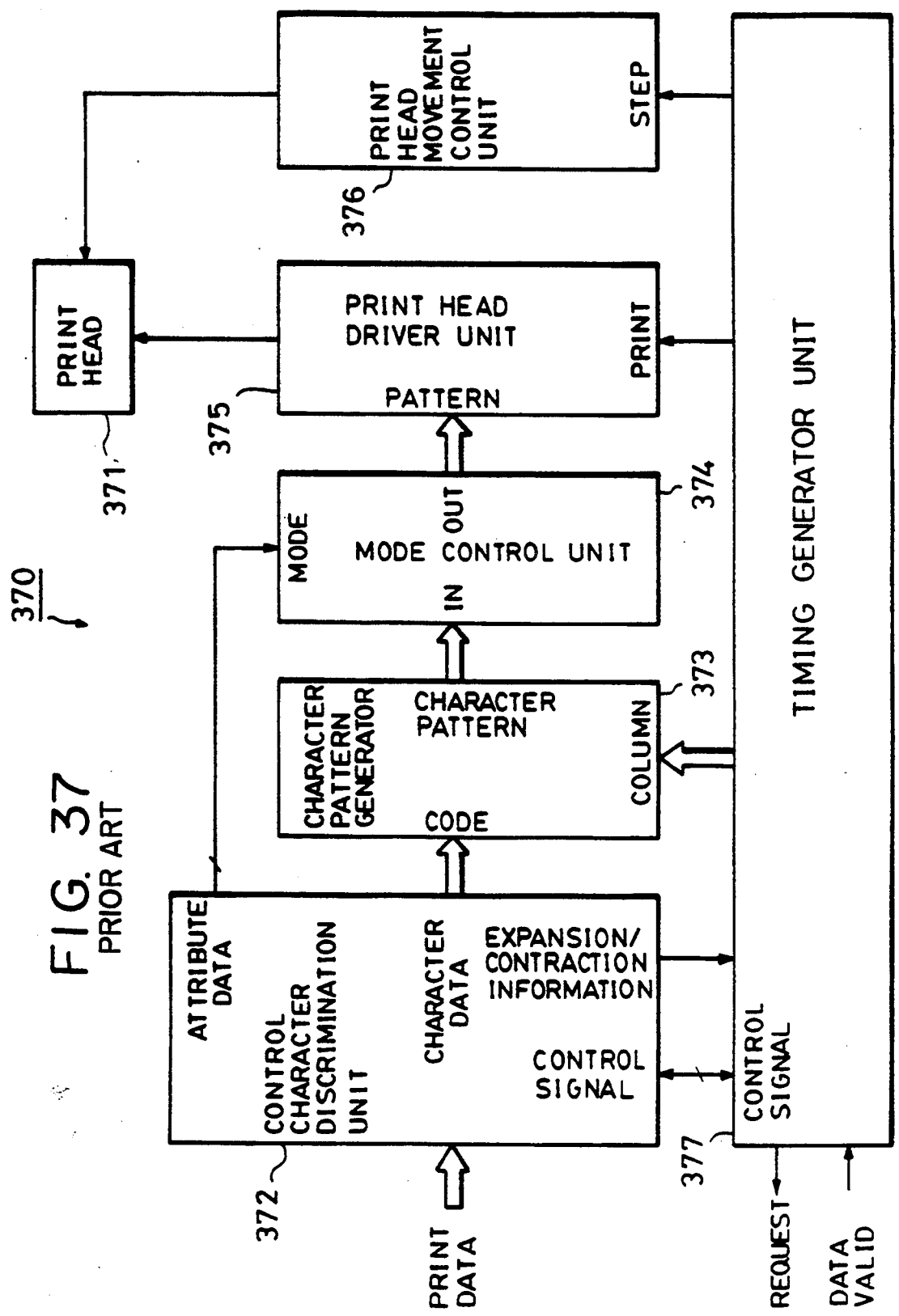
Figure 38:
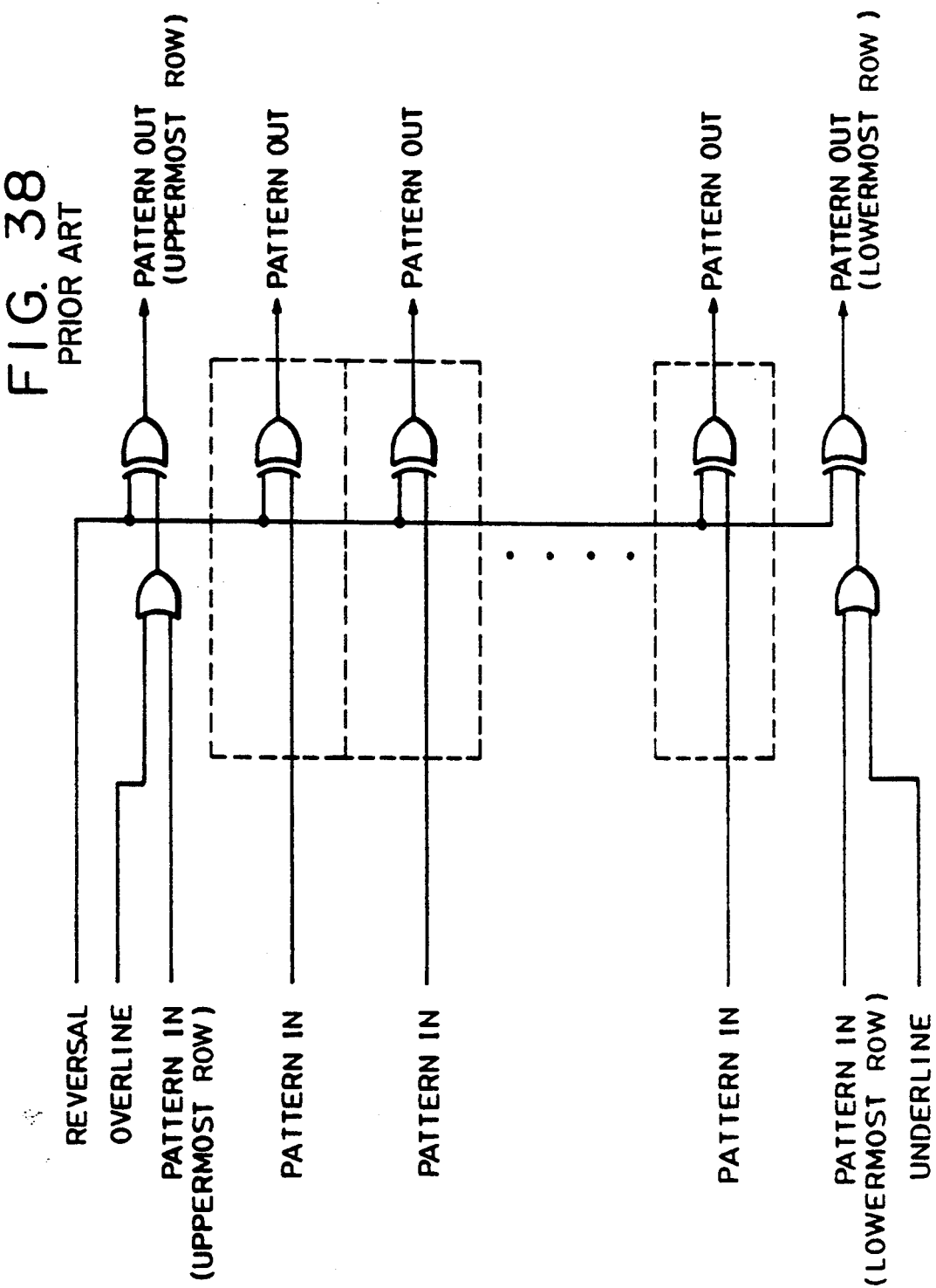
Figure 39B:
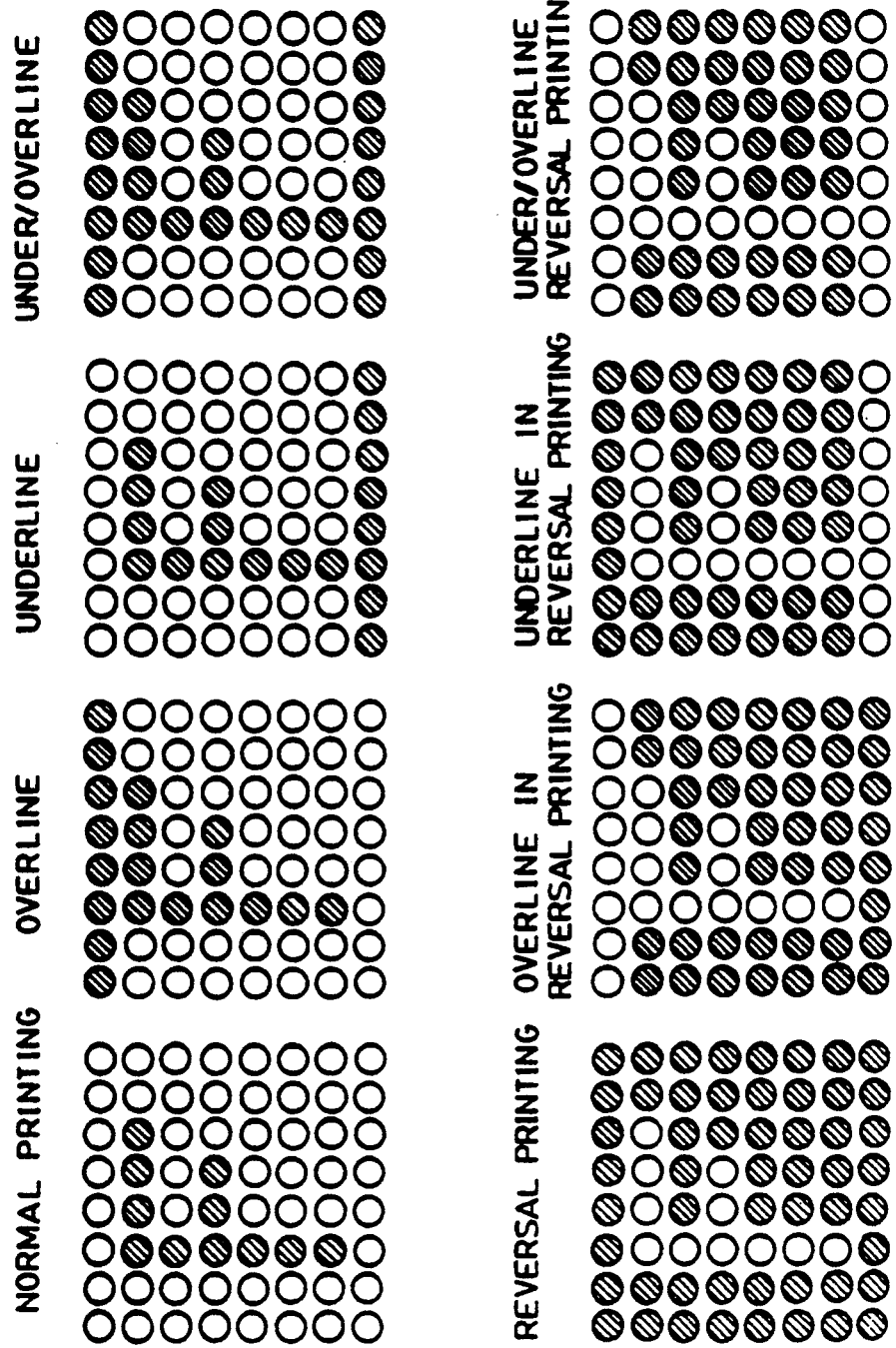
Figure 41A:
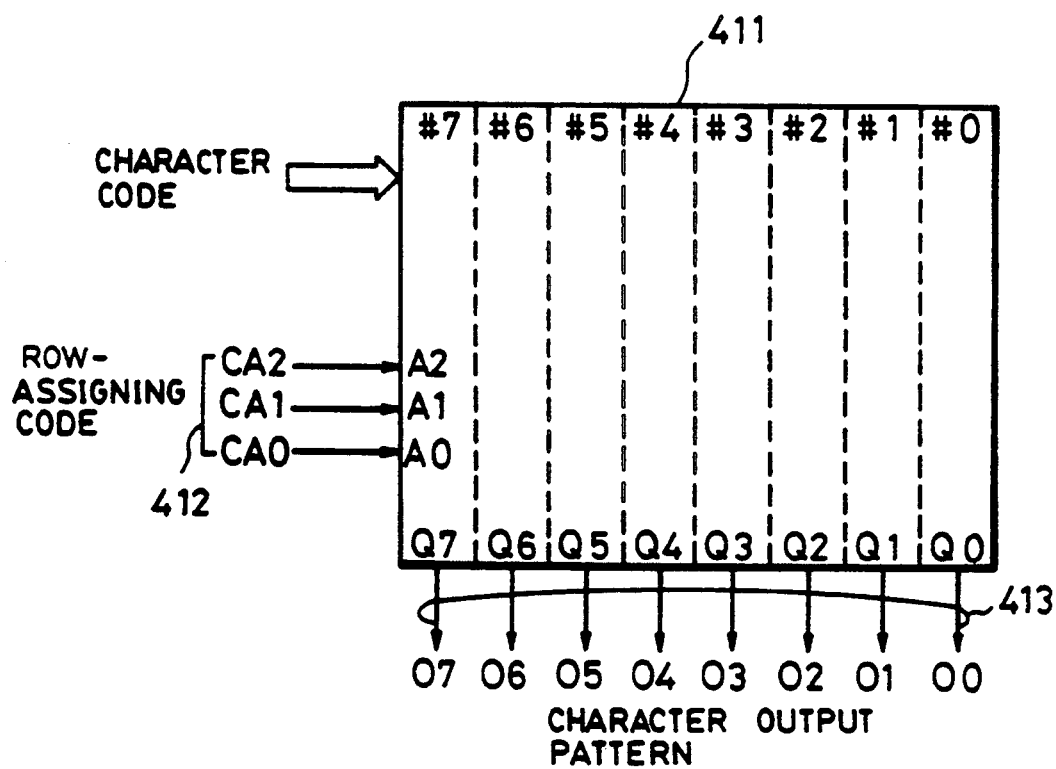
Figure 41B:
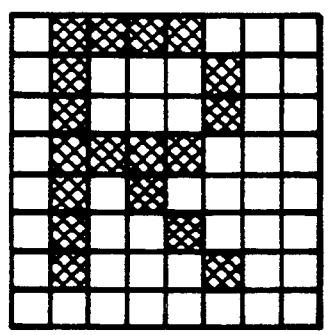

FIG. 36 is a timing chart when performing double-size printing. The timing generator unit 347 first makes the column-assigning signal 0, and then repeats both the print signal and step signal twice to print the left-end column of the character pattern in the form of the dot matrix twice. Subsequently, by repeating the same operation until the column-assigning signal becomes 7, a character having a lateral width which is twice the width obtained in normal printing can be printed. At that time, by making the step signal to perform a half-step as shown by broken lines, emphasizing printing becomes possible.

A paper-feed mechanism which is usually necessary in a printer device is omitted, since it is unnecessary in explaining the present embodiment.

Fourth Embodiment

A fourth embodiment of the present invention will now be explained in detail with reference to the attached drawings.

Figure 42:
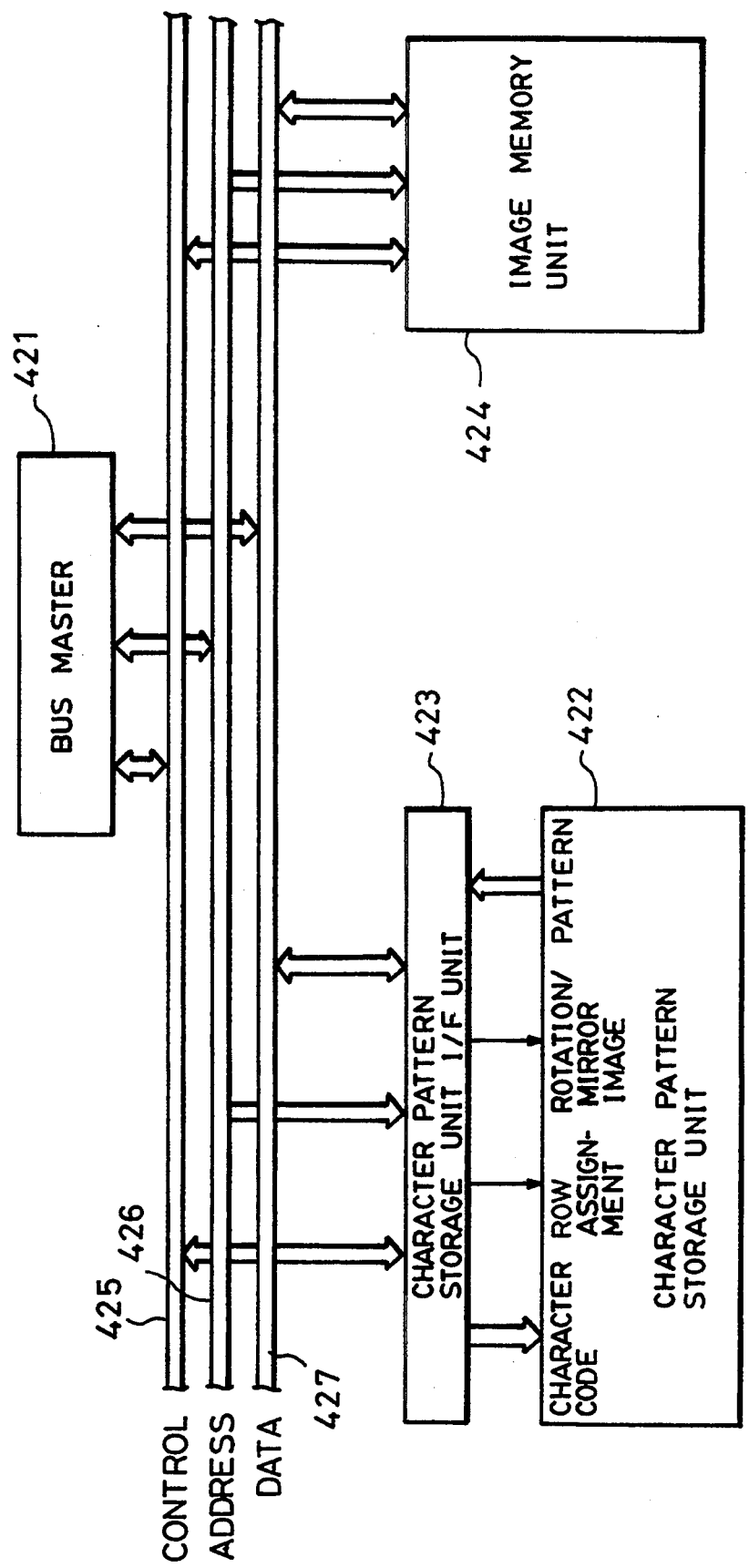
FIG. 42 is a diagram of the configuration of an image processing apparatus according to a fourth embodiment of the present invention.

FIG. 42 illustrates an image processing apparatus. In FIG. 42, a bus master 421 possesses buses for a CPU, a graphic controller, a DMA controller and the like. A character pattern storage unit 422 stores character patterns. A character pattern storage unit interface (I/F) unit 423 intermediates between the character pattern storage unit 422 and respective buses. An image memory unit 424 stores image information, such as character patterns and image data read from the character pattern storage unit 422, and comprises, for example, a frame memory for bit-map display, an image buffer for storing information read by a scanner, or printer output information, or the like. There are also shown a control bus 425, an address bus 426, and a data bus 427.

Figure 43:
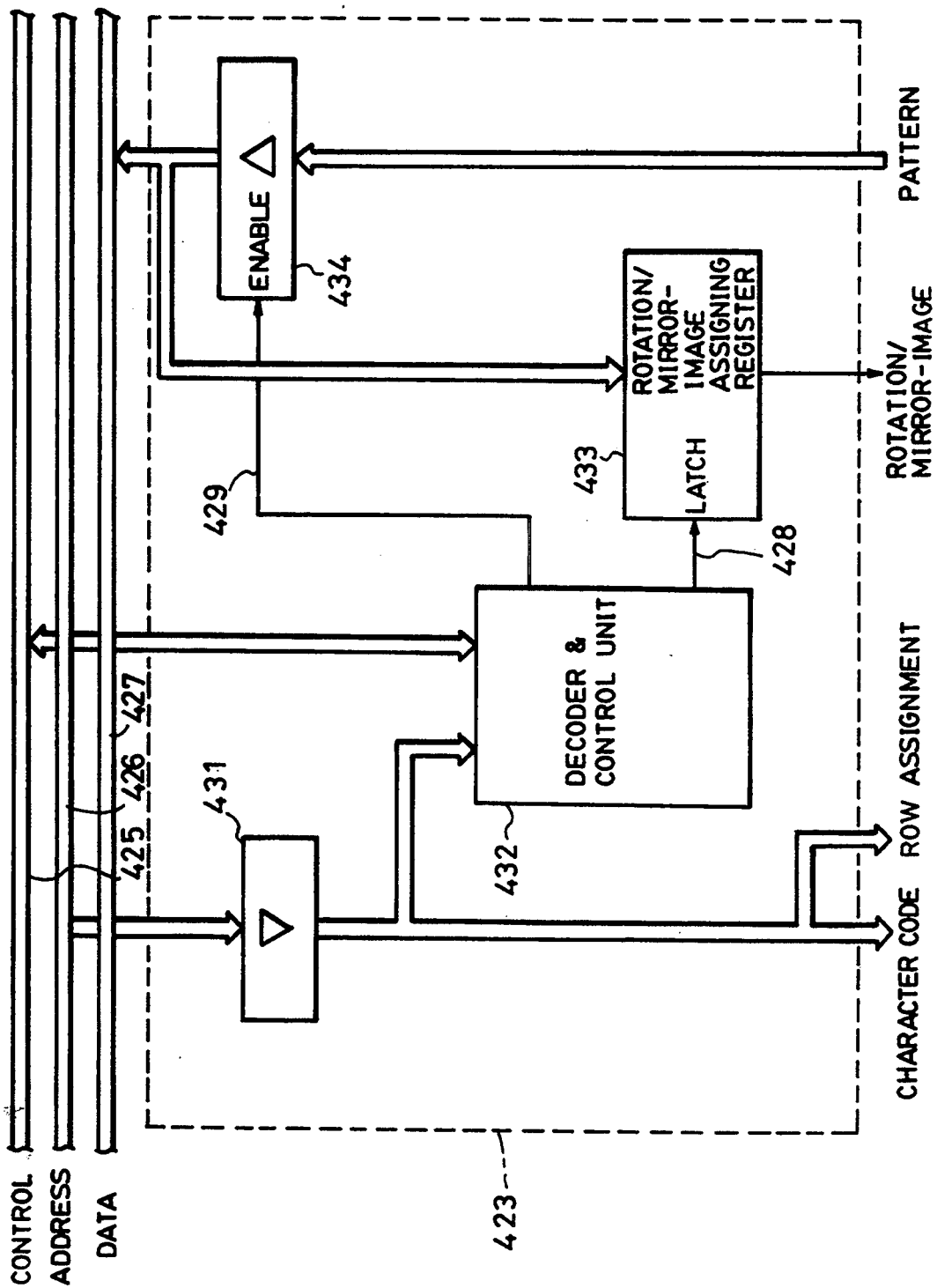
FIG. 43 is a block diagram showing the configurations of a character pattern storage unit I/F unit.
Figure 44:
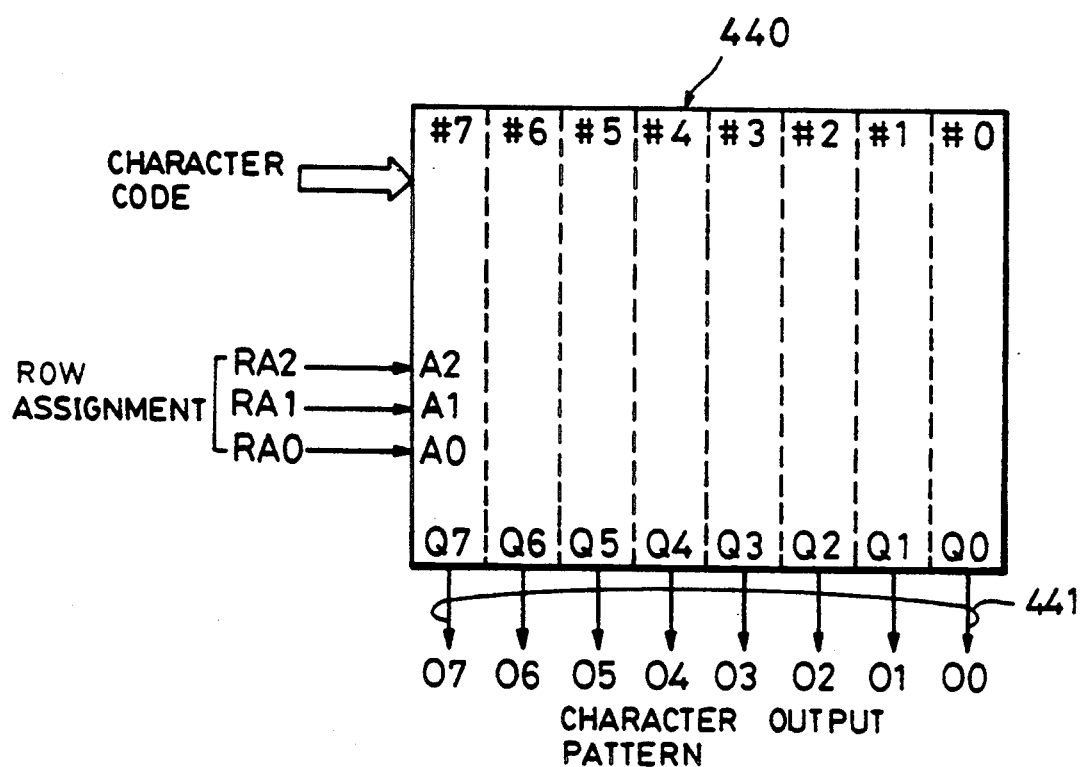

In the present embodiment, a case, wherein the bus master 421 reads a character pattern subjected to rotation/mirror-image processing, will be considered. If it is assumed that row assignment and character-code assignment are performed by addresses output to the address bus 426, and rotation/mirror-image assignment is performed by register setting according to data output to the data bus 427, the character pattern storage unit I/F unit 423 is configured as shown in FIG. 43. First, in order to set rotation/mirror-image assignment in a rotation/mirror-image assigning register 433, the bus master 421 transmits the address of the register and data to be written to the address bus 426 and the data bus 427, respectively. A decoder and control unit 432 decodes the address passing through the address buffer 431. If the address corresponds to the rotation/mirror-image assigning register 433, the decoder and control unit 432 issues a latch signal for the register 433 via latch signal line 428 in synchronization with a signal (for example, an address strobe signal or the like) of the control bus 426, to latch the contents of the data bus 427 at that time, and transmit the contents to the character pattern storage unit 422. Subsequently, the bus master 421 issues addresses corresponding to the character code and row assignment in order to read a character pattern from the character pattern storage unit 422. The character pattern I/F unit 423 outputs portions of the addresses corresponding to the character code and row assignment to the character pattern storage unit 422.

After inputting the corresponding read address from the bus master 421 to the character pattern storage unit 422, the decoder and control unit 432 transmits an enable signal to the data buffer 434 via enable signal line 429, and transmits the character pattern from the character pattern storage unit 422 to the data bus 427. The bus master 421 receives the contents of the data bus 427, and writes the contents of the character pattern in the image memory unit 424 with or without modification. At that time, the written character pattern has been subjected to processing in accordance with rotation/-mirror-image assignment.

Fifth Embodiment

A fifth embodiment of the present invention will now be explained in detail with reference to the attached drawings.

Figure 52:
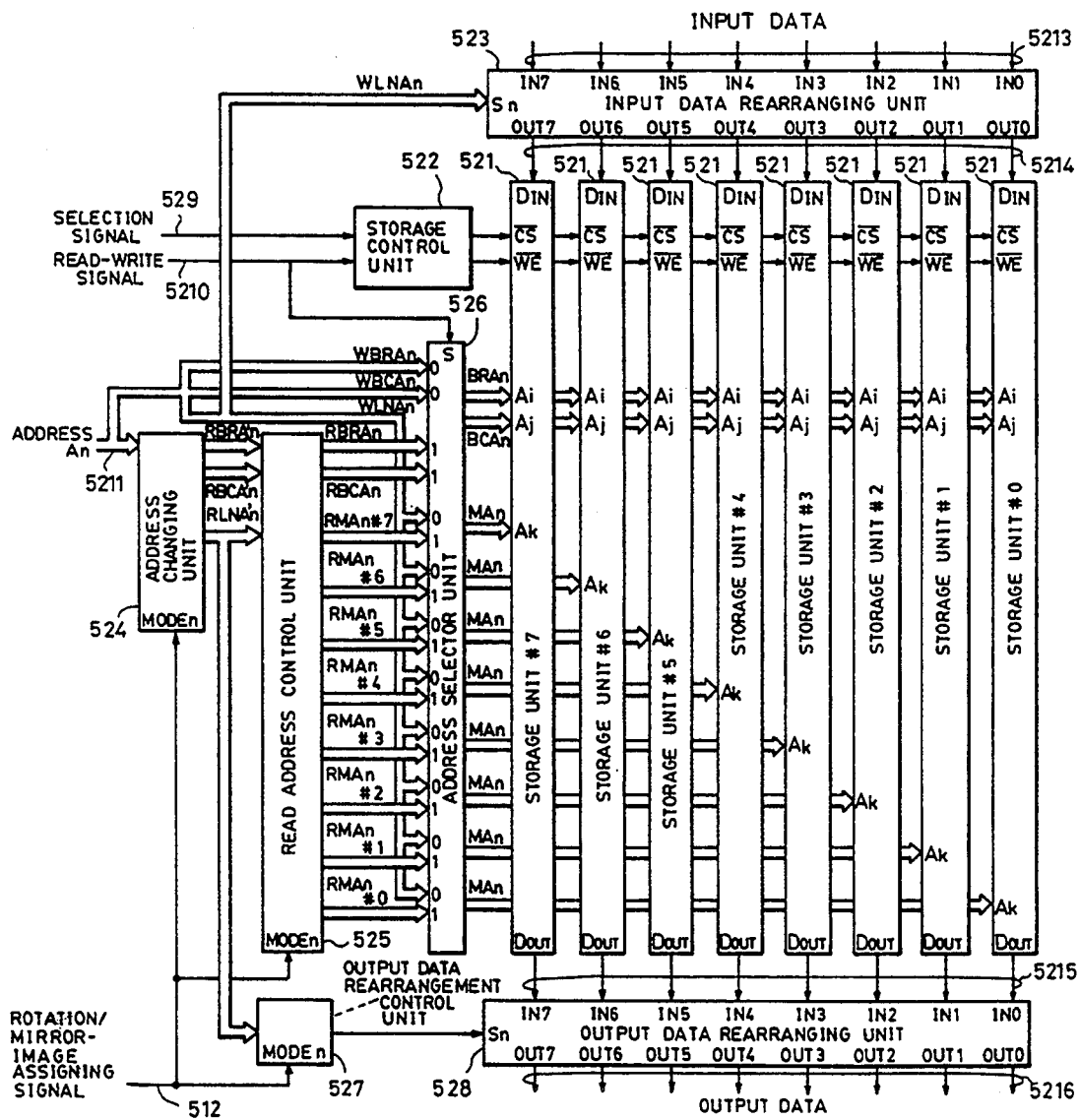
FIG. 52 is a logic circuit diagram showing the configuration of an image data rotating circuit according to a fifth embodiment of the present invention.

FIG. 52 illustrates an image processing apparatus which has input/output data in units of 8 bits in image data comprising one bit for one picture element. In FIG. 52, storage units 521 store image data. A storage control unit 522 generates control signals for the storage units 521. An input data rearranging unit 523 rearranges image input data in accordance with part of addresses. An address changing unit 524 changes addresses when reading image data according to rotation/mirror-image assignment. A read address control unit 525 further processes the addresses changed by the address changing unit 524 in accordance with rotation/-mirror-image assignment. An address selector unit 526 switches addresses to be provided to the storage units 521 when reading and writing image data. An output data rearrangement control unit 527 determines a rearranging method from part of read addresses and rotation/mirror-image assignment. An output data rearranging unit 528 rearranges output data of the storage units 521 in accordance with an output from the output data rearrangement control unit 527.

It is assumed that each storage unit 521 (#7–#0) has a capacity of 64K bits (1K bits=1024 (=$2^{10}$) bits), that is, the entire storage units 521 have a capacity of 512K bits (64K bits×8). Address An representing an address indicating in which portion of the storage units 521 each picture element of image data is present may represent an address within 64K (=$2^{16}$) portions, since a unit of input/output is 8 bits. Accordingly, address An is represented by a length of 16 bits. Respective bits of address An are represented by $A_{15}$–$A_0$. In the present embodiment, since the total storage capacity of the storage units 521 are 512K bits, in the case of an image represented by one bit for one picture element, the apparatus shown in FIG. 52 can be an image processing apparatus which can process image data comprising 1024 picture elements (in the horizontal direction×512 lines (in the vertical direction).

Figure 53A:
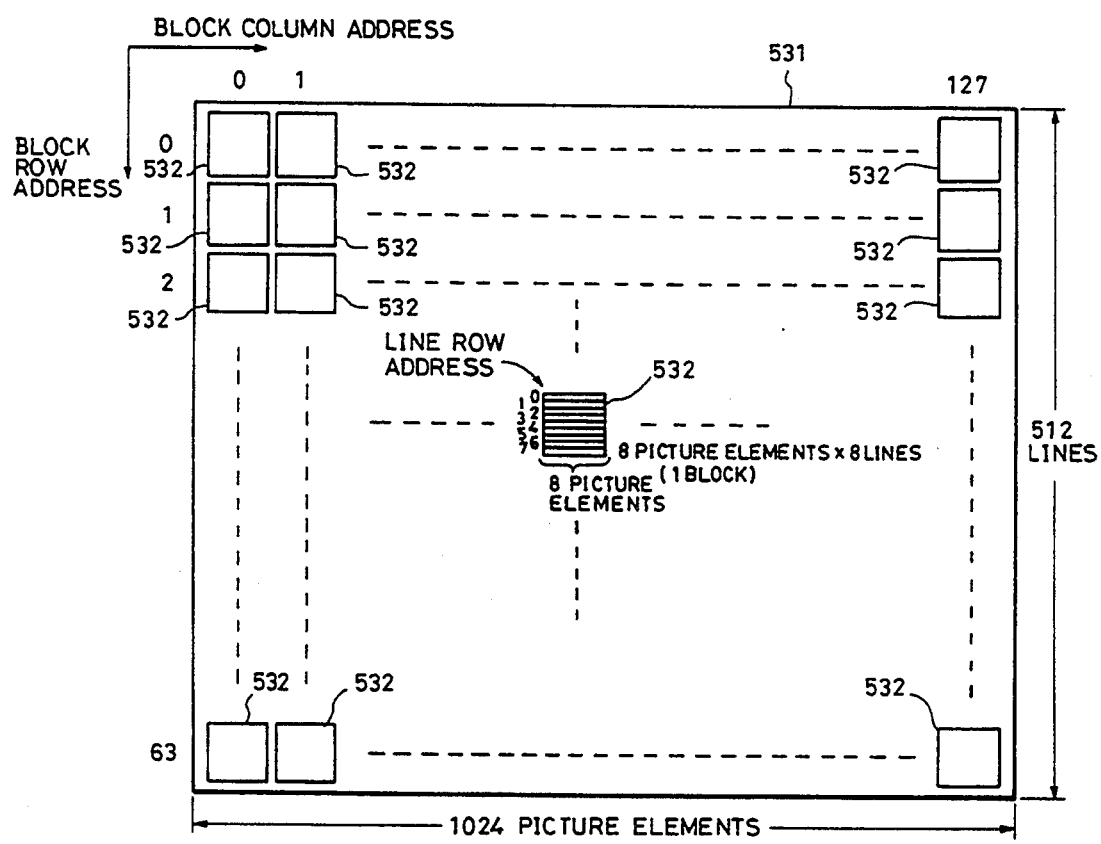
FIG. 53(A) illustrates correspondence between the entire image data and respective blocks when image data are divided into blocks in units of 8 lines × 8 picture elements.
Figure 53B:
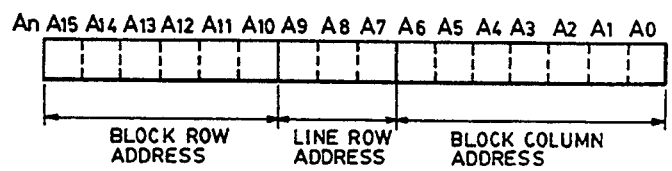
FIG. 53(B) is a diagram showing the internal configuration of address An when the image data are divided into blocks in units of 8 lines × 8 picture elements.

Next, as shown in FIG. 53(A), it is assumed that the entire image data comprising 1024 picture elements (in the horizontal direction)×512 lines (in the vertical direction) with one bit for one picture element is divided into blocks in units of 8 lines×8 picture elements. Then, as shown in FIG. 53(B), the internal configuration of address An can be arranged so that $A_6$–$A_0$, $A_{15}$–$A_{10}$, and $A_9$–$A_7$ represent block addresses of respective columns, block addresses of respective rows, and respective line addresses of 8 lines within each block, respectively. Particularly when writing image data, $A_6$–$A_0$, $A_{15}$–$A_{10}$, and $A_9$–$A_7$ will be hereinafter termed WBCA-6–0 (write block column address), WBRA5–0 (write block row address), and WLNA2–0 (write block line address), respectively. In the image processing apparatus shown in FIG. 52, when image data are actually written, the values of WBCAn (n=0–6) and WBRAn (n=0–5) of address An are supplied to BCAn (block column address) and BRAn (block row address) of the storage units 521, respectively, via the address selector unit 526, to become WBCAn=BCAn, and WBRan=-BRAn. Address WLNAn (n=0–2) is supplied to MAn (memory address) of each storage unit 521 via the address selector unit 526. Thus, write assigning addresses when writing image data are assigned.

Figure 54A:
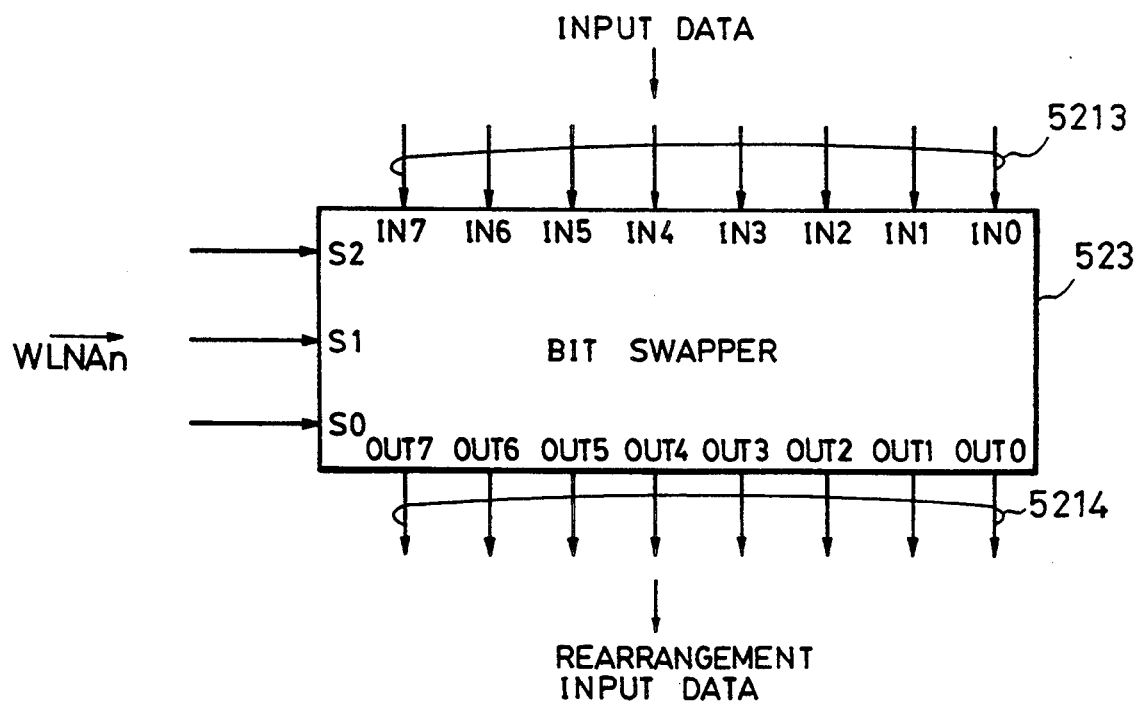
FIG. 54(A) is a diagram showing the configuration of an input data rearranging unit.

In the present embodiment, written image data are rearranged by the input data rearranging unit 523 in accordance with WLNAn, and are transmitted to the storage units 521. As shown in FIG. 54(A), it is assumed that 8 picture elements as an image data input unit to be written are provided to the input data rearranging unit 523 by providing the left end and the right end at in7 and in0, respectively. Although various kinds of rearranging methods may be applied, in the present embodiment, it is assumed that, when data 13 (b7, b6, b5, b4, b3, b2, b1, b0) are input to input ports (in7, in6, in5, in4, in3, in2, in1, in0), outputs at output ports (out7, out6, out5, out4, out3, out2, out1, out0) are rearranged corresponding to the values WLNA2–0 to become as shown below. In FIG. 54(A), since each of WLNA2–0 comprises 3 bits, respective bits are represented by S2, S1 and S0. For the convenience of explanation, respective rearranging methods will be termed swap S2 S1 S0 (S2, S1 and S0 have a value 0 or 1; the case S2=S1=S0, that is, swap000 indicates no rearrangement).

When (WLNA2, WLNA1, WLNA0)=(0, 0, 0), (b7, b6, b5, b4, b3, b2, b1, b0): swap000.
When (WLNA2, WLNA1, WLNA0)=(0, 0, 1), (b6, b7, b4, b5, b2, b3, b0, b1): swap001.
When (WLNA2, WLNA1, WLNA0)=(0, 1, 0), (b5, b4, b7, b6, b1, b0, b3, b2): swap010.
When (WLNA2, WLNA1, WLNA0)=(0, 1, 1), (b4, b5, b6, b7, b0, b1, b2, b3): swap011.
When (WLNA2, WLNA1, WLNA0)=(1, 0, 0), (b3, b2, b1, b0, b7, b6, b5, b4): swap100.
When (WLNA2, WLNA1, WLNA0)=(1, 0, 1), (b2, b3, b0, b1, b6, b7, b4, b5): swap101.
When (WLNA2, WLNA1, WLNA0)=(1, 1, 0), (b1, b0, b3, b2, b5, b4, b7, b6): swap110.
When (WLNA2, WLNA1, WLNA0)=(1, 1, 1), (b0, b1, b2, b3, b4, b5, b6, b7): swap111.

Logical expressions corresponding to the above-described rearranging method are shown in FIG. 54 (B). As can be understood from these expressions, circuitry for realizing the expressions can be configured by eight 8→1 (indicating that one input data is selected from 8 input data) data selectors. When writing image data 551 in one block 532 in units of 8 lines×8 picture elements shown in FIG. 53(A) as described above, how each picture element of image data 552 to be stored in the storage units 521 is rearranged is shown in FIG. 55.

Figure 56B:
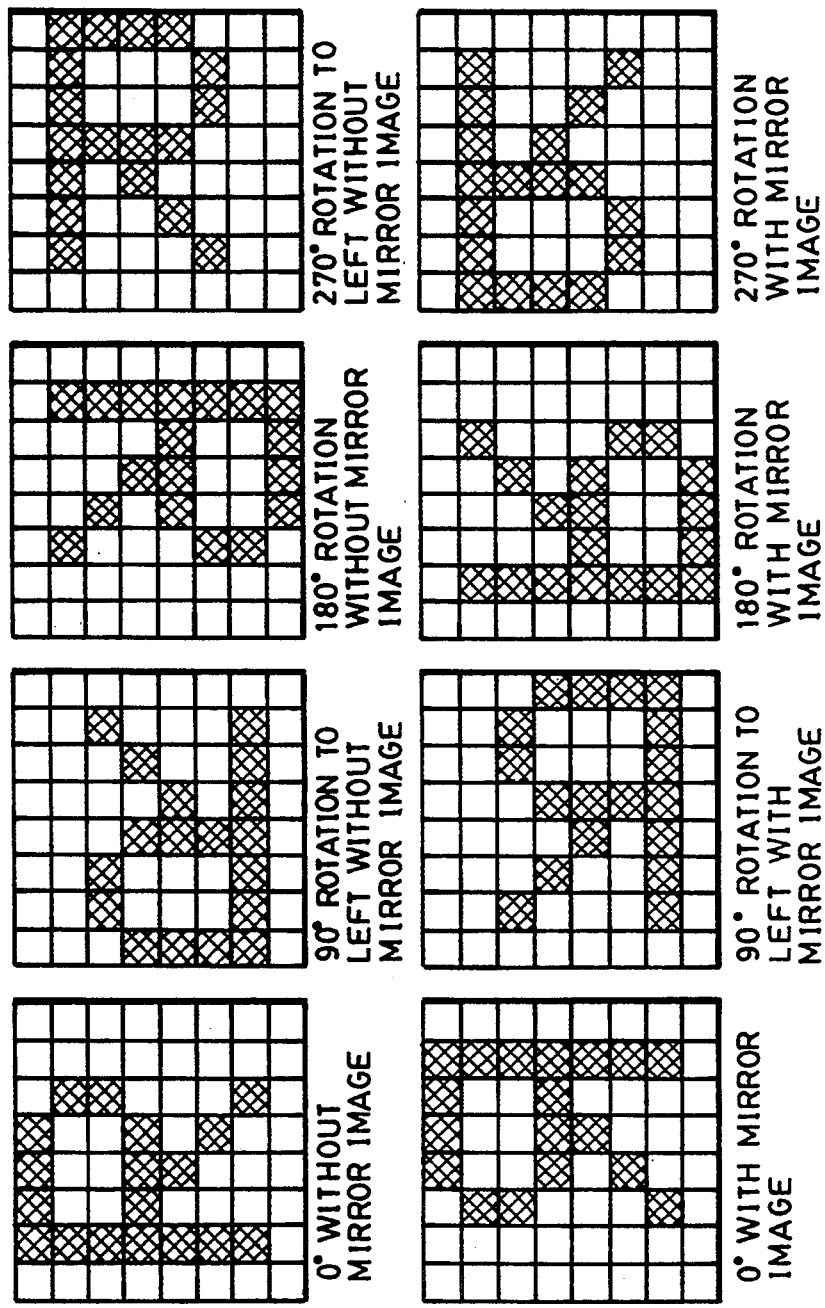
FIG. 56(B) illustrates specific examples of rotation-mirror-image processing of image data.
Figure 57:
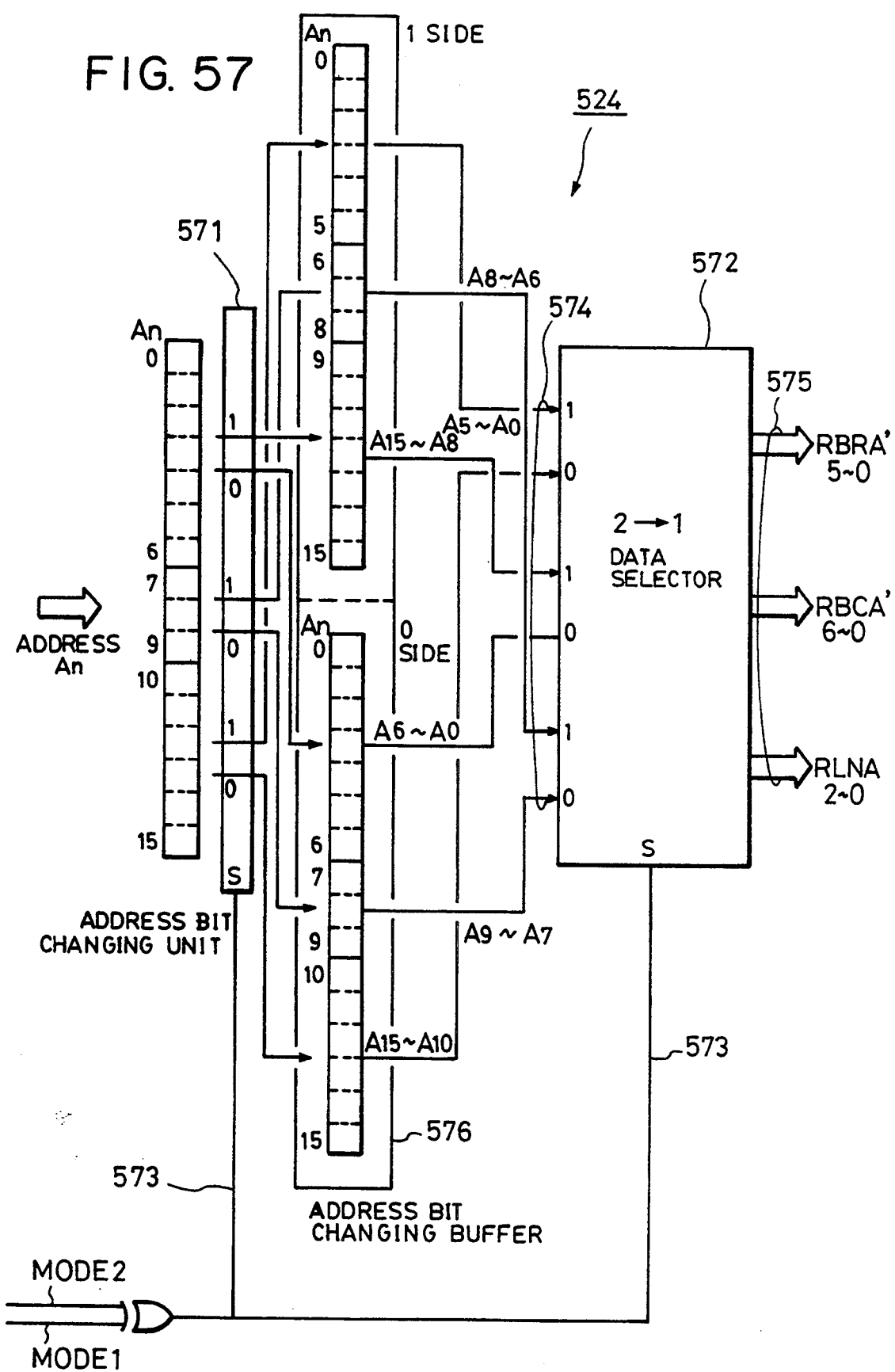
FIG. 57 is a circuit diagram of an address changing unit.
Figure 58:
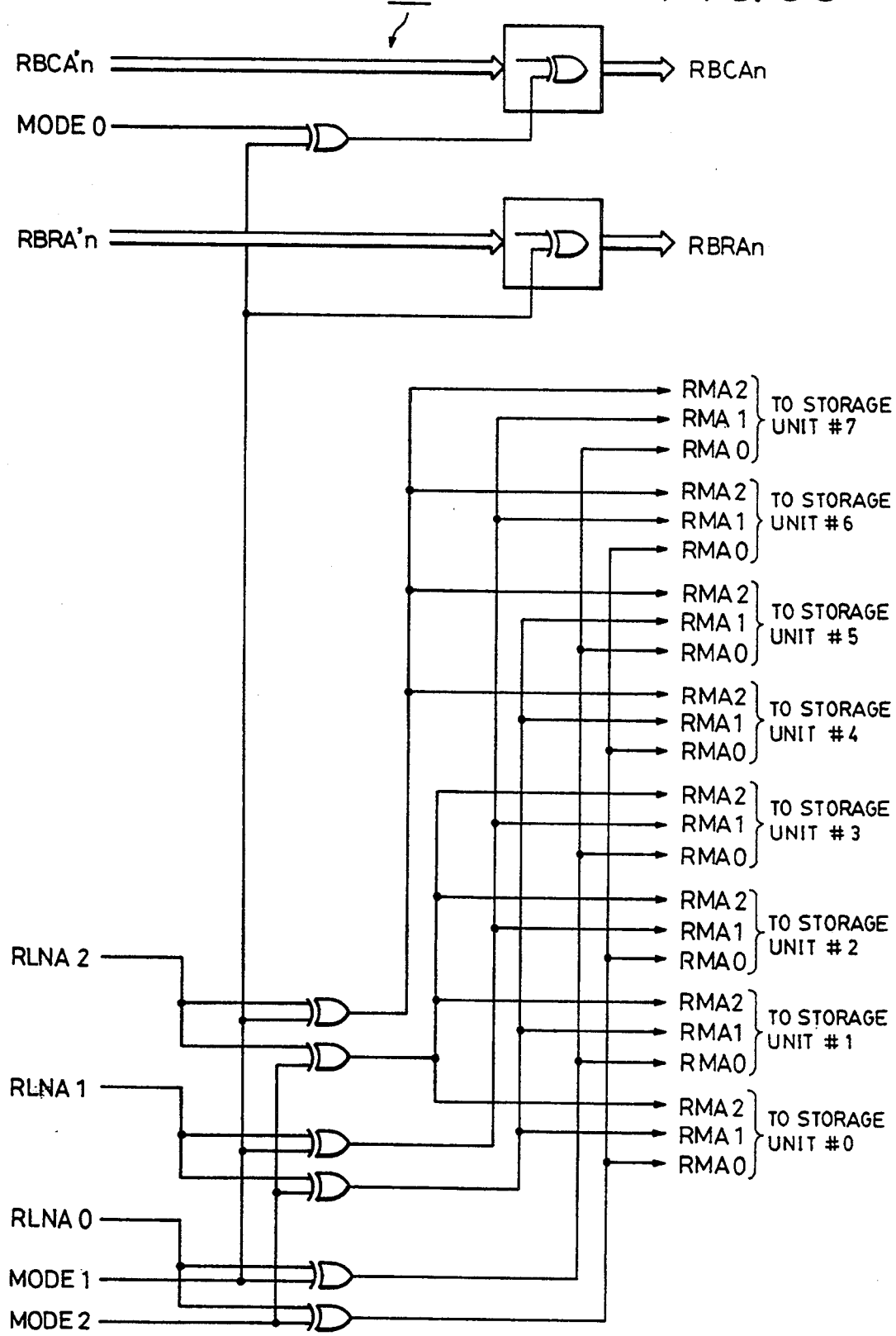
FIG. 58 is a circuit diagram of a read-address control unit.
Figure 59:
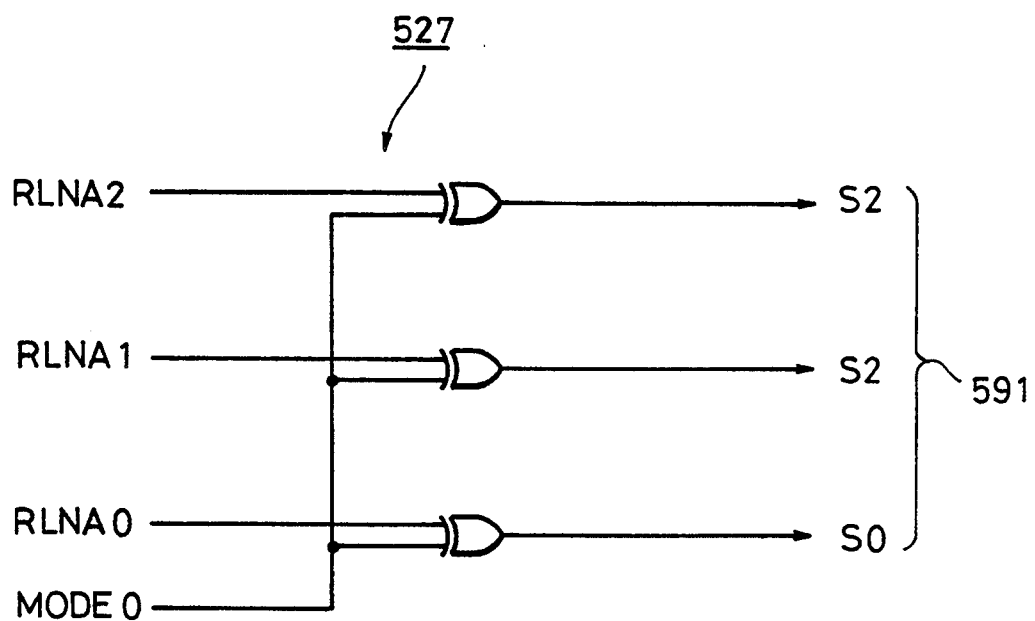
FIG. 59 is a circuit diagram of an output-data rearrangement control unit.

Next, a case wherein image data written in the storage units 521 are read will be considered. It is assumed that rotation/mirror-image assignment is performed as shown in FIG. 56(A) according to rotation/mirror-image assigning signals 5212 (mode2, mode1, mode0) provided from the outside. FIG. 56(B) illustrates specific examples how actual rotation/mirror-image processing is performed according to the above-described rotation/mirror-image assigning signals 5212, taking an image pattern "R" as an example. In these examples, the processing of 0° without mirror-image provides the same image data as the input image data. FIGS. 57, 58 and 59 show the configurations of the address changing unit 524, the read address control unit 525 and the output data rearrangement control unit 527, respectively. The output data rearranging unit 528 has the same configuration as the input data rearranging unit 523 shown in FIG. 54(A). In FIG. 57, there are shown an address bit changing unit 571, a 2→1 (indicating that one input data is selected from two input data) data selector 572, and an address bit changing buffer 576.

Figure 60:
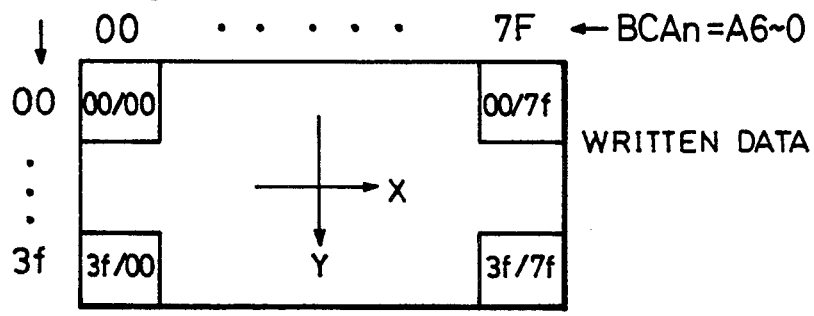
FIG. 60 illustrates correspondence of 8 lines × 8 picture elements of written image data.
Figure 61:
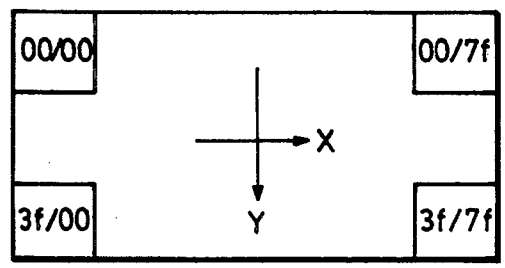
FIGS. 61-68 illustrate correspondence of 8 lines × 8 picture elements read by assignment of rotation/mirror-image processing.
Figure 62:
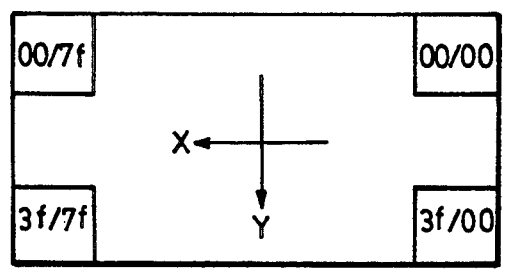
Figure 63:
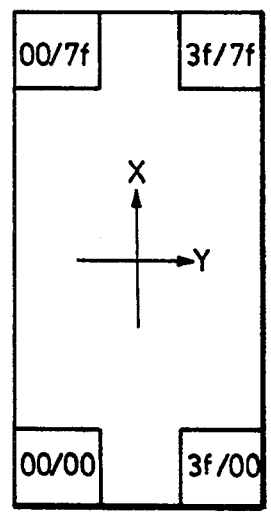
Figure 64:
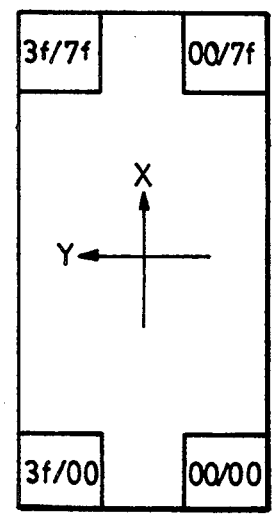
Figure 65:
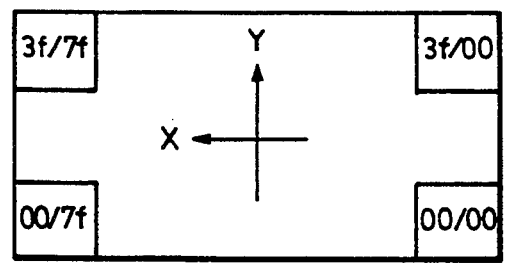
Figure 66:
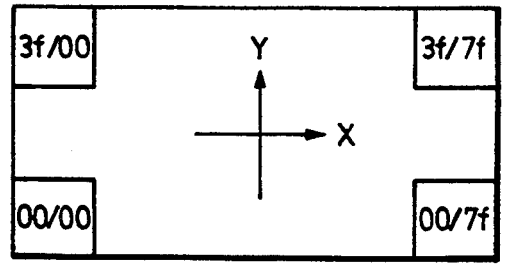
Figure 67:
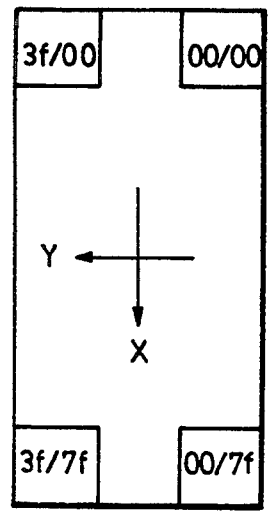
Figure 68:
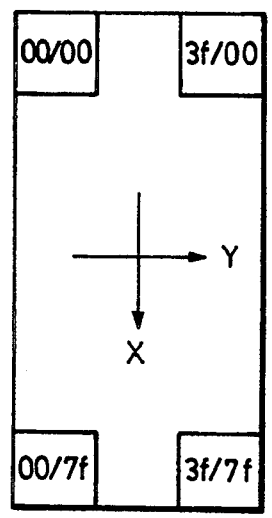

First, a reading operation in units of 8 lines × 8 pciture elements will be considered. In the address changing unit 524 shown in FIG. 57, when rotation assignment is 0° or 180° (mode2 exor mode1=0, where exor indicates exclusive OR), the values of addresses $A_{15}$–$A_0$ set when writing image data are output to the 0 side of the address bit changing buffer 576 as they are without being changed by the address bit changing unit 571. At that time, the 2→1 data selector 572 selects the 0 side of 2→1 data selector input ports 574 according to a signal 573 provided by performing exclusive OR processing of mode2 and mode1, and inputs the value of address An from the 0 side of the address bit changing buffer 576. Hence, addresses $A_6$–$A_0$ and $A_{15}$–$A_{10}$ are output from 2→1 data selector output ports 575 as RBCA'6-0 (read block column address) and RBRA'5-0 (read block row address), respectively. On the other hand, when rotation assignment is 90° counterclockwise and 270° counterclockwise (mode2 exor mode1=1), the value of address An is changed in the address bit changing unit 571 so that the values set in addresses $A_{15}$–$A_{10}$ and $A_6$–$A_0$ when the writing operation are received in addresses ($A_5$–$A_0$ and $A_{15}$–$A_9$, respectively, and the results are output to the 1 side of the address bit changing buffer 576. At that time, the 2→1 data selector 572 selects the 1 side of the 2→1 data selector input ports 574 according to the signal 573 obtained by exclusive OR processing of mode2 and mode1, and inputs the value of address An from the 1 side of the address bit changing buffer 576. Hence, addresses $A_5$–$A_0$ (corresponding to rows of the written original image) and addresses $A_{15}$–$A_9$ (corresponding to columns of the written original image) are output from the 2→1 data selector output ports 575 as RBRA'5-0 and RBCA'6-0, respectively. The read address control unit 525 determines whether or not these addresses RBCA'n (n=0-6) and RBRA'n (n=0-5) should be inverted in accordance with one (mode0) of the rotation/mirror-image assigning signals 5212 to output as RBCAn and RBRAn, and provides the storage units 521 with the values of the block column address and block row address when reading image data as BCAn and BRAn, respectively, via the address selector unit 526. Since correspondence between columns and rows is changed by a changing operation of addresses by the address changing unit 524, and correspondence between up and down, and right and left is changed by a reversal operation of addresses by the read address control unit 525, each block of image data written as shown in FIG. 60 is read as shown in FIGS. 61–68 according to rotation/mirror-image assignment. In image data thus read by a reading operation in units of 8 lines × 8 picture elements according to rotation/mirror-image assignment, correspondence between columns and rows, and correspondence between up and down, and right and left are changed from the original image data shown in FIG. 60.

Figure 70:
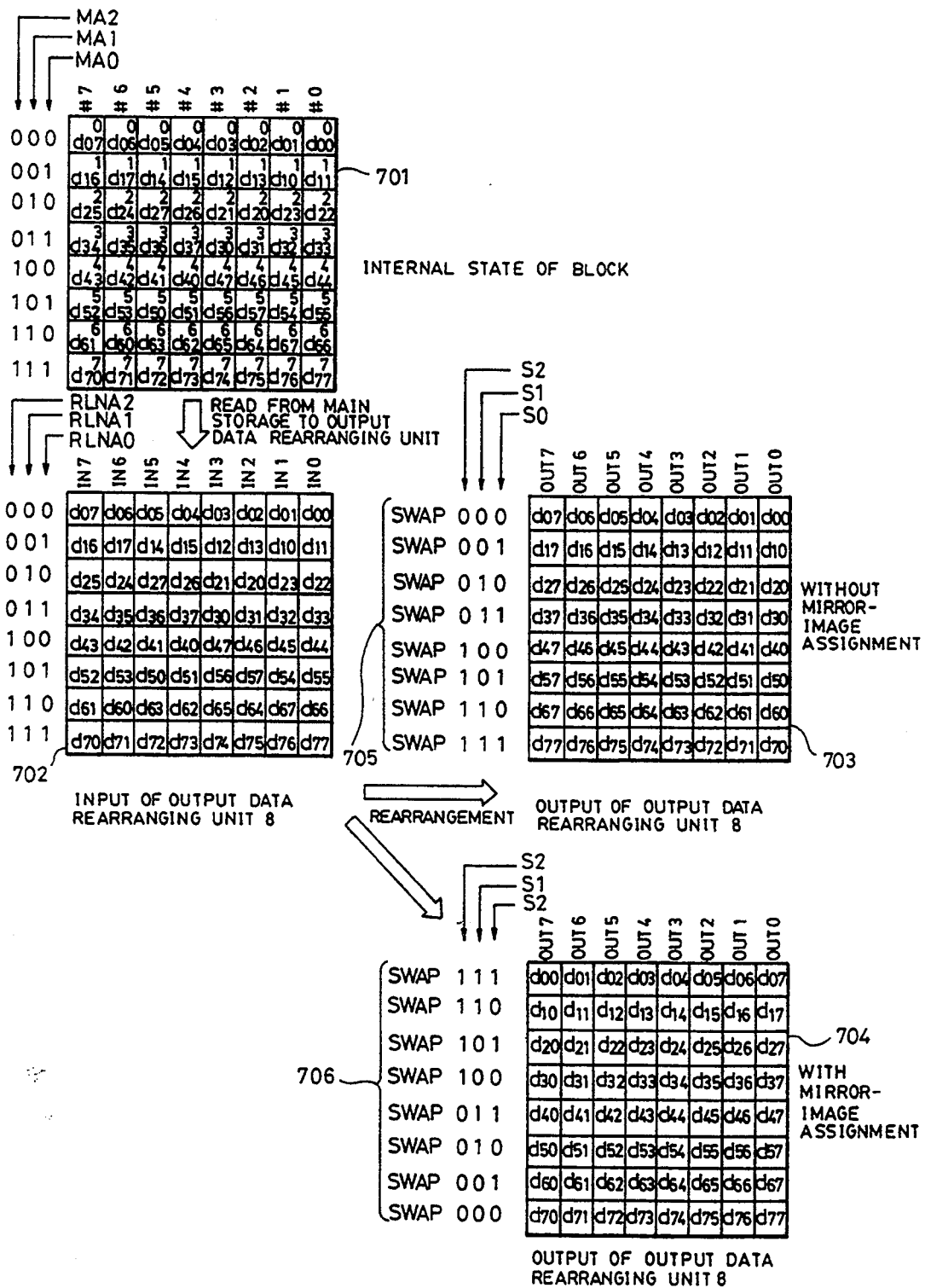

Next, the inside of one block 532 comprising 8 lines × 8 picture elements will be considered. As shown in FIG. 57, when the assignment of rotation is 0° or 180°, and 90° counterclockwise or 270° counterclockwise, addresses $A_9$–$A_7$ and addresses $A_8$–$A_6$ represent line assignment of the inside of the block, respectively, and are output from the 2→1 data selector output ports 575 of the address changing unit 524 as RLNA2-0 (read block line address). FIG. 69 shows the relationship between RLNA2-0 and MA2-0 #i (i=0-7) when the assignment of rotation is 0° (mode2=mode1=0). In FIG. 69, the relationship between RLNA2-0 and MA2-0 output via the address selector unit 526 is MAn=RLNAn (n=0-2). The state 552 of image data written in the main storage shown in FIG. 55 is shown in an internal state 701 of the block in FIG. 70. In FIG. 70, a suffix at the upper right of each picture element indicates RLNA2-0 represented by a decimal number. For example, the first line having a decimal number 0 represents picture elements read when RLNA 2-0=(0, 0, 0). The same principle holds for suffices 1–7. According to the values of these suffices, picture elements of the image data are read from the storage units 521 when RLNA2-0 is (0, 0, 0)–(1, 1, 1). Reference numeral 702 in FIG. 70 shows data which are input to the output data rearranging unit 528 at that time. In the case of 0° without mirror-image processing (mode0=0), outputs from the output data rearrangement control unit 527 become S2-0=RLNA2-0. Hence, as shown by reference numeral 703 in FIG. 70, picture elements are rearranged by the output data rearranging unit 528 in accordance with a rearranging method 705, and the original image is obtained. In the case of 0° with mirror-image processing (mode0=1), outputs from the output data rearrangement control unit 527 merely become S2-0=$\overline{\text{RLNA2-0}}$. Hence, picture elements are rearranged by the output data rearranging unit 528 in accordance with a rearranging method 706, and an image of 0° with mirror-image processing as shown by reference numeral 704 in FIG. 70 is obtained.

Figure 71B:
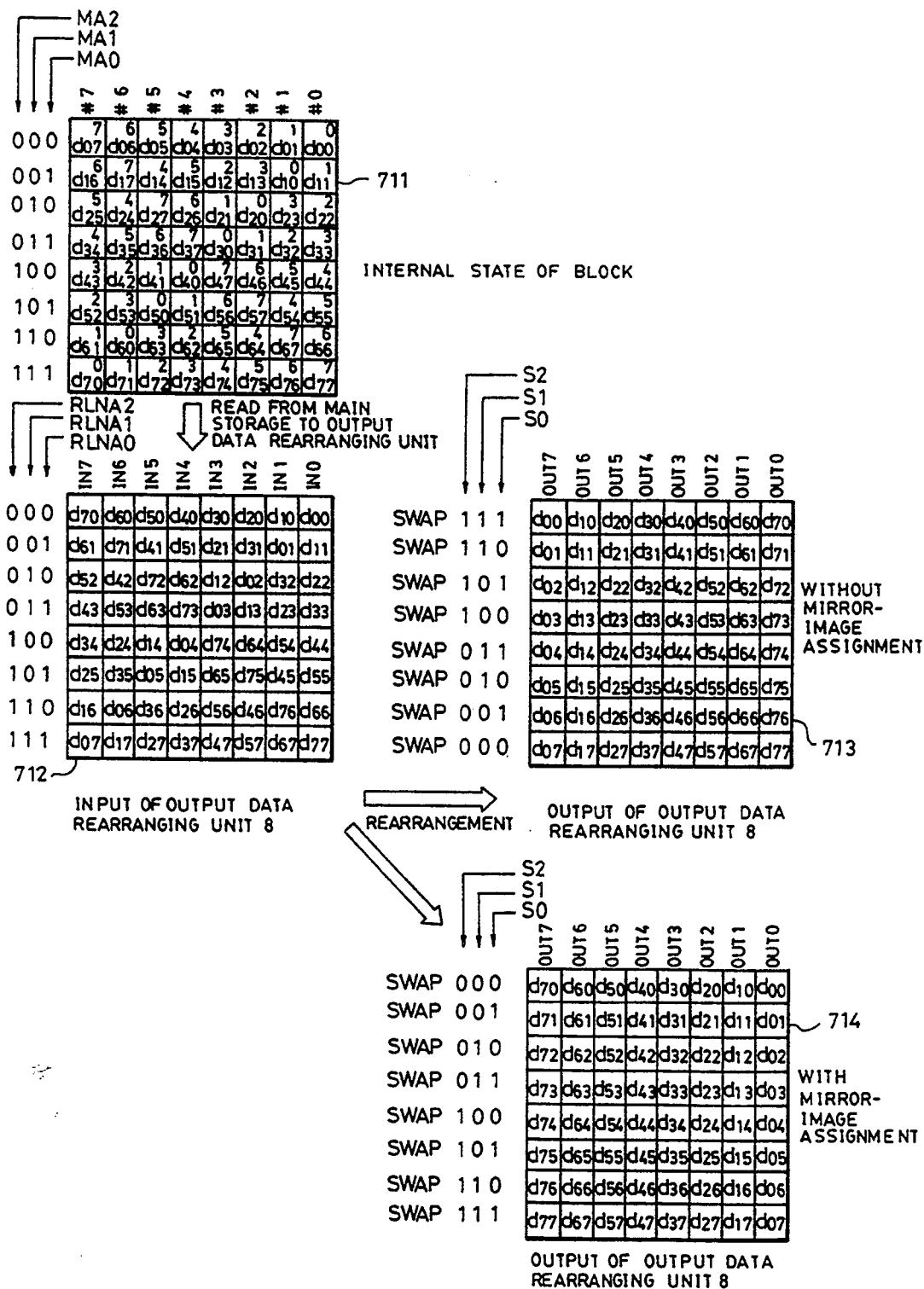
Figure 72B:
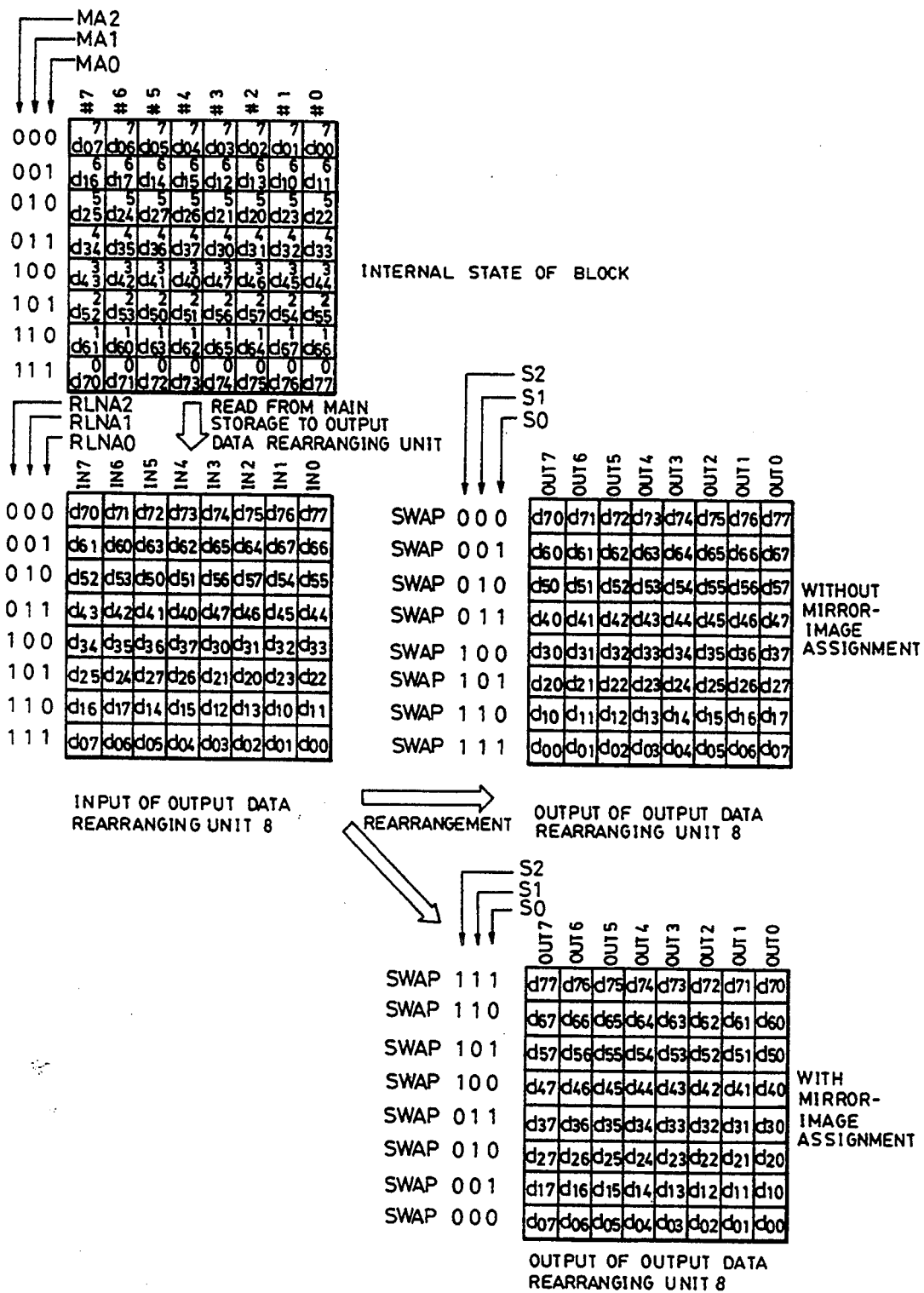
Figure 73B:
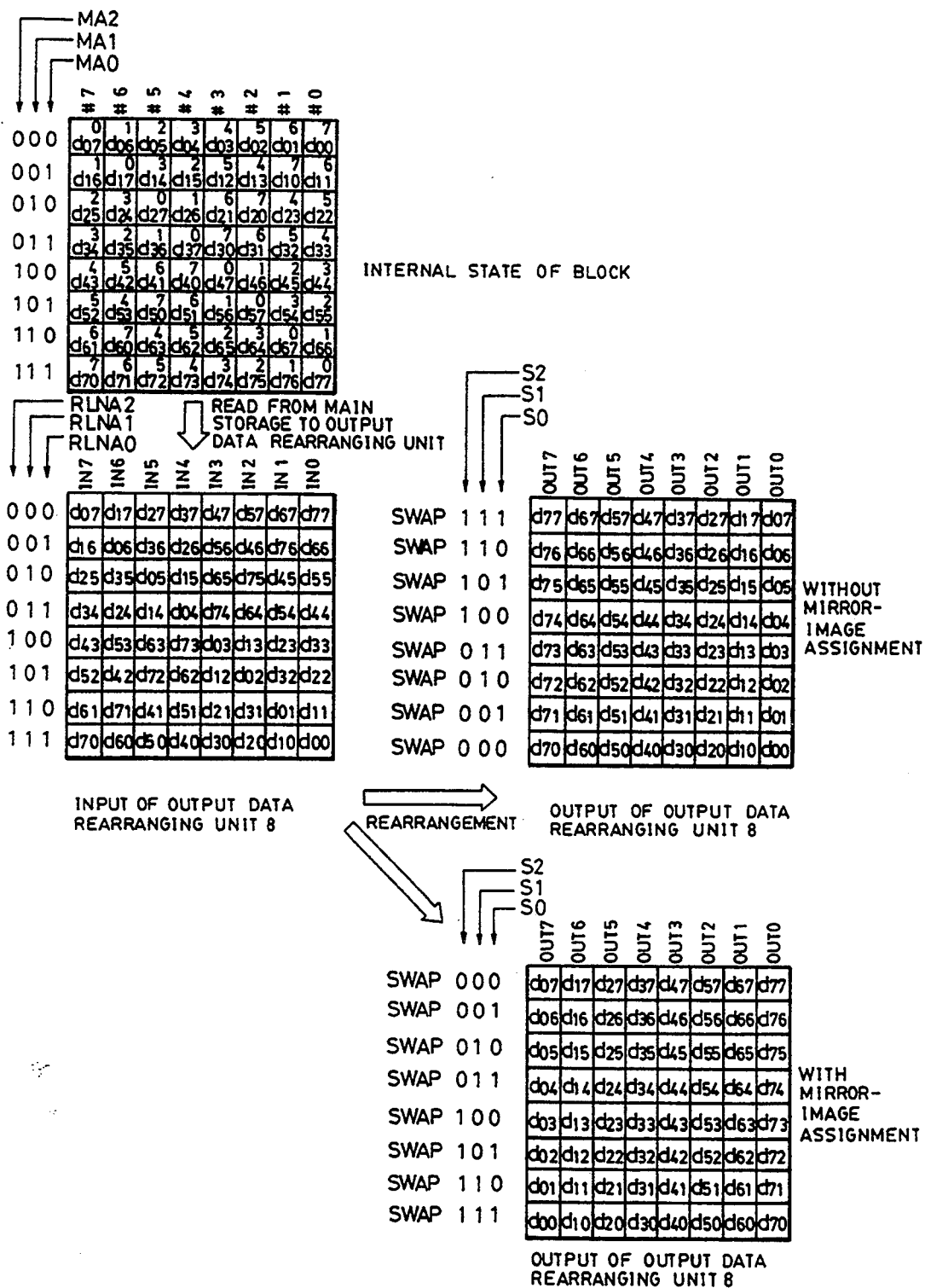
Figure 74:
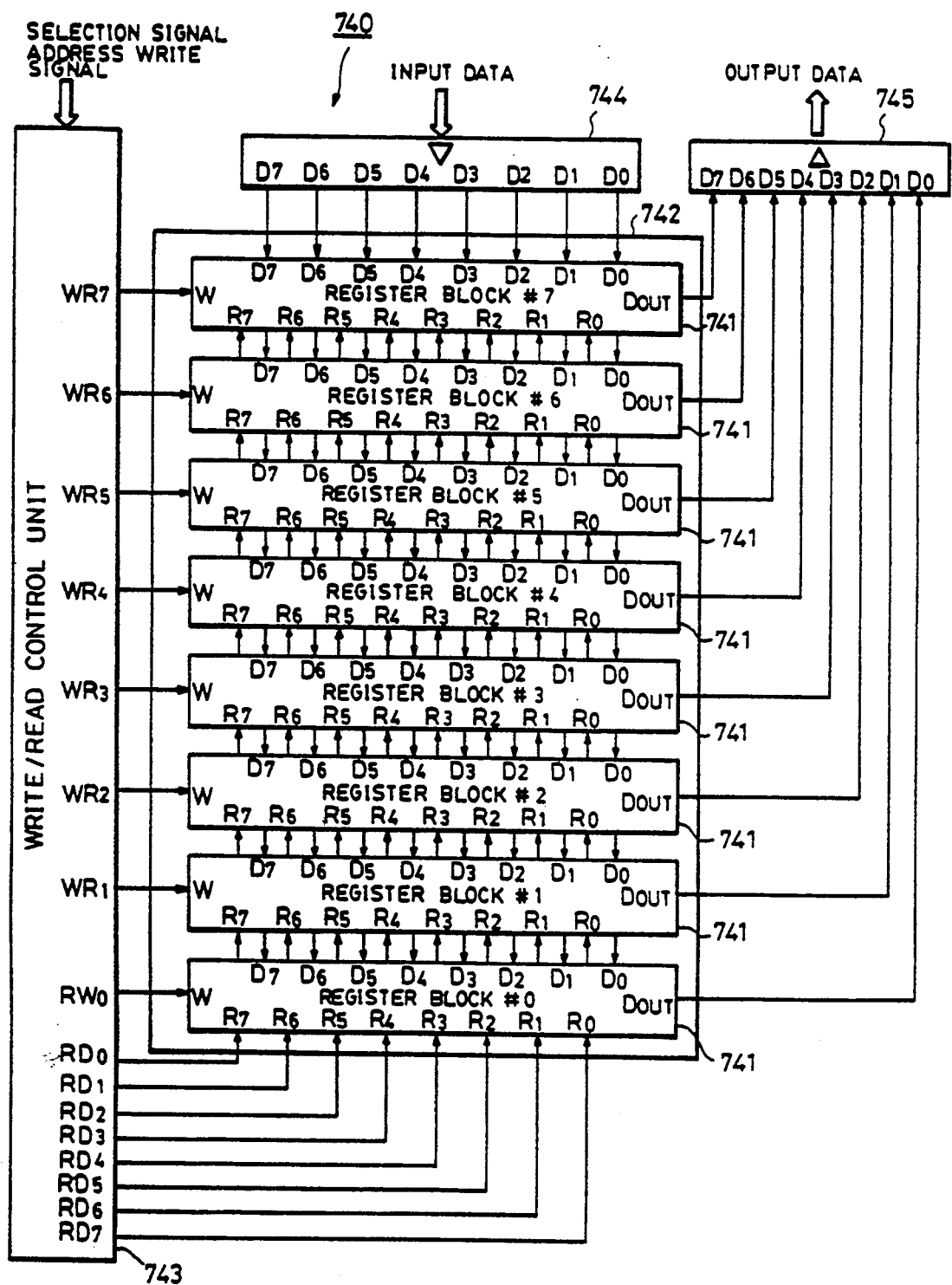
Figure 75:
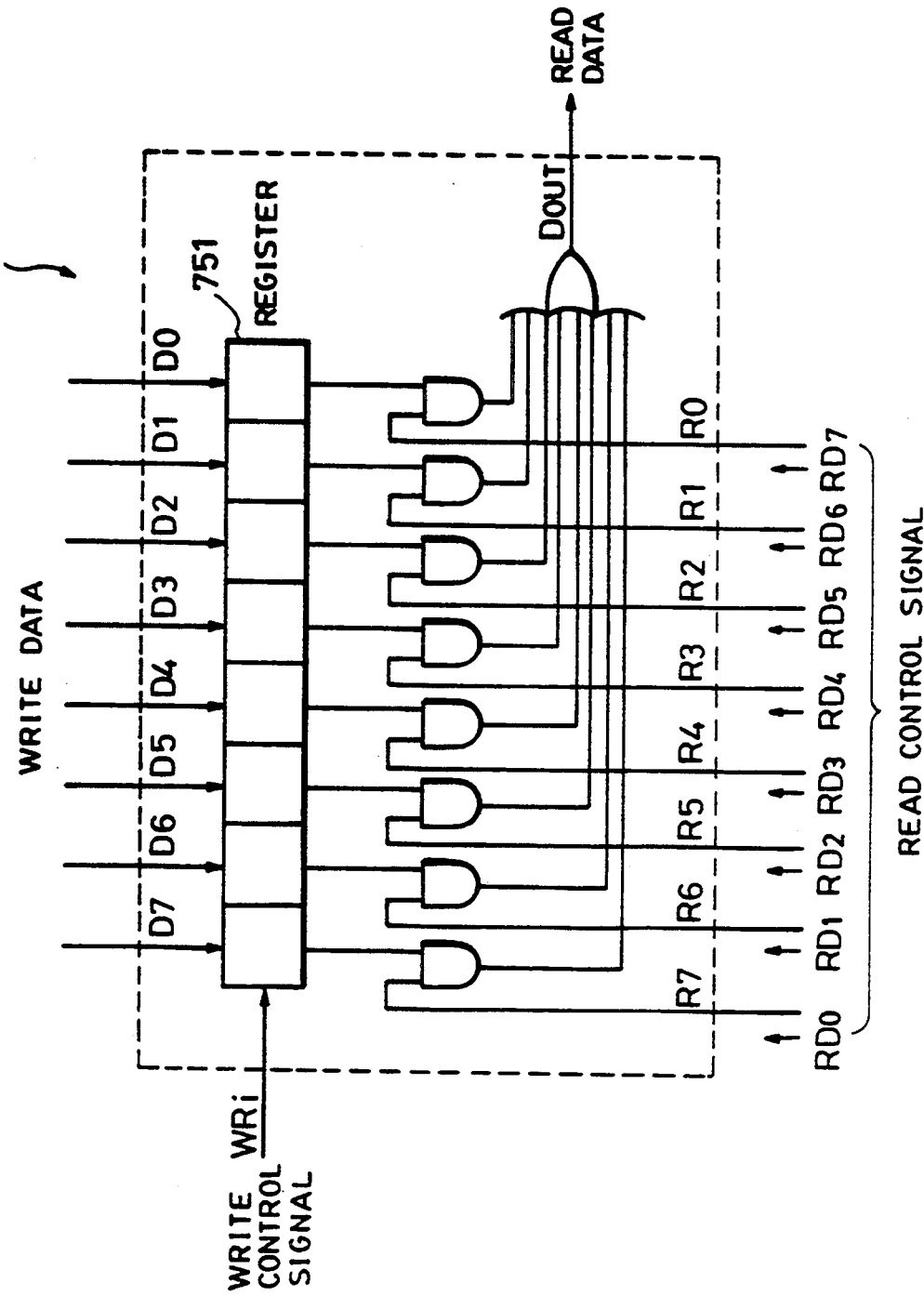

Next, the case of the assignment of 90° rotation counterclockwise (mode2=0, mode1=1) will be considered. Addresses MA2-0 output from the address selector unit 526 become as shown in FIG. 71(A) for addresses RLNA2-0, and have different values for the respective storage units (#7–#0). Each state is indicated by a suffix at the upper right of each picture element of an internal state 711 of the block shown in FIG. 71(B). For example, when RLNA2-0=(0, 0, 0), since portions 0 of the suffices are read, data of the first line of inputs of the output data rearranging unit 528 shown by reference numeral 712 in FIG. 71(B) are data obtained by arranging the read data. The situation is the same in the case of RLNA2-0=(0, 0, 1)–(1, 1, 1). In the case of 90° rotation counterclockwise without mirror-image processing (mode0=1), since outputs from the output data rearrangement control unit 527 become S2-0=$\overline{\text{RLNA2-0}}$, an image of 90° rotation counterclockwise without mirror-image processing is obtained as shown by reference numeral 713 in FIG. 71(B). In the case of 90° rotation with mirror-image processing (mode0=0), since S2-0=RLNA2-0, an image of 90° rotation counterclockwise with mirror-image processing is obtained as shown by reference numeral 714 in FIG. 71(B).

FIGS. 72(A) and 72(B), and 73(A) and 73(B) show the cases of 180° assignment and 270° assignment counterclockwise, respectively, and the same explanation as described above holds for these cases.

The present invention may be applied to any data rearranging method when writing image data, provided that the patterns of respective rows having columns different from one another are stored in respective #7-#0 storage units 521. For example, the pattern of the first row may be stored as it is, the pattern of the second row may be stored by rotating clockwise by one bit, the pattern of the third row may be stored by rotating clockwise by two bits, in the same manner for the patterns of other rows, and the pattern of the eighth row may be stored by rotating clockwise by 7 bits. Of course, the configurations of the read address control unit 525, the output data rearrangement control unit 527 and the output data rearranging unit 528 must correspond to the above described processing.

When the storage units 521 are configured by dynamic RAMs (random access memories), the storage control unit 522 may generate signals RAS, CAS and WE, output addresses of the address selector unit 526 may be divided into two portions to be added to the signals RAS and CAS, and the resultant signals may be supplied to the dynamic RAMs.

Sixth Embodiment

A sixth embodiment of the present invention will now be explained in detail with reference to the attached drawings.

Figure 77:
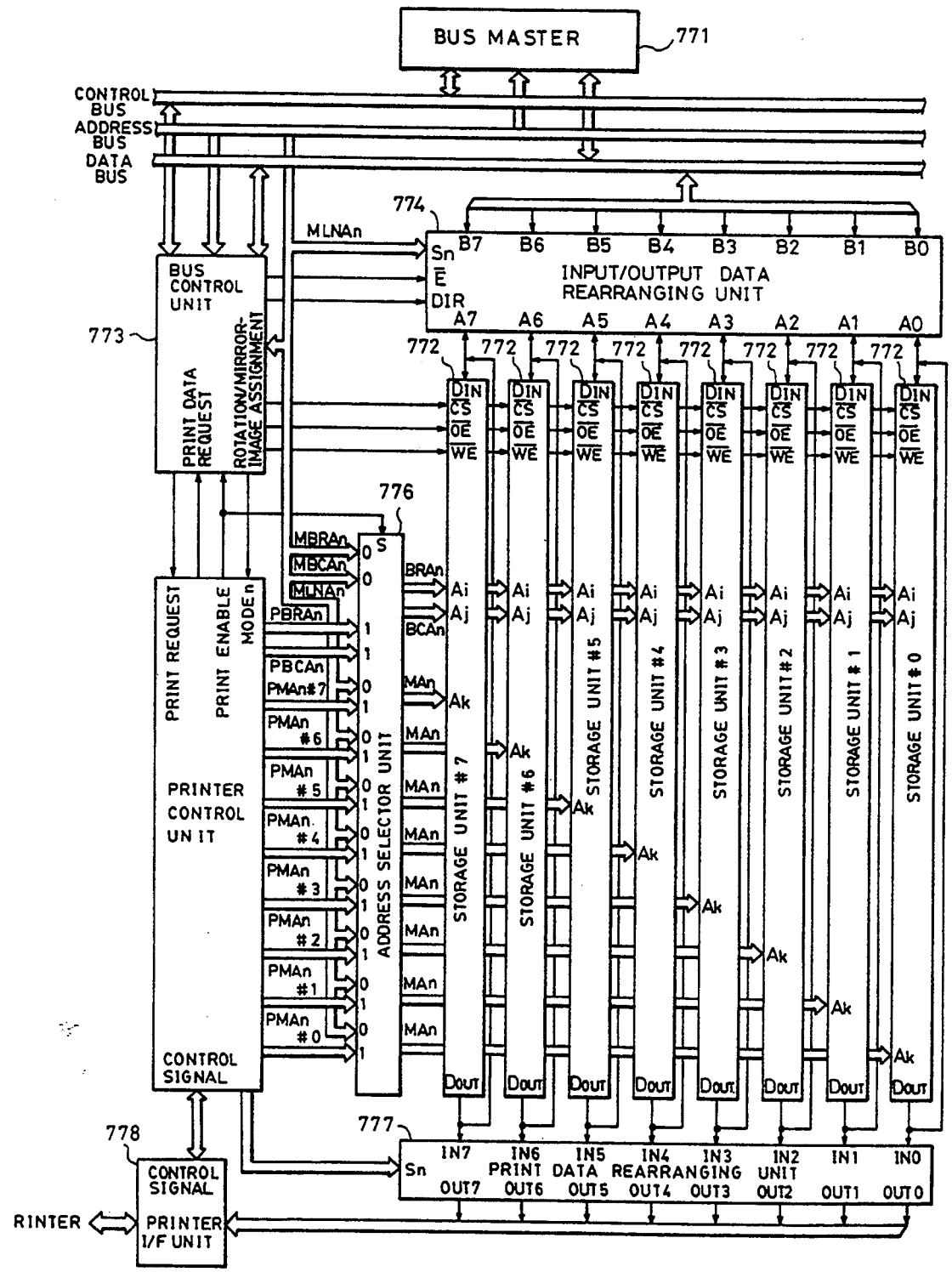
FIG. 77 is a block diagram showing the configuration of an image processing apparatus according to a sixth embodiment of the present invention.

FIG. 77 is a block diagram showing the configuration of an image processing apparatus, wherein a unit of input/output data comprises 8 bits, according to the sixth embodiment. In FIG. 77, a bus master 771 possesses buses for a CPU, a graphic controller, an image processor and the like. Storage units 772 store image data. A bus control unit 773 generates control signals for the storage units 772 or the like from addresses and control signals of the bus master 771. An input/output data rearranging unit 774 rearranges data at the accesses of the bus master 771 in accordance with part of image data addresses. A printer control unit 775 generates addresses when reading image data in order to transmit the data from the storage units 772 to a printer (not shown), rearranging signals for the read data, control signals for the printer, and other control signals during printing. An address selector unit 776 switches between addresses at accesses of the bus master 771 and addresses generated by the printer control unit 775 at printing. A print data rearranging unit 777 rearranges image data read from the storage units 772 in order to transmit the data to the printer in accordance with rearranging signals of the printer controls unit 775. A printer I/F unit 778 is an interface with the printer.

In the present embodiment, it is assumed that each (#7-#0) storage unit 772 of the image processing apparatus has a capacity of 2 megabits (1 megabit=1,048,576 (=$2^{20}$) bits). It is also assumed that image data comprise one bit for one picture element, and an input/output of each bit is allocated to each storage unit #7-#0 for one input/output unit. In such a case, address An representing a portion storing image data to be stored in the storage units 772 can be represented by a length of 21 bits, since the capacity of each (#7-#0) storage unit 772 is 2 megabits (=$2^{21}$ bits). Respective bits of the address An are represented by $A_{20}-A_0$. Since the entire storage capacity of the storage units 772 in the present embodiment is 2 megabits×8=16 megabits, for example, it is possible to deal with image data comprising one bit for one picture element with a configuration of 4096 picture elements×4096 lines.

Figure 78A:
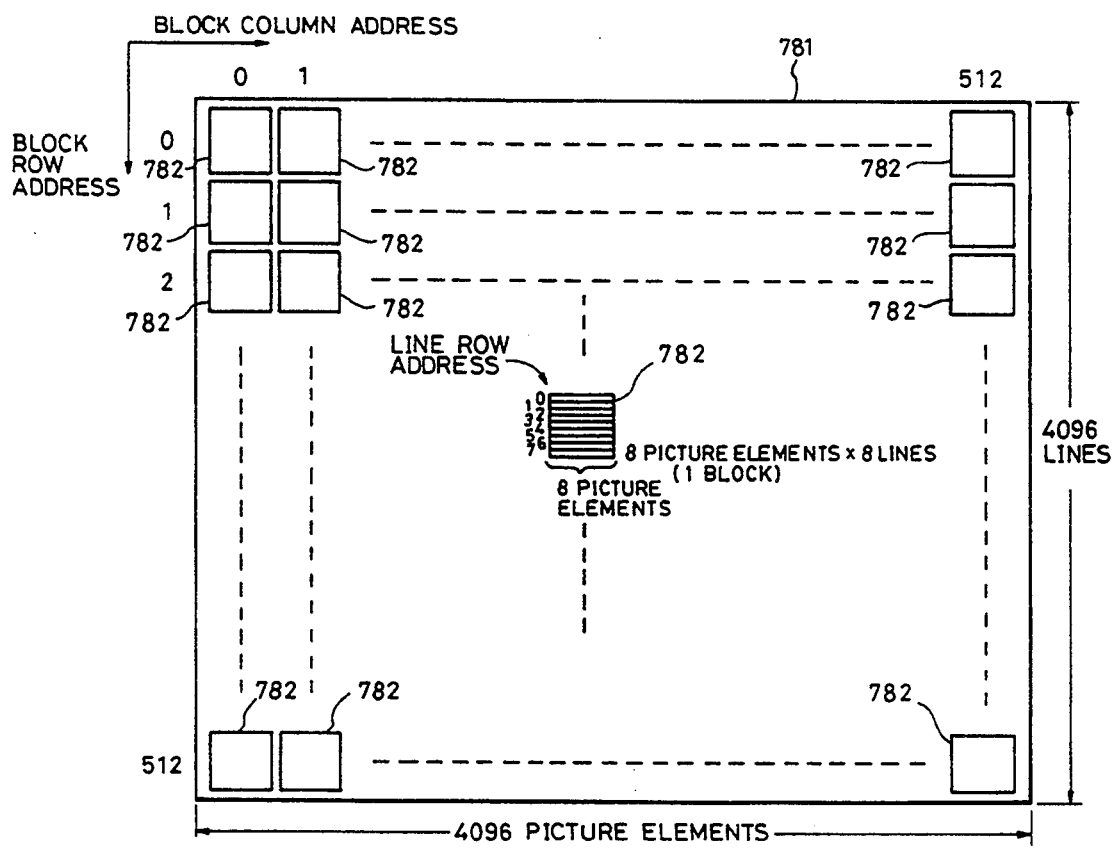
FIG. 78(A) illustrates correspondence between the entire image data and respective blocks when image data are divided into blocks in units of 8 lines × 8 picture elements.
Figure 78B:
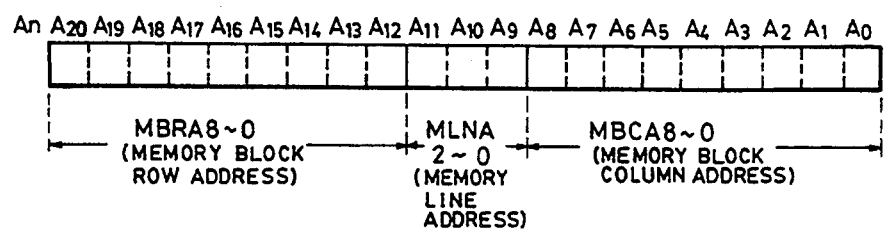
FIG. 78(B) is a diagram showing the internal configuration an image data address An when image data are divided into blocks in units of 8 lines × 8 picture elements.

If the entire image data configured by 4096 picture elements (in the horizontal direction)×4096 lines (in the vertical direction) with one bit for one picture element are divided into blocks in units of 8 lines×8 picture elements, as shown in 78(A), the internal configuration of address An may be arranged so that addresses $A_8-A_0$, $A_{20}-A_{12}$ and $A_{11}-A_9$ represent block addresses of respective columns, block addresses of respective rows and respective line addresses for 8 lines within each block, respectively, as shown in FIG. 78(B). Particularly, addresses $A_8-A_0$, $A_{20}-A_{12}$ and $A_{11}-A_9$ will be termed MBCA8-0 (memory block column address), MBRA8-0 (memory block row address) and MLNA-2-0 (memory block line address), respectively. In the image processing apparatus shown in FIG. 77, when the bus master 771 actually accesses the storage units 772 to write or read image data, the value of MBCAn (n=0-8) and MBRAn (n=0-8) are supplied to addresses BCAn (block column address) and BRAn (block row address) via the address selector unit 776 as they are, to become MBCAn=BCAn and MBRAn=BRAn. The value of MLNAn (n=0-2) is commonly supplied to MAn (memory address) of each storage unit 772 via the address selector unit 776.

Figure 79:
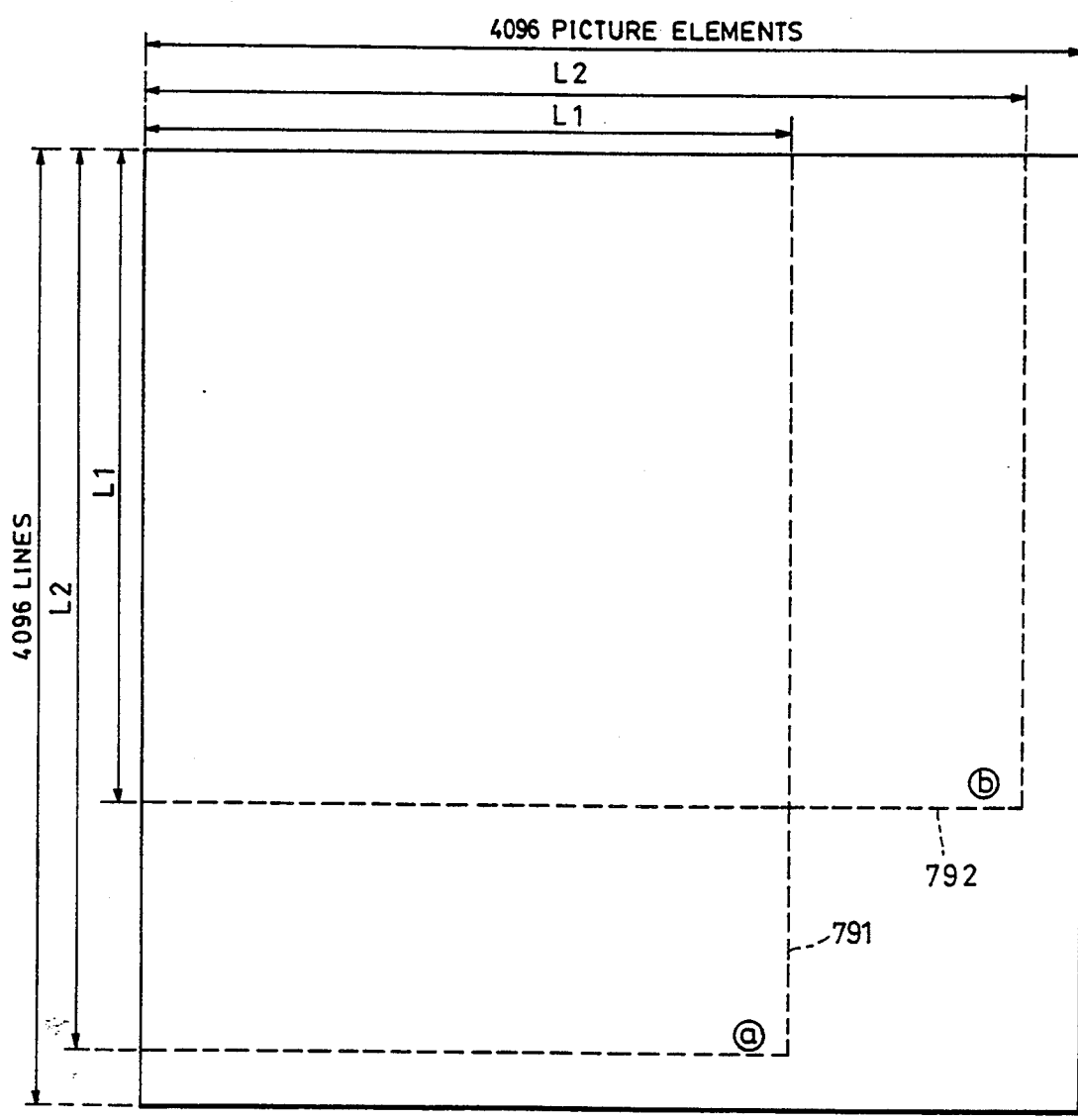
FIG. 79 illustrates correspondence between an image data storage unit and sizes of paper for image data output.
Figure 80:
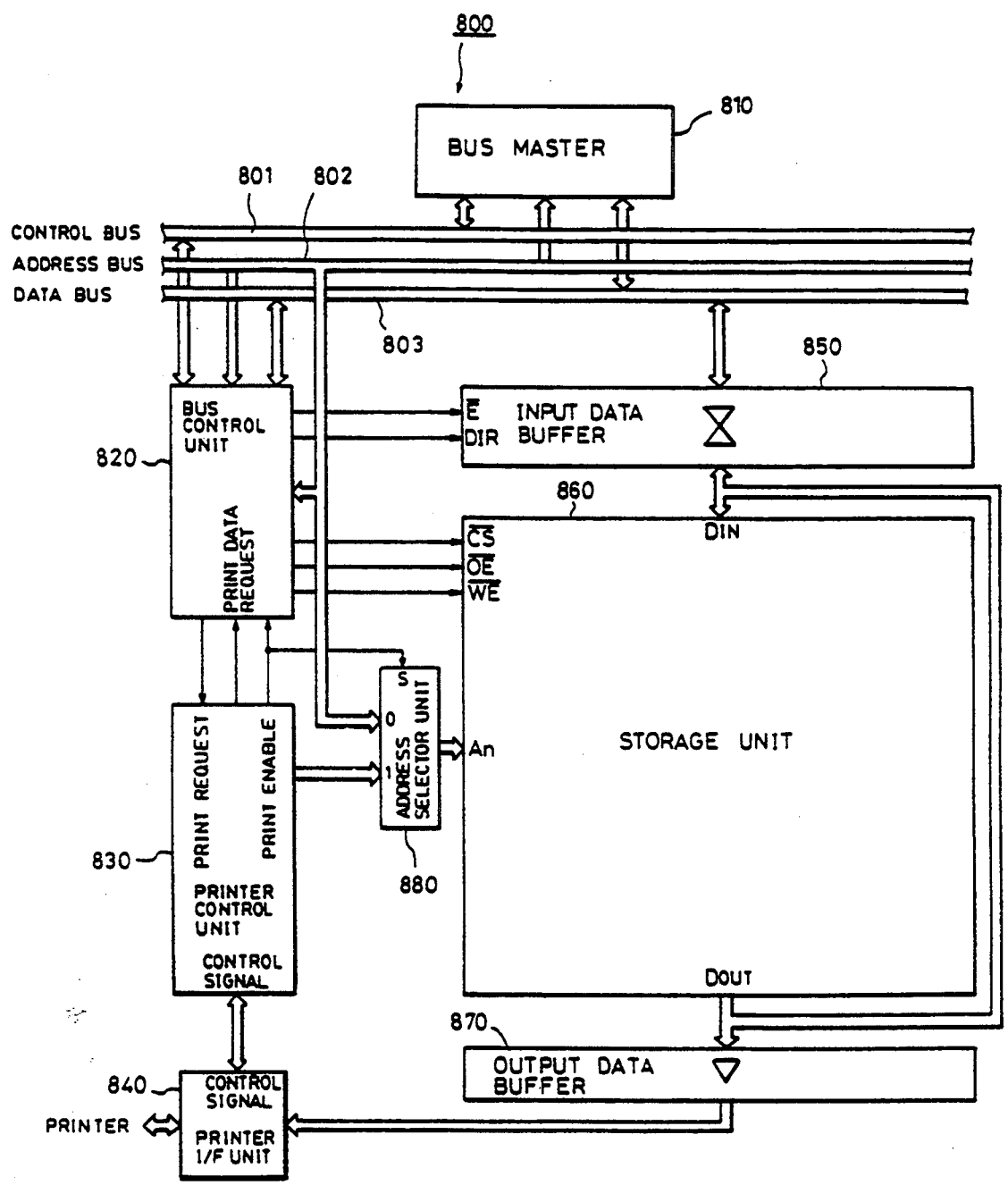
FIGS. 80-83 illustrate a conventional approach.
Figure 81:
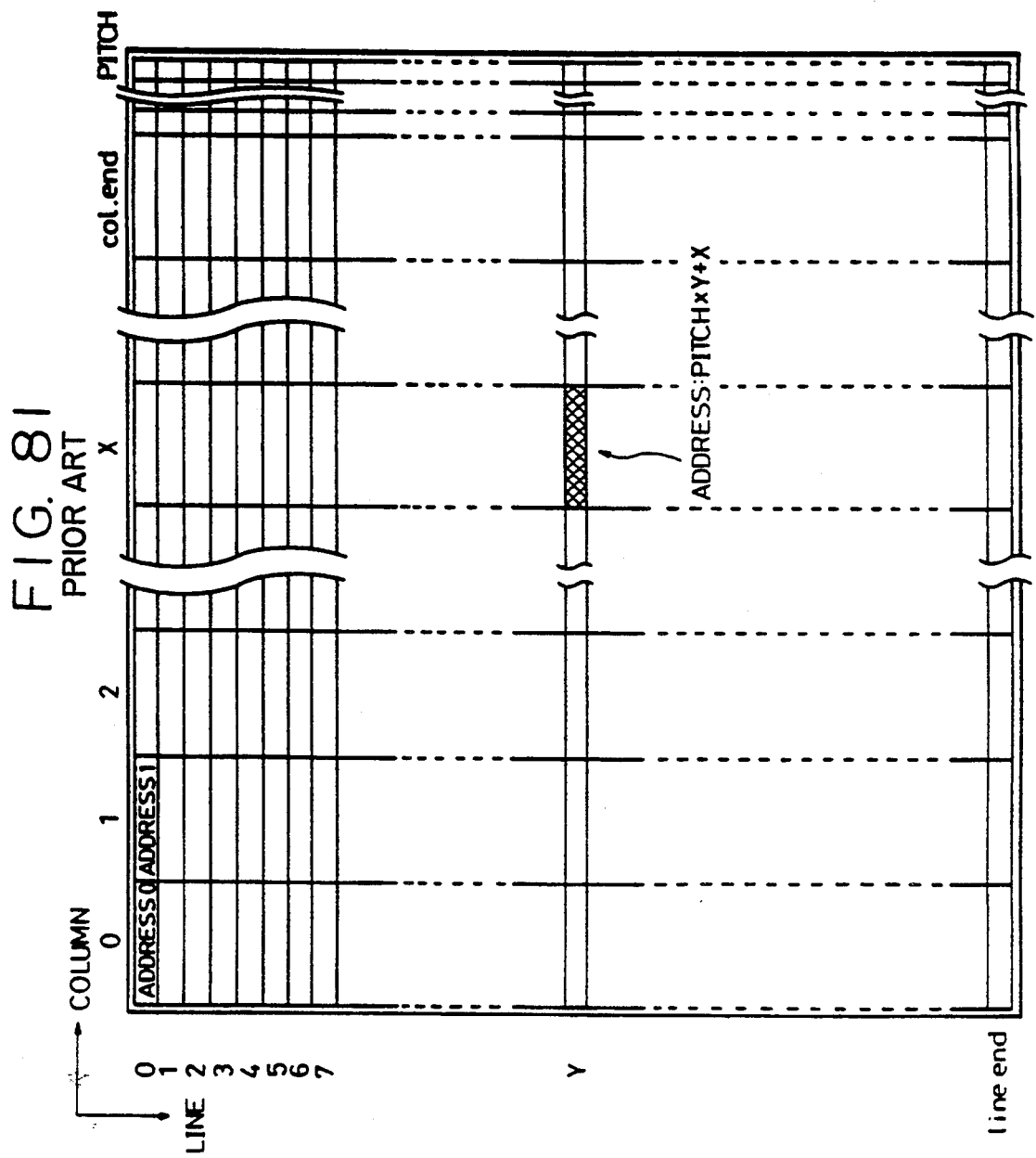
Figure 82:
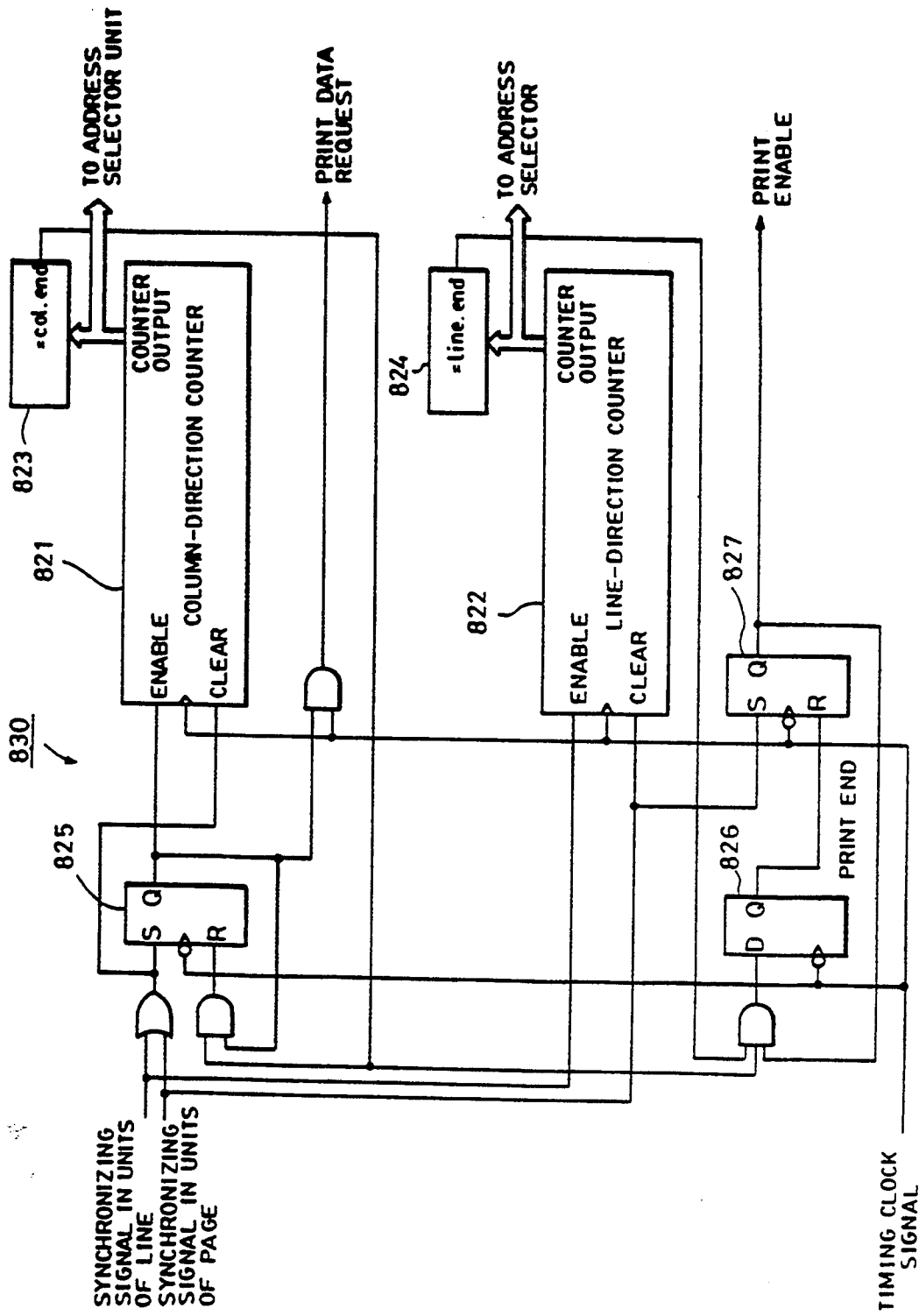
Figure 83:
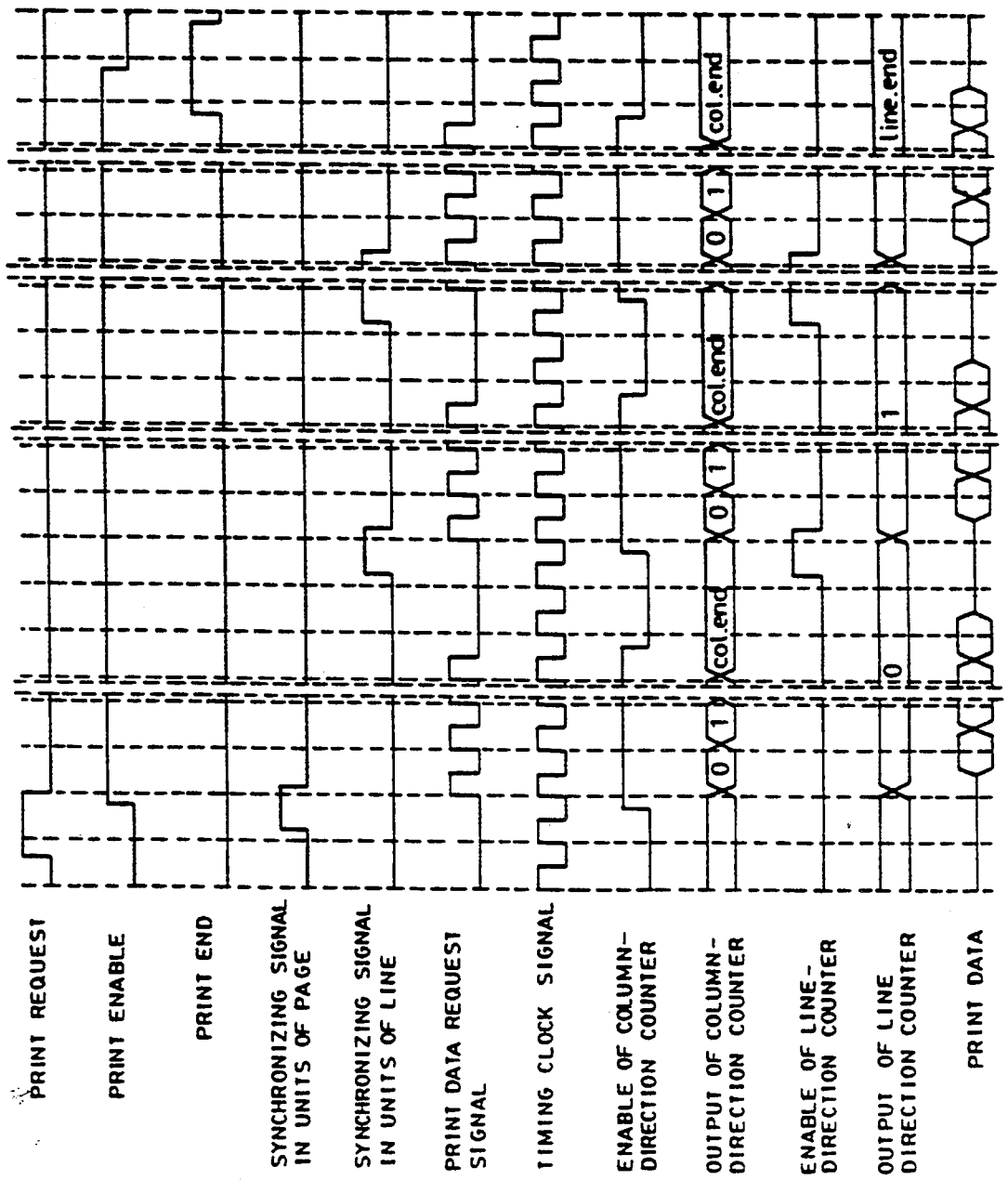

In the image processing apparatus using such an image-data storage method, as shown in FIG. 79, portion 791 represented by symbol ⓐ of the storage units 772 may be used when storing data of a vertically-long image, and portion 792 represented by symbol ⓑ may be used when storing data of a horizontally-long image.

In the following seventh and eighth embodiments, a CRT display device and a scanner device are added to the apparatus of the fifth embodiment as output means and input means, respectively. Hence, an explanation will be provided only of the configuration thereof.

Seventh Embodiment

A seventh embodiment of the present invention will now be explained with reference to the attached drawings.

Figure 84:
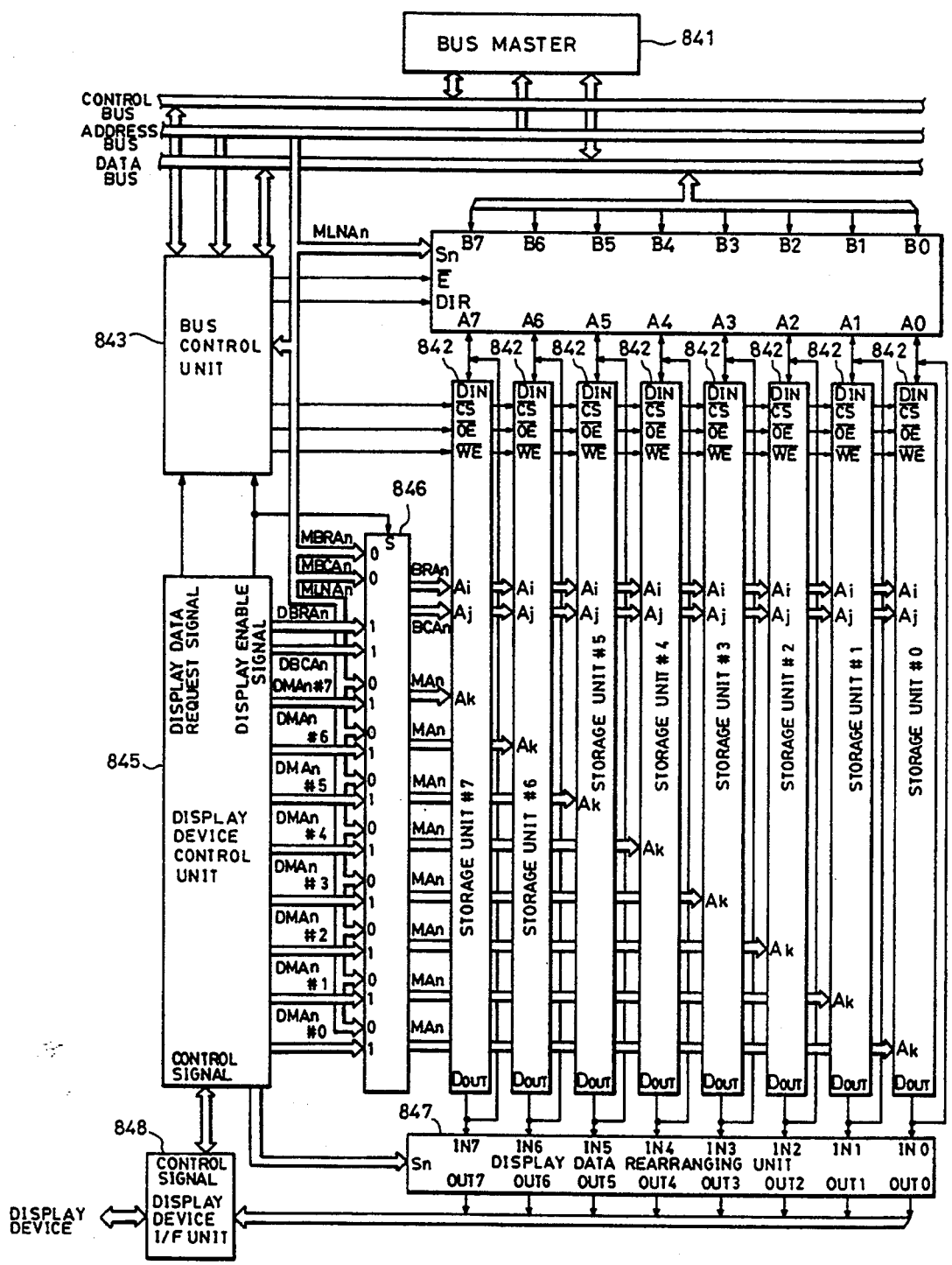
FIG. 84 is a block diagram showing an image processing apparatus according to a seventh embodiment of the present invention.
Figure 85:
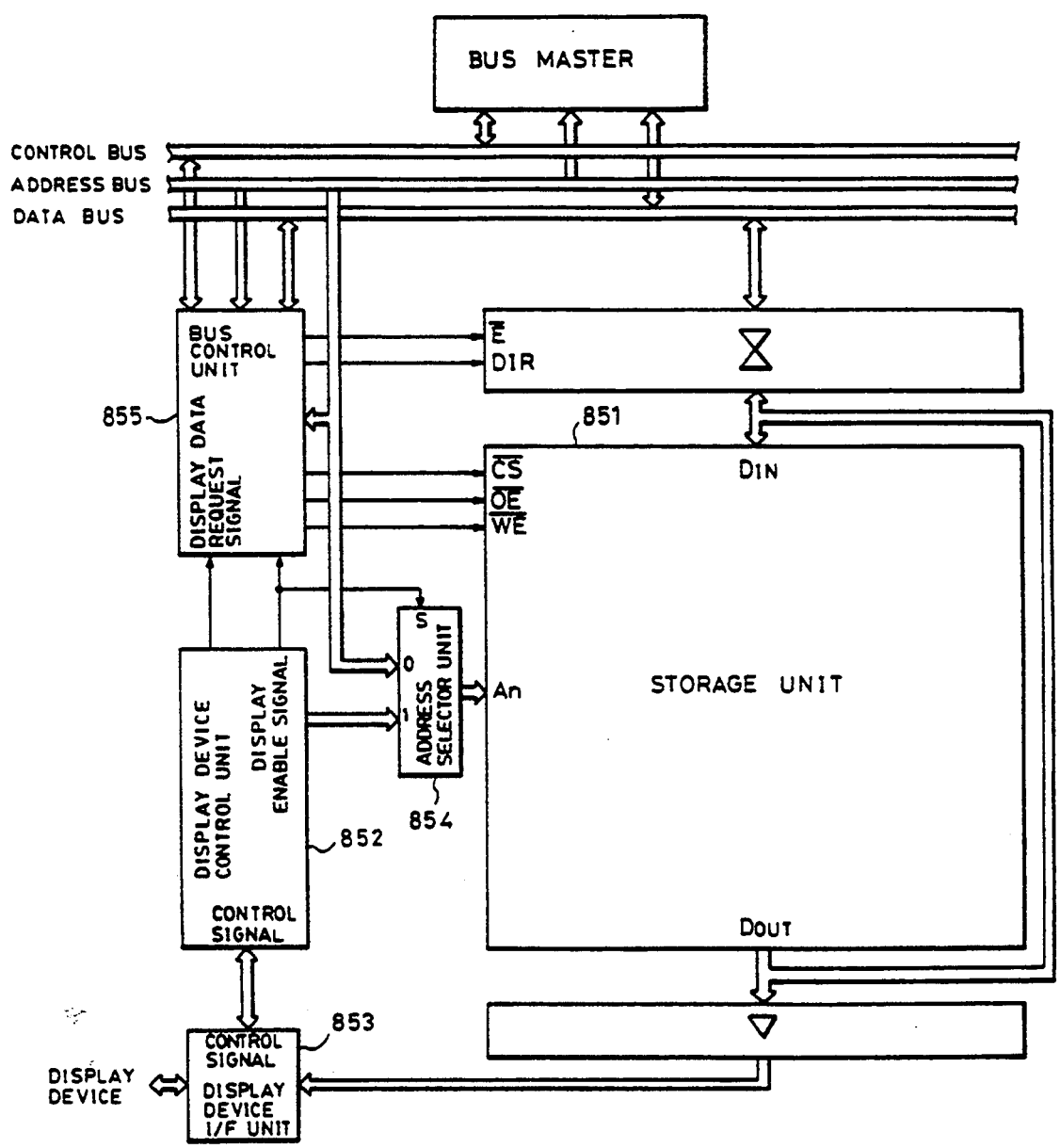
FIGS. 85-91 illustrate a conventional approach.
Figure 86:
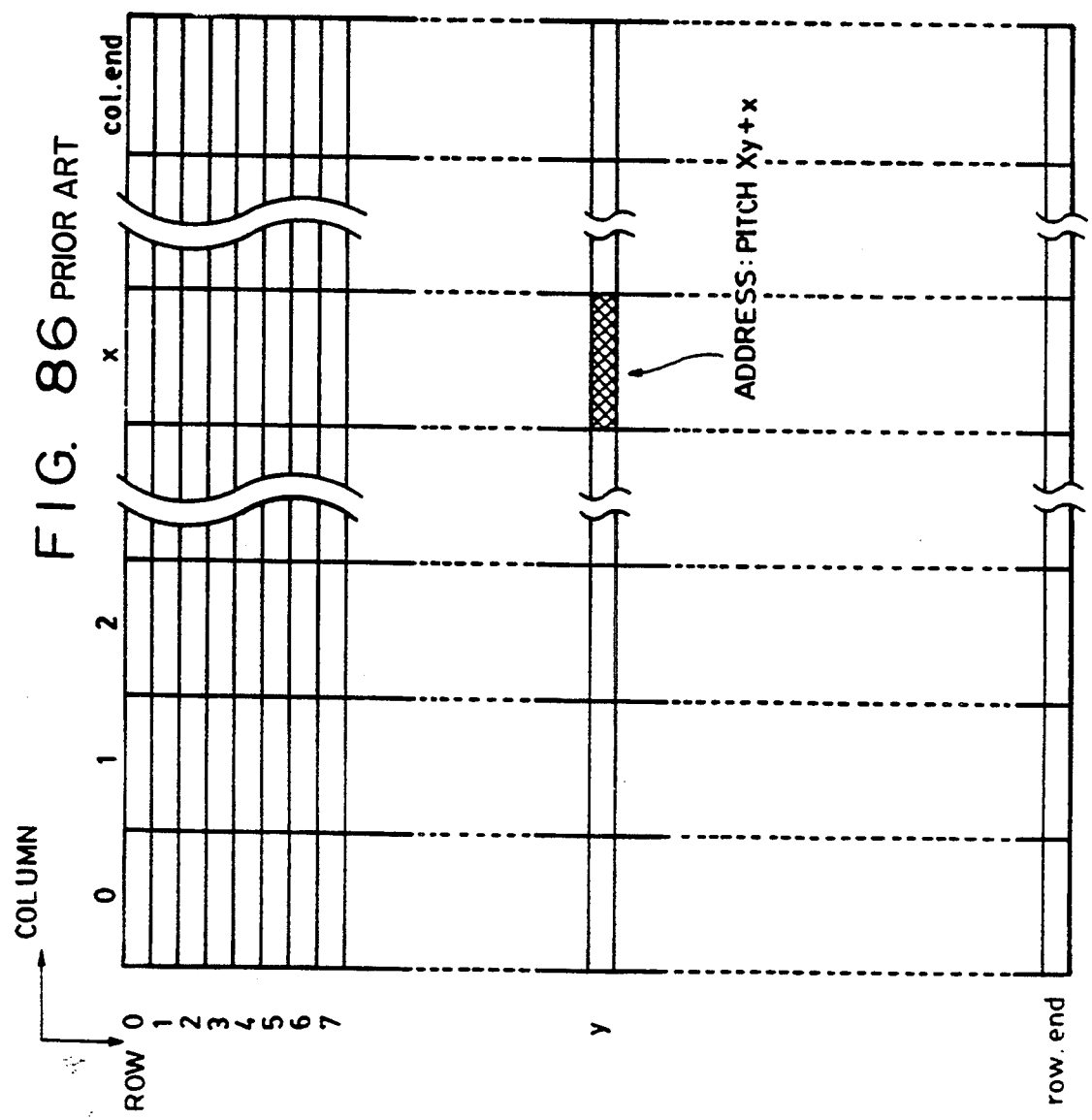
Figure 87:
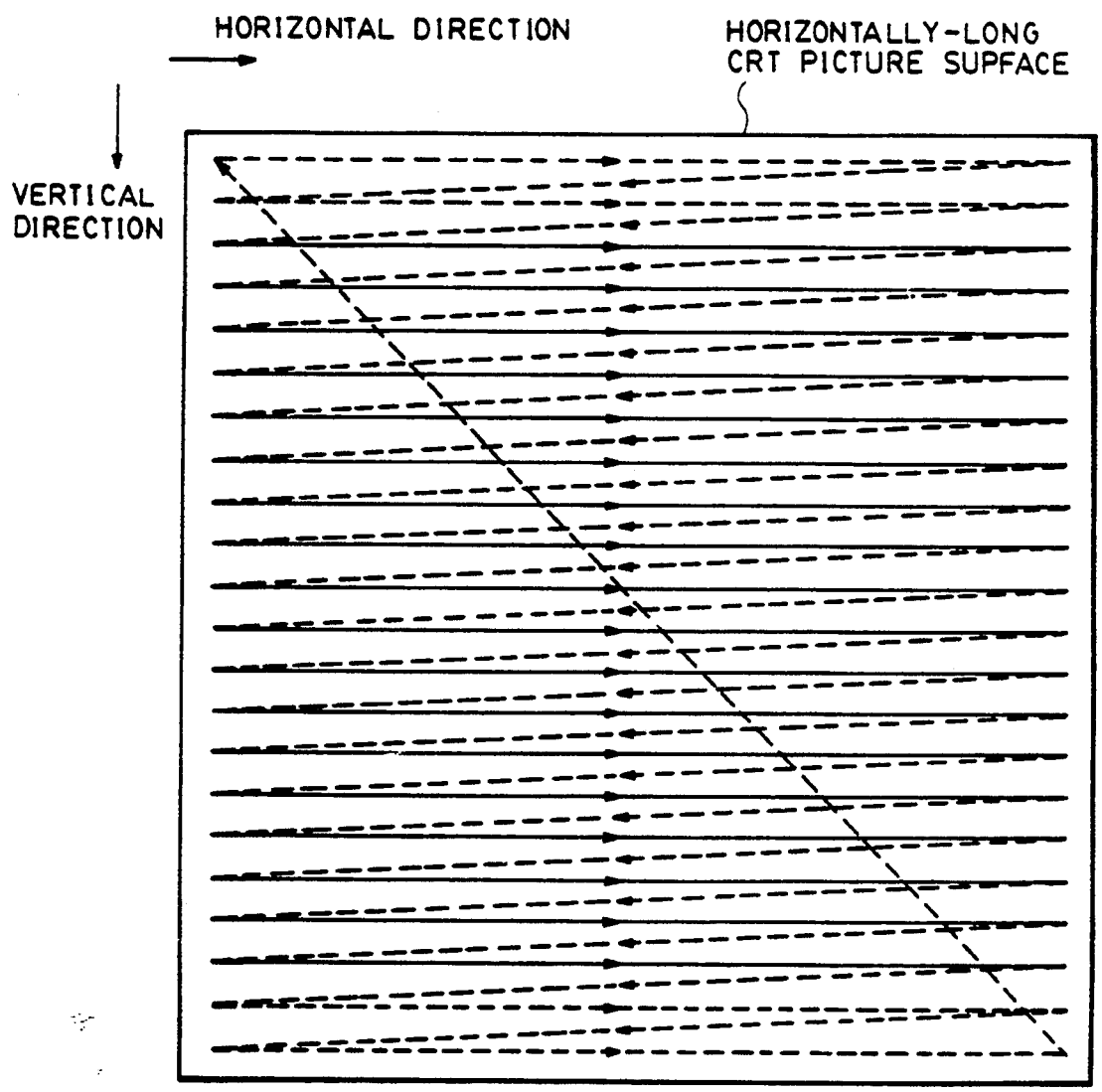
Figure 88:
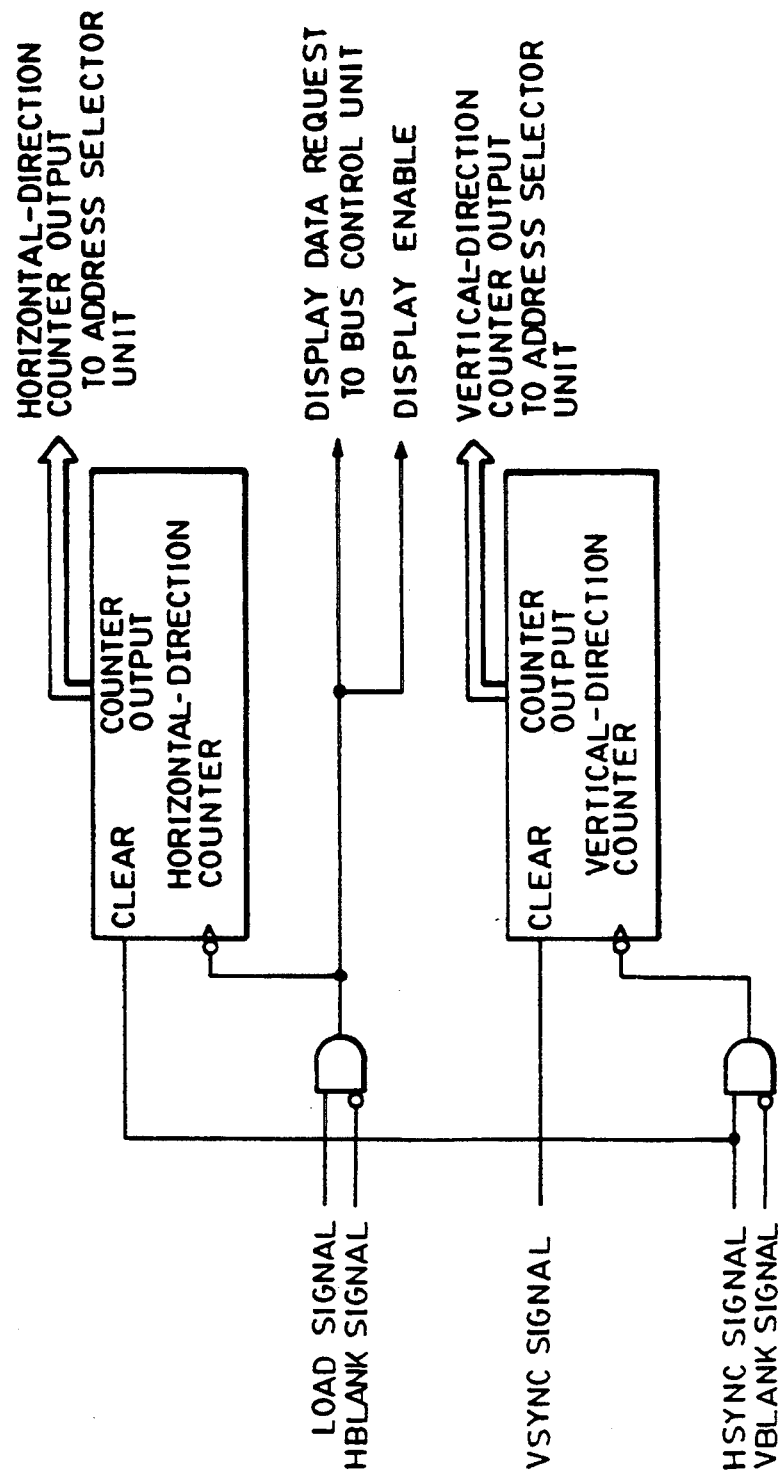
Figure 89:
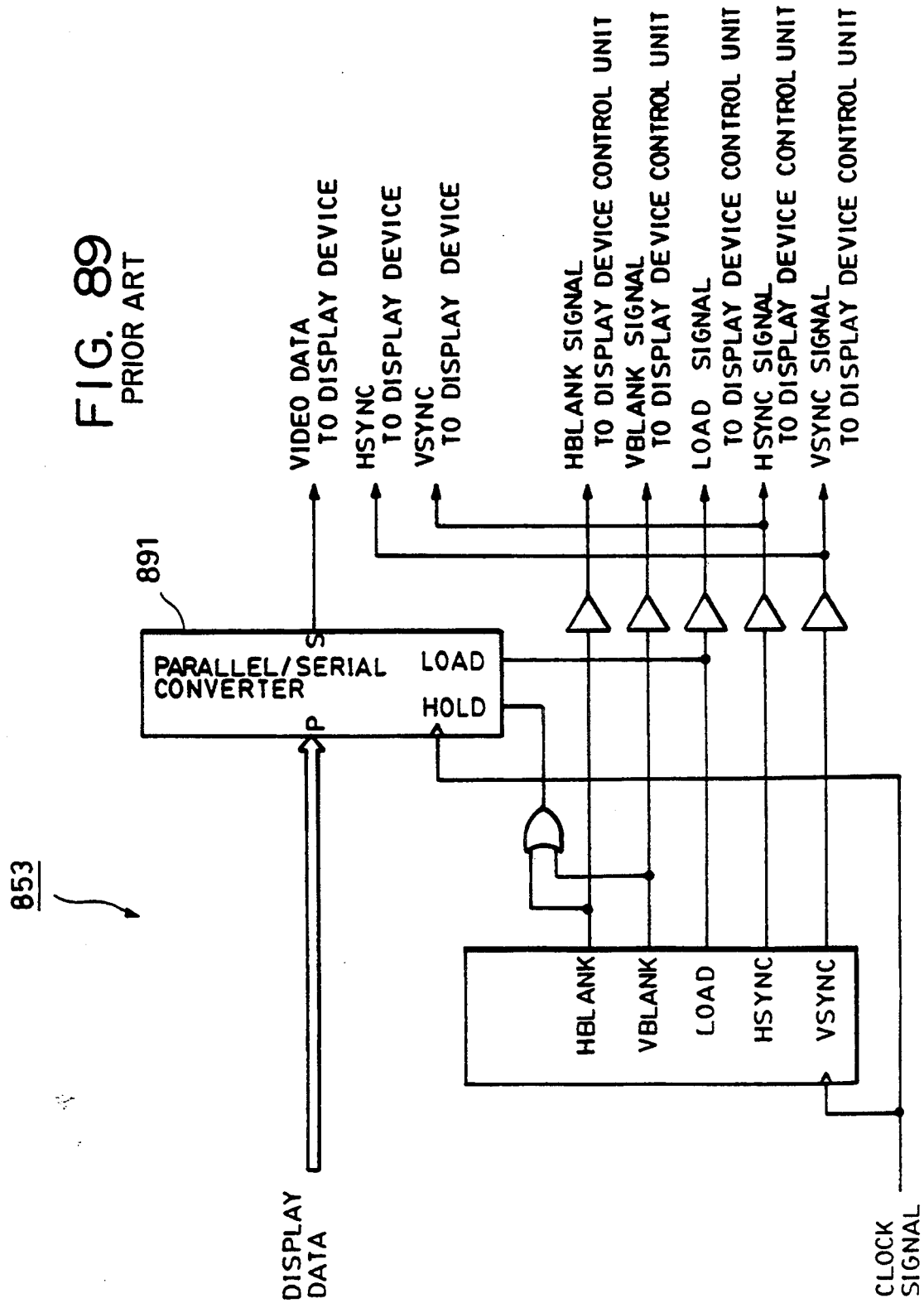
Figure 90:
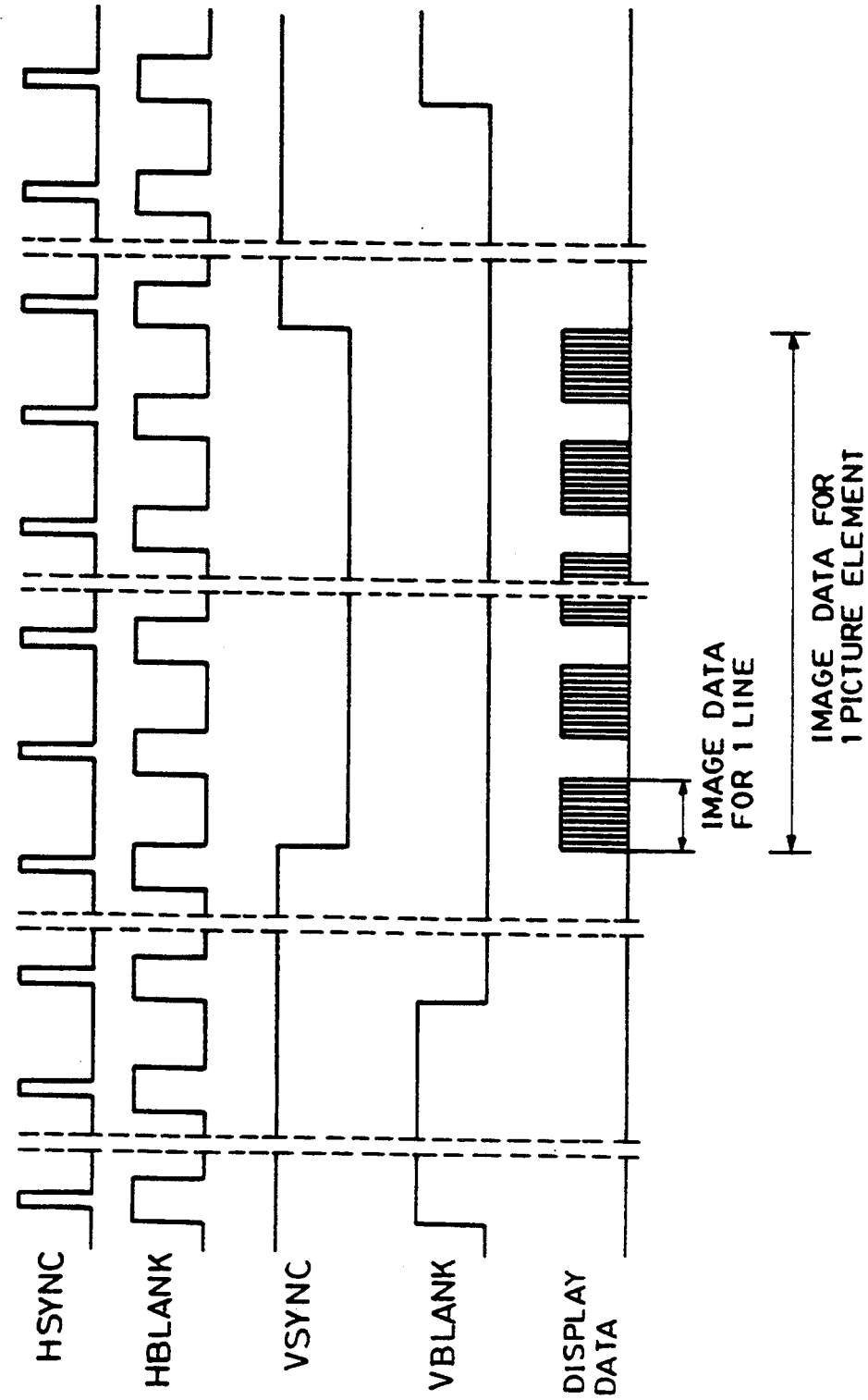
Figure 91:
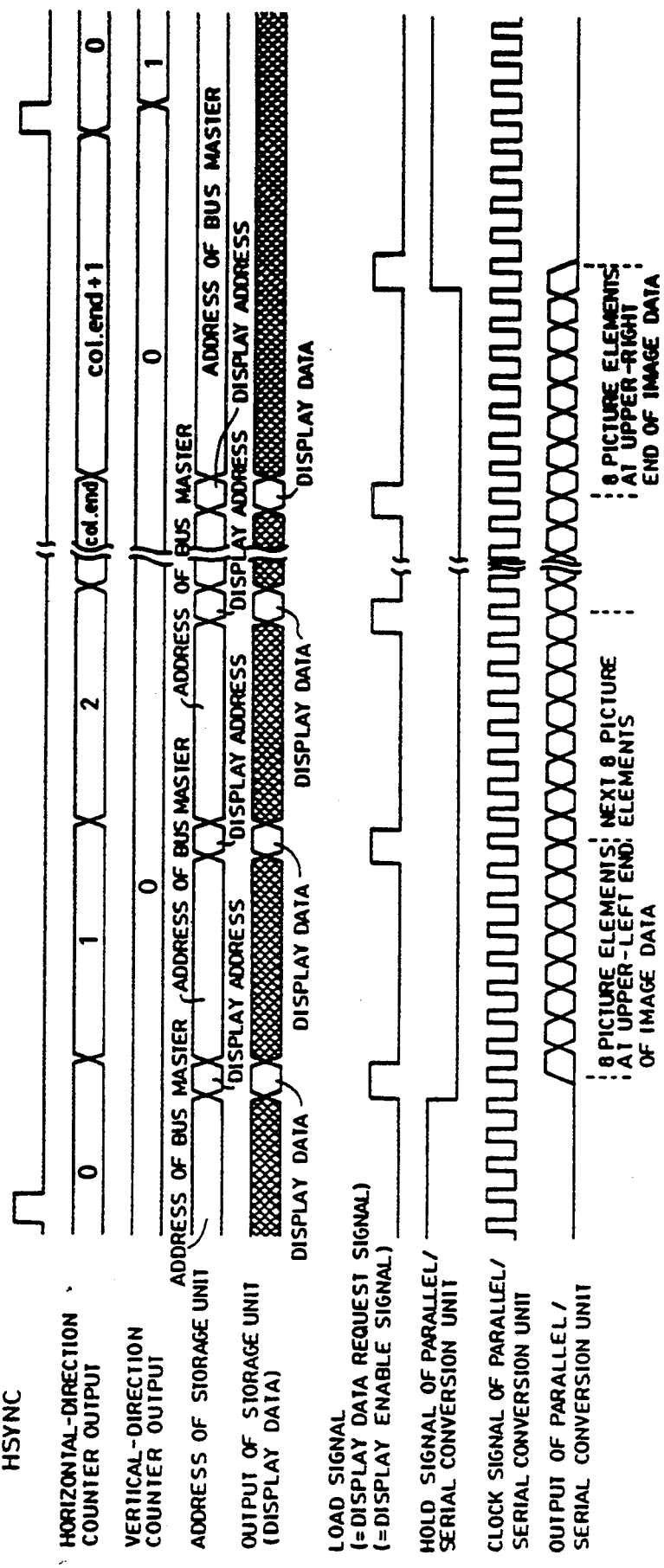

FIG. 84 is a block diagram showing an image processing apparatus, wherein a unit of input/output data is 8 bits, according to the seventh embodiment. In FIG. 84, a bus master 841 possesses buses for a CPU, a graphic controller, an image processor and the like. Storage units 842 store image data. A bus control unit 843 generates control signals for the storage units 842 or the like from addresses and control signals of the bus master 841. An input/output data rearranging unit 844 rearranges data at the accesses of the bus master 841 in accordance with part of addresses. A display device control 845 generates addresses when reading image data from the storage units 842 in order to transmit the data to a display device, rearranging signals for the read data, and other control signals during display. An address selector unit 846 switches between addresses at accesses of the bus master 841 and addresses generated by the display device control unit 845 during display. A display data rearranging unit 847 rearranges image data read from the storage units 842 in order to transmit the data to the display device in accordance with rearranging signals of the display device control unit 845. A display device I/F unit 848 generates control signals for the display device to function as an interface with the display device.

Eighth Embodiment

Figure 92:
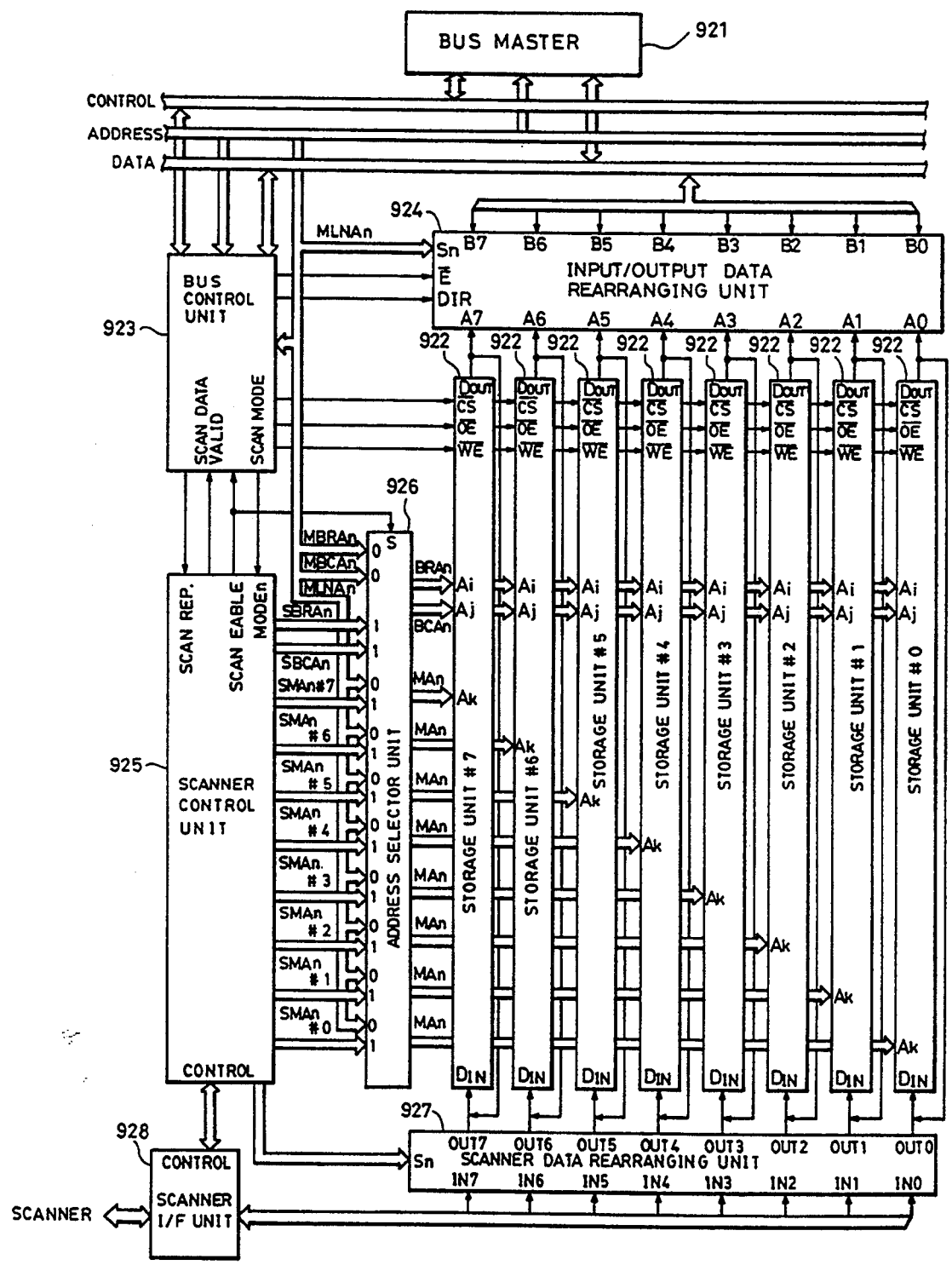
FIG. 92 is a block diagram showing an image processing apparatus according to an eighth embodiment of the present invention.
Figure 93:
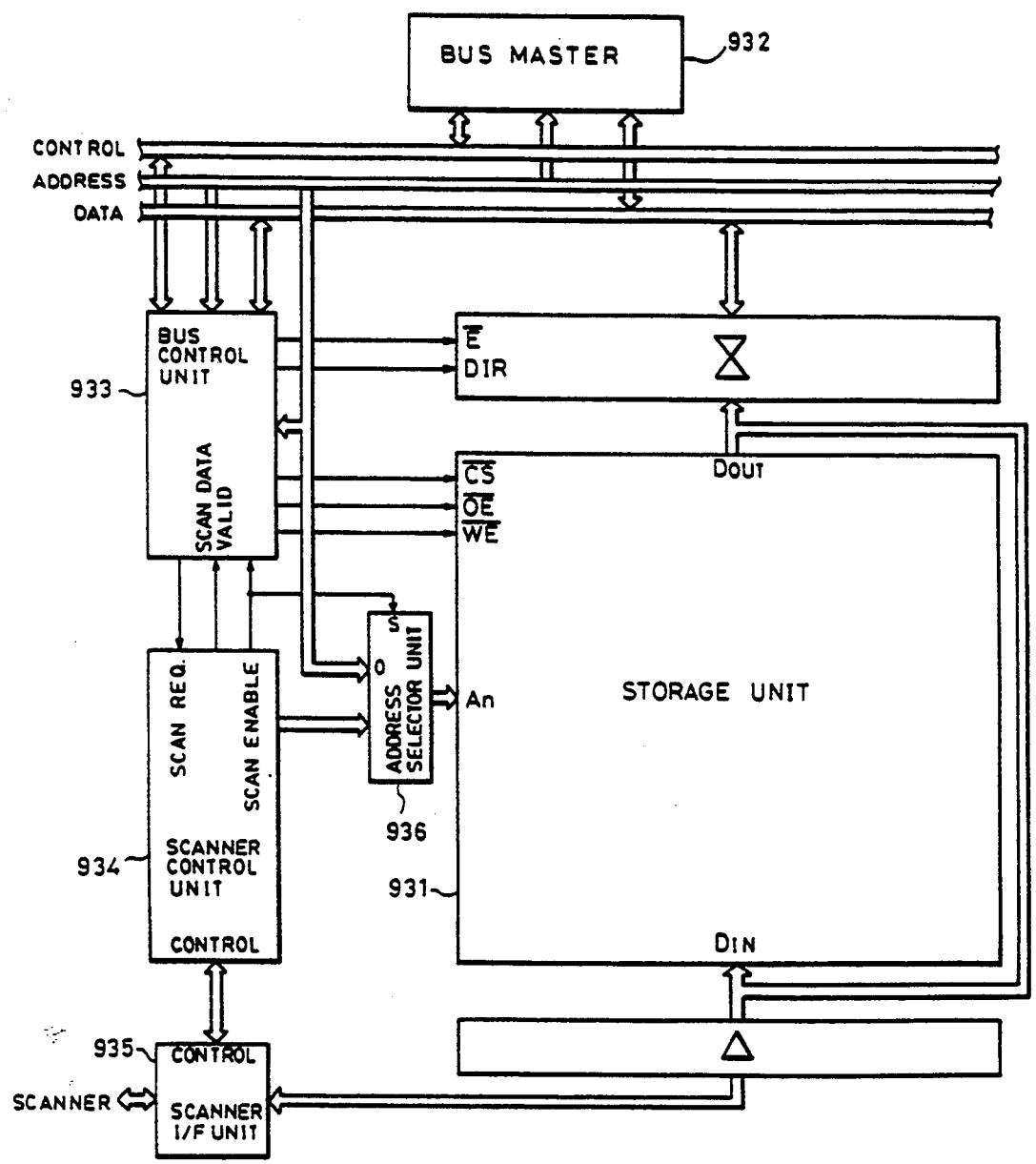
FIG. 93 is a block diagram showing the configuration of a conventional image processing apparatus.
Figure 94:
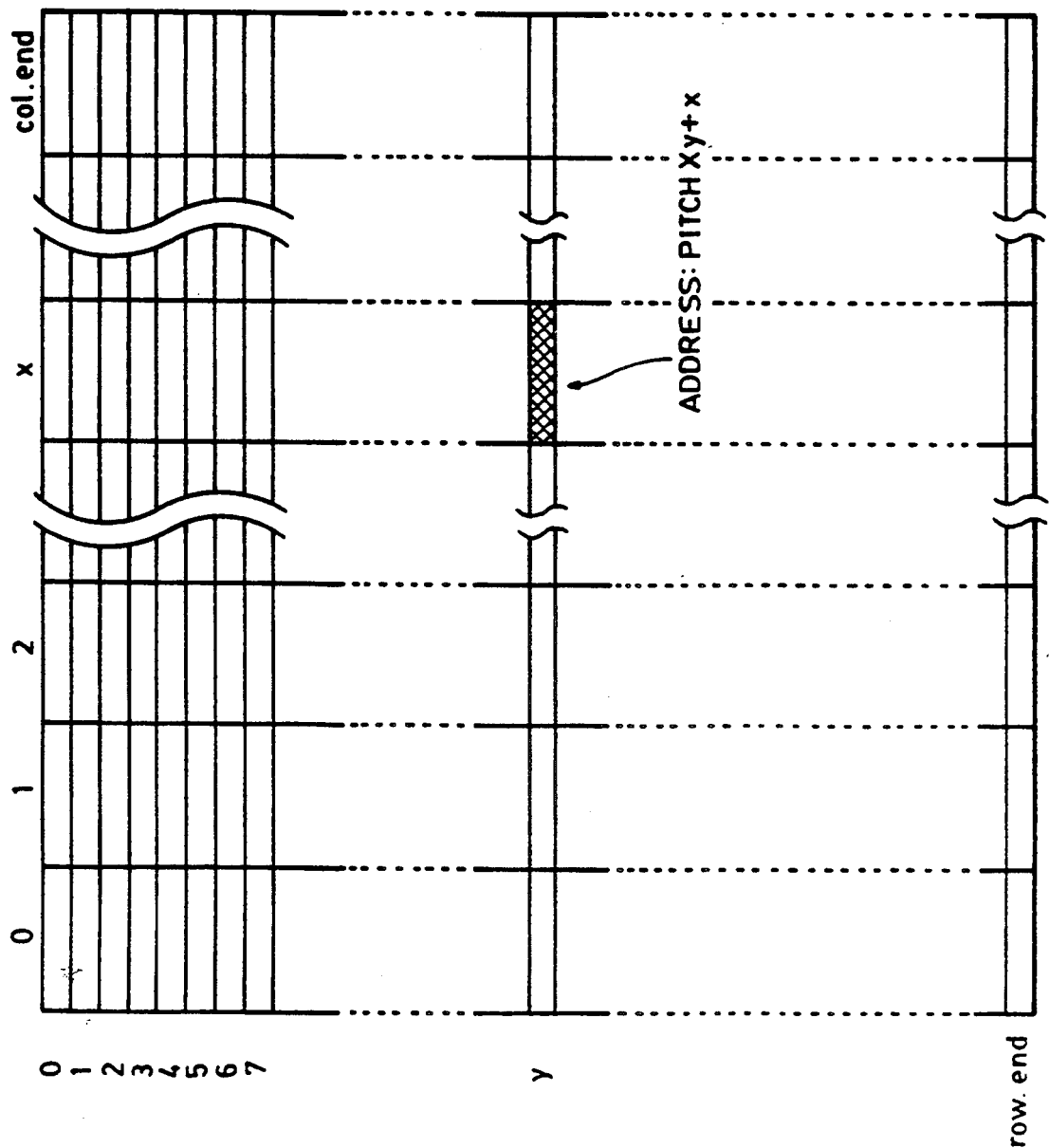
FIG. 94 is a diagram illustrating a conventional storage unit.
Figure 95:
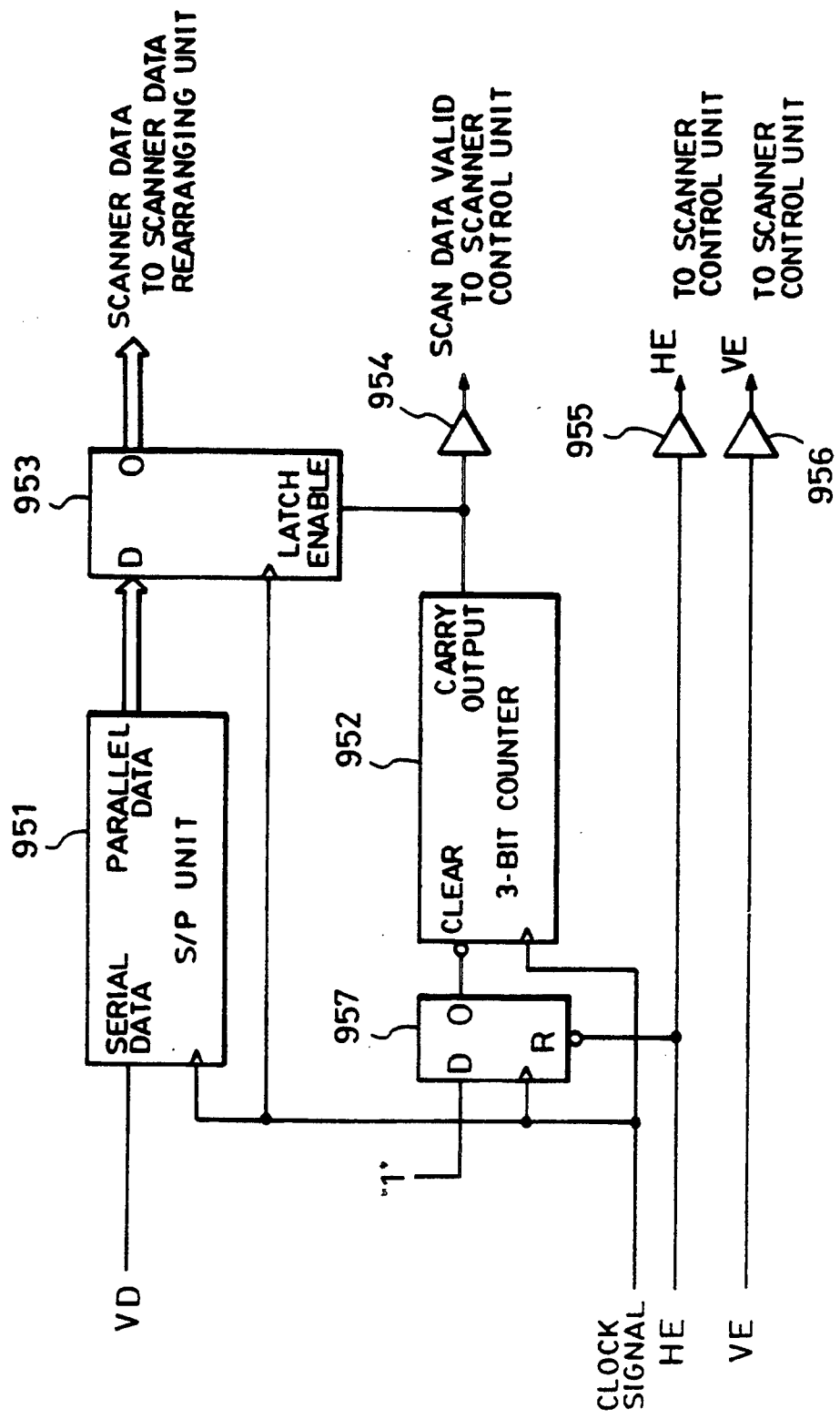
FIG. 95 is a block diagram showing the configuration of a conventional scanner I/F unit.
Figure 96:
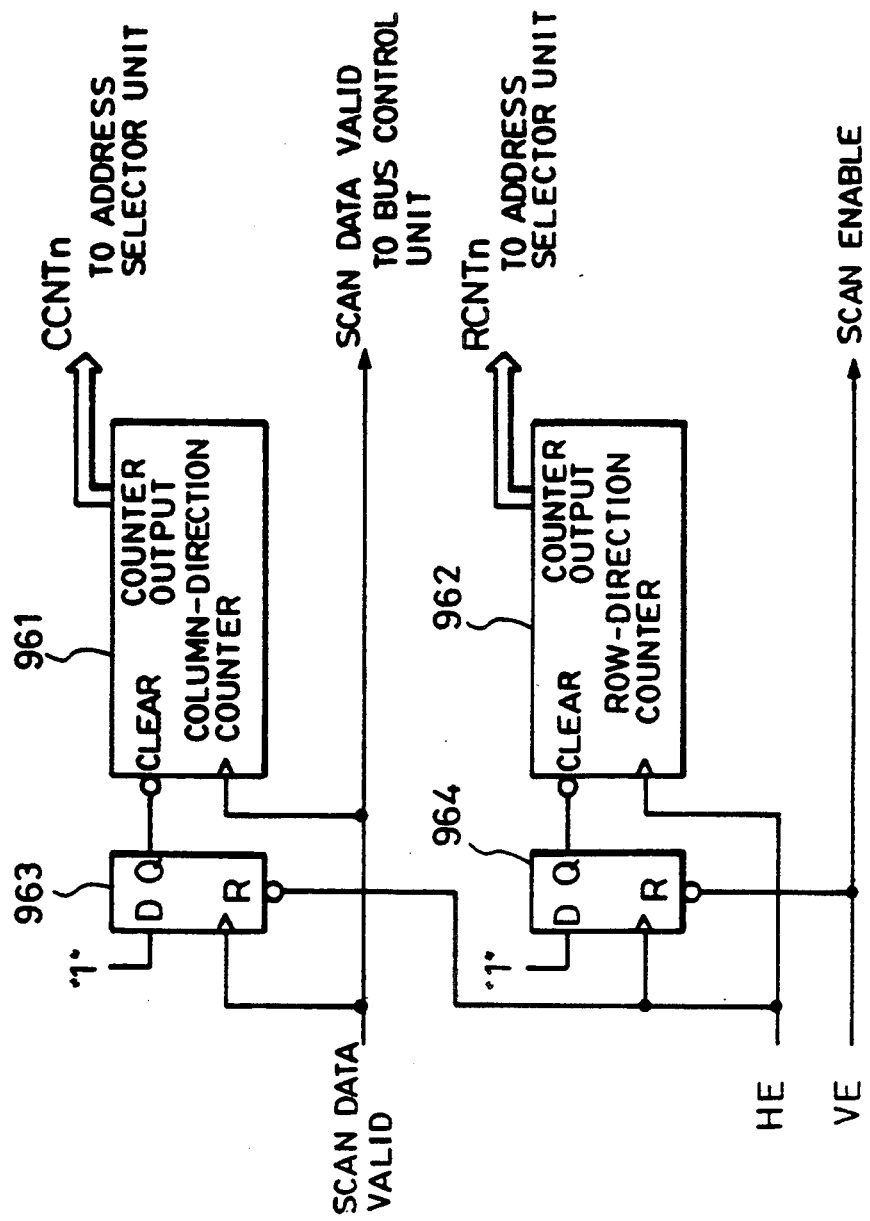
FIG. 96 is a block diagram showing the configuration of a conventional scanner control unit.

FIG. 92 is a block diagram showing an image processing apparatus according to an eighth embodiment of the present invention. In the eighth embodiment, an unit of input/output data is 8 bits. In FIG. 92, a bus master 921 possesses buses for a CPU, a graphic controller, an image processor and the like. Storage units 922 store image data. A bus control unit 923 generates control signals for storage units 922 or the like from addresses and control signals of the bus master 921. An input/output data rearranging unit 924 rearranges data at the accesses of the bus master 921 in accordance with part of addresses. A scanner control unit 925 generates addresses when writing data from a scanner in the storage units 922, rearranging signals for the written data, control signals for the scanner, and other control signals at inputs to the scanner. An address selector unit 926 switches between addresses at accesses of the bus master 921 and addresses generated by the scanner control unit 925 at inputs to the scanner. A scanner data rearranging unit 927 rearranges data from the scanner to be written in the storage units 922 in accordance with rearranging signals of the scanner control unit 925. A printer I/F unit 928 is an interface with the scanner.

What is claimed is:

1. A pattern generator of an image processing apparatus for generating an image pattern corresponding to code data according to the assignment of the code data, said pattern generator comprising:
   storage means for storing an image pattern having the form of a dot matrix in a form wherein the positions of columns in respective rows are rearranged in different manners, prior to commencement of rotation and/or mirror-image processing;
   indication means for indicating rotation and/or mirror-image processing of the image pattern;
   row address generation means for generating row addresses of said storage means in accordance with the indication of said indication means;
   outputting means for determining for each row the position of dots to be read out on the basis of a row address generated by said row address generation means and reading out data corresponding to said address; and
   rearranging means for rearranging the data on the basis of the rotation and/or mirror-image processing indicated by said indication means.

2. A pattern generator according to claim 1, further comprising reading-direction/rotation/mirror-image indication means for indicating from which direction, of a row direction and a column direction, the image pattern is to be read, and to read the image pattern by performing rotation and/or mirror-image processing.

3. An image processing apparatus according to claim 1, further comprising a plurality of tables, wherein one table is selected from among the plurality of tables in accordance with an indication by said indication means and said row address generation means generates row addresses according to the selected table.

4. An image processing apparatus comprising:
   storage means for storing an image pattern having the form of a dot matrix in a form wherein the positions of columns in respective rows are rearranged in different manners, prior to commencement of rotation and/or mirror-image processing;
   display means for displaying the image pattern;
   reading means for reading the image pattern from said storage means in synchronization with display scanning of said display means;
   indication means for indicating rotation and/or mirror-image processing of the image pattern;
   row address generation means for generating row addresses of said storage means in accordance with the indication by said indication means;
   outputting means for determining for each row the position of dots to be read out on the basis of a row address generated by said row address generation means and reading out data corresponding to said row address; and
   rearranging means for rearranging the data on the basis of the rotation and/or mirror-image processing indicated by said indication means.

5. An image processing apparatus, comprising:
   storage means for storing an image pattern having the form of a dot matrix in a form wherein the positions of columns in respective rows are rearranged in different manners, prior to commencement of rotation and/or mirror-image processing;
   printing means for printing the image pattern on a recording medium;
   reading means for reading the image pattern from said storage means in synchronization with a printing operation of said printing means;
   indication means for indicating rotation and/or mirror-image processing of the image pattern;
   column address generation means for generating column addresses of said storage means in accordance with the indication of said indication means;
   outputting means for determining for each column the position of dots to be read out on the basis of a column address generated by said column address generation means and reading out data corresponding to said column address; and
   rearranging means for rearranging the data on the basis of the rotation and/or mirror-image processing indicated by said indicating means.

6. An image processing apparatus, comprising:
   input means for inputting image data;
   storage means for storing the image data input by said input means;
   first rearranging means for rearranging the image data input by said input means in accordance with part of addresses of the image data when inputting the image data to be stored in said storage means, in a form wherein the positions of columns in respective rows are rearranged in different manners, prior to commencement of rotation and/or mirror-image processing;
   indication means for indicating rotation and/or mirror-image processing for the image data input by said input means;
   second rearranging means for rearranging the image data stored in said storage means on the basis of the rotation and/or mirror-image processing indicated by said indication means; and
   output means for outputting the image data rearranged by said second rearranging means.

7. An image processing apparatus, comprising:
   storage means for storing image data;
   input/output data rearranging means for rearranging the image data in accordance with part of addresses of the image data when inputting/outputting the image data, in a form wherein the positions of columns in respective rows are rearranged in different manners, prior to commencement of rotation and-/or mirror-image processing;

indication means for indicating a change in a reading direction of the image data when displaying the image data;

address generation means for generating addresses of said storage means in accordance with the indication of said indication means;

outputting means for determining the position of data to be read out on the basis of an address generated by said address generation means and reading out image data corresponding to the generated address; and display data rearranging means for rearranging the image data on the basis of the rotation and/or mirror-image processing indicated by said indication means.

8. An image processing apparatus, comprising:

input means for inputting assignment of rotation or mirror-image processing of an original image;

generation means for generating addresses of storage means according to the assignment input by said input means;

outputting means for determining the position of image data to be read out on the basis of an address generated by said generation means and reading out image data corresponding to the generated address;

rearranging storage means for storing the image data while rearranging the data according to addresses generated by said generation means, in a form wherein the positions of columns in respective rows are rearranged in different manners, prior to commencement of rotation or mirror-image processing; and rearranging reading means for rearranging the image data on the basis of the rotation or mirror-image processing assigned by said input means.

9. An image processing apparatus for processing an image pattern having the form of a dot matrix consisting of a plurality of rows and columns, comprising:

storage means for storing data in a form wherein respective rows of the image pattern are shifted in different quantities, prior to commencement of rotation and/or mirror-image processing;

indication means for indicating a rotation of image pattern;

generation means for generating row addresses in accordance with an indication of said indication means, wherein the row addresses allocated to the respective rows are different according to the indication by the indication means;

outputting means for determining for each row the position of data to be read out on the basis of an address generated by said generation means and reading out image data corresponding to the generated address; and shift means for shifting data read from the row addresses on the basis of the rotation of the image pattern indicated by said indication means.

10. An image processing apparatus according to claim 9, further comprising a plurality of tables, wherein one table is selected from among the plurality of tables in accordance with an indication by said indication means and said generation means generates row addresses according to the selected table.

11. An image processing apparatus according to claim 9, further comprising a display means, wherein data shifted by said shift means are displayed by the display means.

12. An image processing apparatus according to claim 9, further comprising a printing mode, wherein data shifted by said shift means are printed by the printing means.

13. An image processing method for processing an image pattern having the form of a dot matrix consisting of a plurality of rows and columns comprising the steps of:

storing data in a form wherein respective rows of the image pattern are shifted in different quantities, prior to commencement of rotation processing;

indicating a rotation of the image pattern;

generating row addresses in accordance with the indication, wherein the row addresses allocated to the respective rows are different according to the indication;

determining for each row the position of dots to be read out on the basis of the generated row address and reading out data corresponding to the row address; and shifting data read from the row addresses in accordance with the shift quantities according to the indication.

14. An image processing method for generating an image pattern corresponding to code data according to the assignment of the code data, comprising the steps of:

storing an image pattern having the form of a dot matrix in a form wherein the positions of columns in respective rows are rearranged in different manners, prior to commencement of rotation and/or mirror-image processing;

indicating rotation and/or mirror-image processing of the image pattern;

generating row addresses for the stored image pattern in accordance with the indicated rotation and/or mirror-image processing;

determining for each row the position of dots to be read out on the basis of the generated row address and reading out data corresponding to the row address; and rearranging the data on the basis of the indicated rotation and/or mirror-image processing.

15. An image processing method, comprising the steps of:

storing an image pattern having the form of a dot matrix in a form wherein the positions of columns in respective rows are rearranged in different manners, prior to commencement of rotation and/or mirror/image processing;

printing the image pattern on a recording medium;

reading the stored image pattern in synchronization with the printing of the image pattern;

indicating rotation and/or mirror-image processing of the image pattern;

generating column addresses for the stored image pattern in accordance with the indicated rotation and/or mirror-image processing;

determining for each column the position of data to be read out on the basis of the generated column address and reading out data corresponding to the column address; and rearranging said data on the basis of the indicated rotation and/or mirror-image processing.

* * * * *

UNITED STATES PATENT AND TRADEMARK OFFICE
CERTIFICATE OF CORRECTION

PATENT NO. : 5,381,163

DATED : January 10, 1995

INVENTOR(S) : NOBORU YOKOYAMA

It is certified that error appears in the above-identified patent and that said Letters Patent is hereby corrected as shown below:

IN THE DRAWINGS

Sheet 10 of 109, FIG. 7, "CHANCTE" should read --CHANGE--.
Sheet 89 of 109, FIG. 77, "RINTER" should read --PRINTER--.
Sheet 104 of 109, FIG. 92, "EABLE" should read --ENABLE--.

COLUMN 1

Line 51, "these" should read --thus--.

COLUMN 2

Line 26, "increase," should read --increases,--.
Line 42, "to a" should read --to an assigned row of a character pattern corresponding to a--.

COLUMN 6

Figures 45, 47:
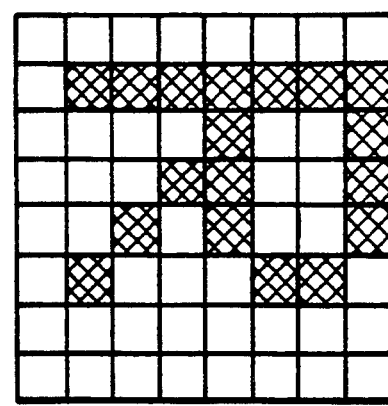
Figure 48A:
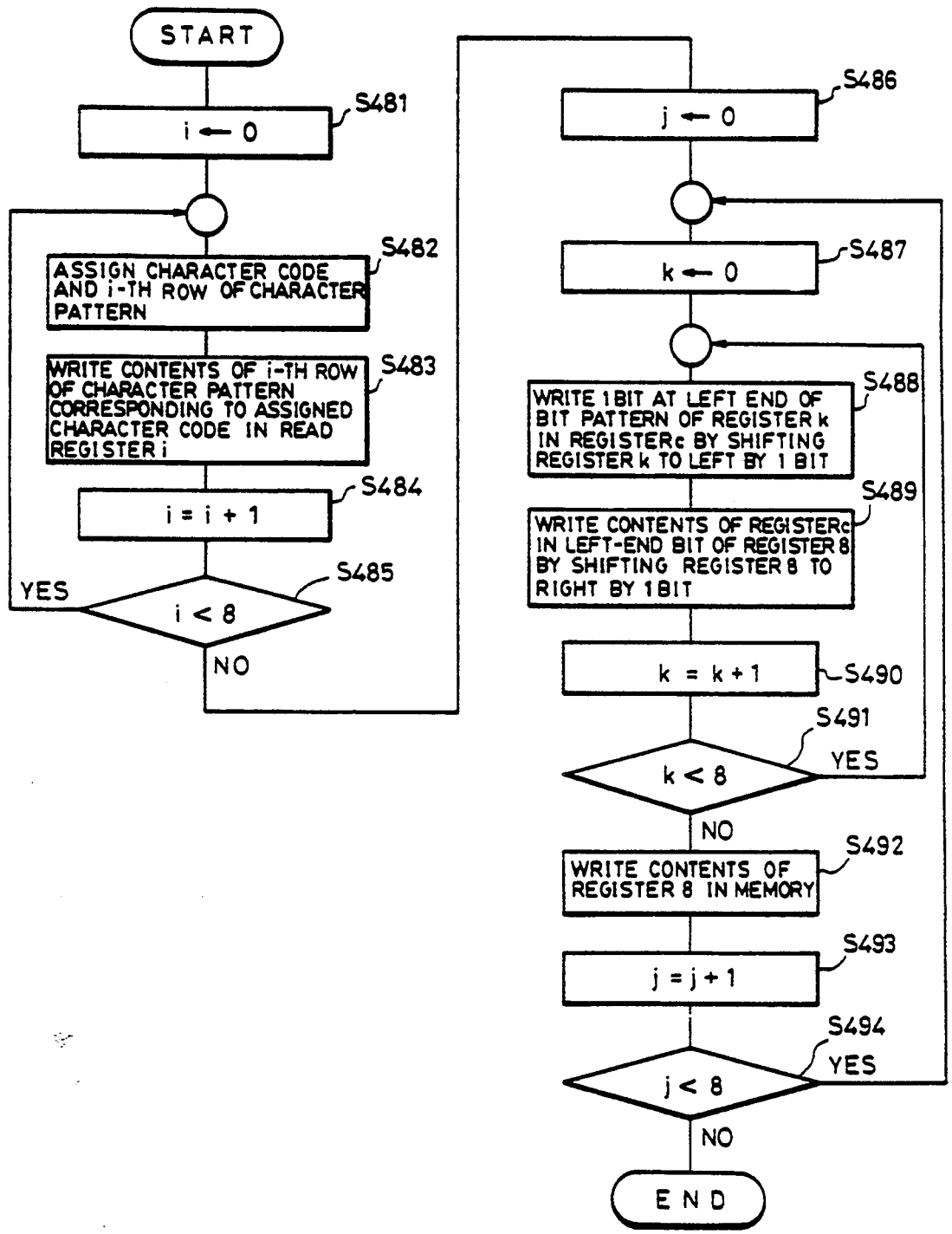
Figure 48:
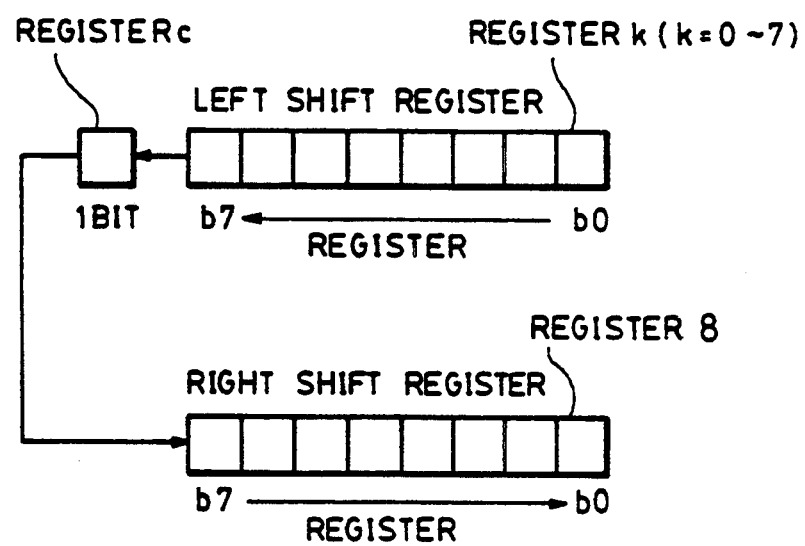
Figure 49:
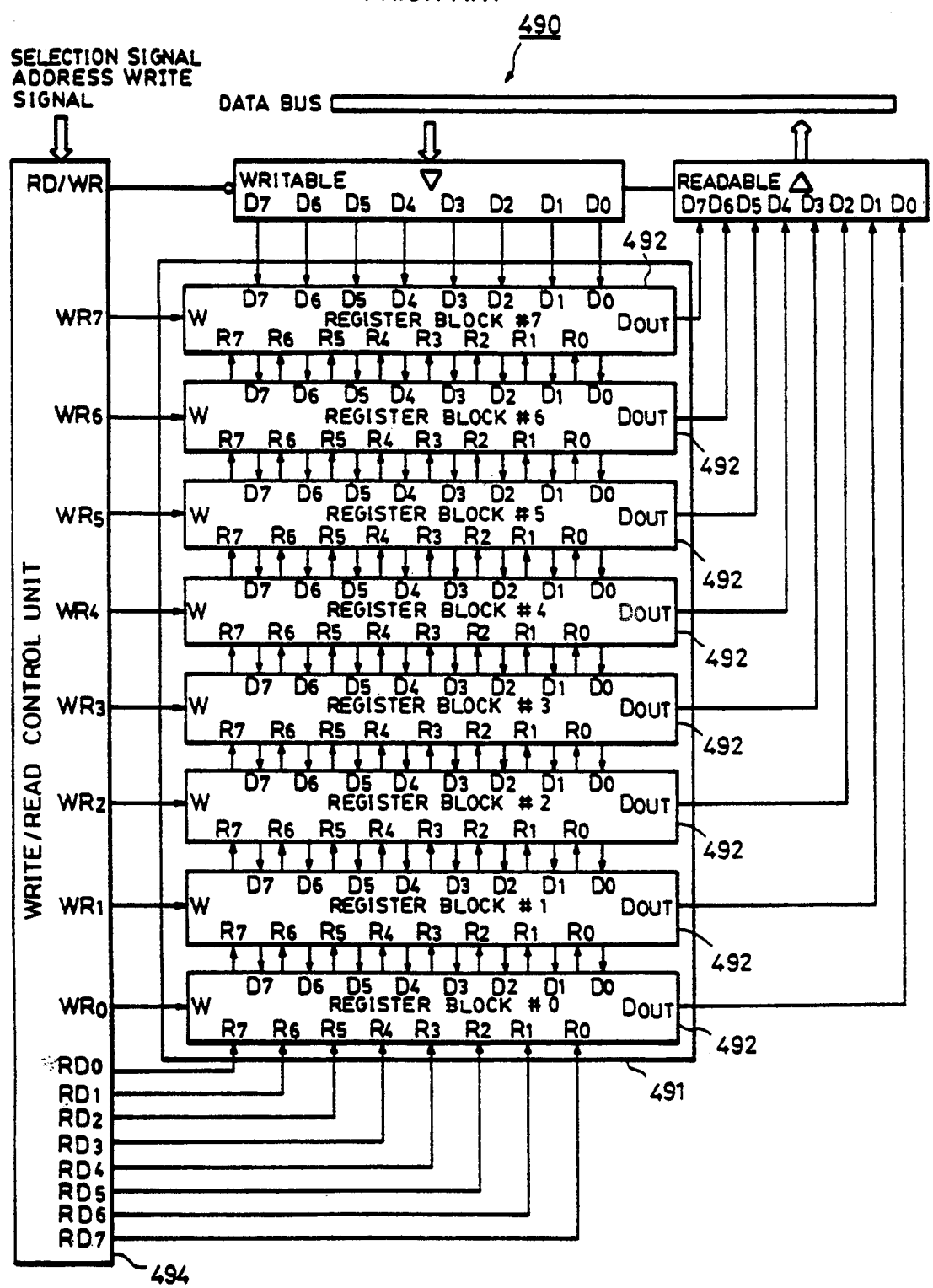
Figure 50:
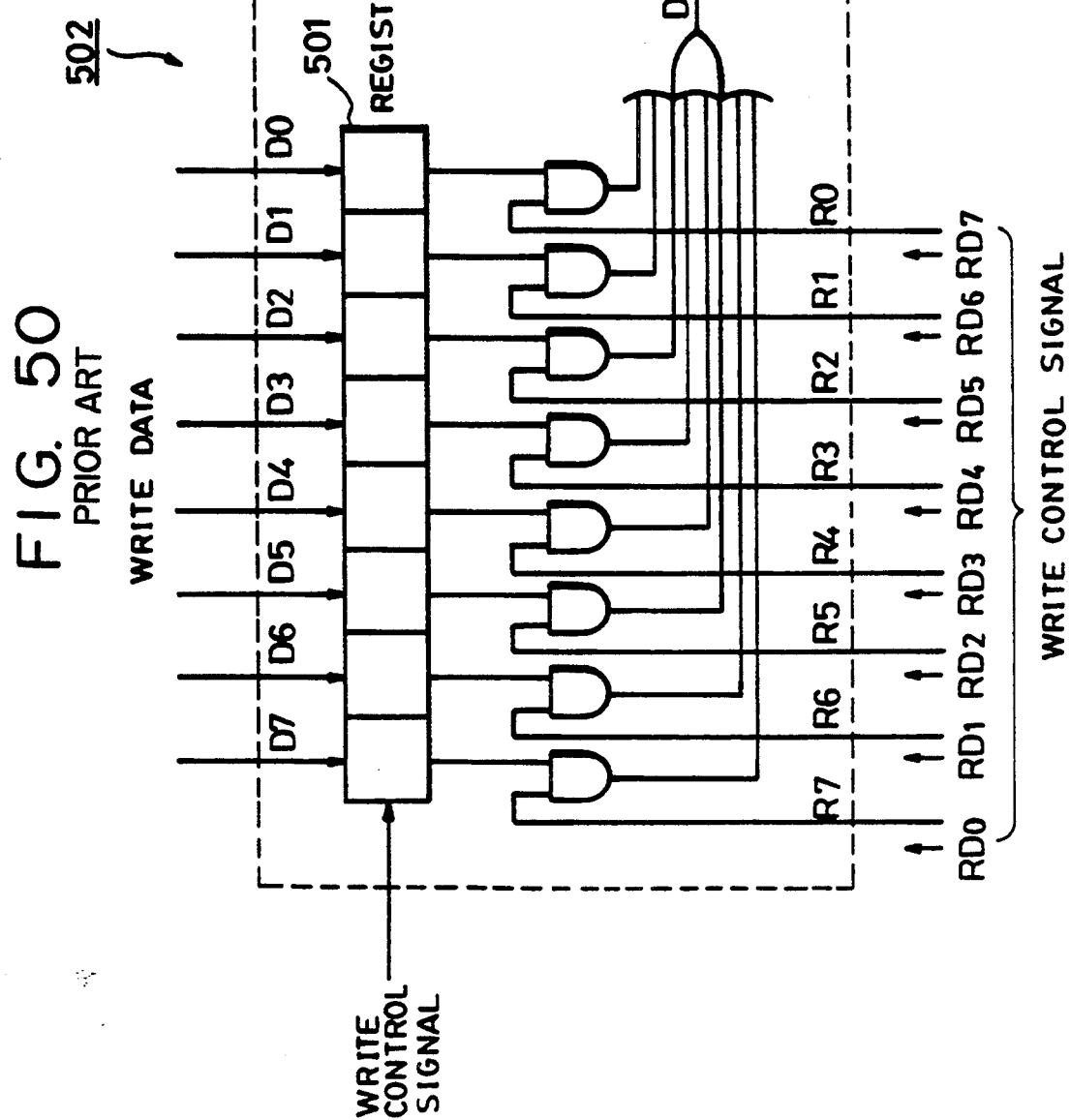

Line 7, "04," (second occurrence) should be deleted.
Line 27, "(i=)0-7)" should read --(i=0-7)--.
Line 30, "register 1" should read --register i--.
Line 54, "FIG. 45" should read --FIG. 45,--.

COLUMN 7

Line 55, "8x88" should read --8x8--.

UNITED STATES PATENT AND TRADEMARK OFFICE
CERTIFICATE OF CORRECTION

PATENT NO. : 5,381,163

DATED : January 10, 1995

INVENTOR(S) : NOBORU YOKOYAMA

It is certified that error appears in the above-identified patent and that said Letters Patent is hereby corrected as shown below:

COLUMN 9

Line 65, "recognized" should read --recognizes--.

COLUMN 10

Line 40, "horizontal-long" should read --horizontally-long--.

COLUMN 12

Line 5, "an" should read --a--.

COLUMN 13

Line 16, "controls" should read --control--.

COLUMN 18

Line 12, "ration" should read --ration of--.

COLUMN 22

Line 27, "be" (first occurrence) should read --of--.
   Line 42, "patter" should read --pattern--.

UNITED STATES PATENT AND TRADEMARK OFFICE
CERTIFICATE OF CORRECTION

PATENT NO. : 5,381,163
DATED : January 10, 1995
INVENTOR(S) : NOBORU YOKOYAMA

It is certified that error appears in the above-identified patent and that said Letters Patent is hereby corrected as shown below:

COLUMN 27

Line 54, "direction x 512" should read
--direction) x 512--.

COLUMN 36

Line 6, "mode," should read --means,--.

Signed and Sealed this

First Day of August, 1995

Attest:

BRUCE LEHMAN

Attesting Officer       Commissioner of Patents and Trademarks